(12) United States Patent
Lowery et al.

(10) Patent No.: US 9,324,354 B2
(45) Date of Patent: Apr. 26, 2016

(54) BARIUM FERRITE MAGNETIC STORAGE MEDIA

(75) Inventors: David C. Lowery, Roberts, WI (US);
Stephen R. Ebner, Stillwater, MN (US);
Ryosuke Isobe, Superior, CO (US);
Larold L. Olson, Lindstrom, MN (US);
Michael P. Sharrock, St. Paul, MN (US); Scott A. Walker, White Bear Lake, MN (US)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 12/753,718

(22) Filed: Apr. 2, 2010

(65) Prior Publication Data
US 2011/0242698 A1     Oct. 6, 2011

(51) Int. Cl.
*G11B 5/706*     (2006.01)
*G11B 5/714*     (2006.01)
*G11B 5/738*     (2006.01)

(52) U.S. Cl.
CPC ............ *G11B 5/70678* (2013.01); *G11B 5/714* (2013.01); *G11B 5/738* (2013.01)

(58) Field of Classification Search
None
See application file for complete search history.

(56) References Cited

U.S. PATENT DOCUMENTS

| | | | |
|---|---|---|---|
| 3,767,464 A | 10/1973 | Akashi et al. | |
| 3,959,553 A | 5/1976 | Hartmann et al. | |
| 4,425,401 A | 1/1984 | Ido et al. | |
| 4,548,801 A | 10/1985 | Nagai et al. | |
| 4,557,947 A | 12/1985 | Deimling et al. | |
| 4,604,293 A | 8/1986 | Shirahata et al. | |
| 4,666,769 A | 5/1987 | Miyata et al. | |
| 4,671,995 A | 6/1987 | Sekiya et al. | |
| 4,746,558 A | 5/1988 | Shimozawa et al. | |
| 4,842,942 A | 6/1989 | Yatsuka et al. | |
| 5,336,561 A | 8/1994 | Hashimoto et al. | |
| 5,492,775 A | 2/1996 | Ahlert et al. | |
| 5,503,922 A | 4/1996 | Shimasaki et al. | |
| 5,567,523 A | 10/1996 | Rosenblum et al. | |
| 6,063,489 A * | 5/2000 | Kobayashi et al. | ........... 428/328 |
| 6,627,293 B1 | 9/2003 | Inoue et al. | |
| 7,186,472 B2 | 3/2007 | Zinbo | |
| 2004/0005479 A1 | 1/2004 | Kitamura et al. | |
| 2004/0096703 A1* | 5/2004 | Noguchi et al. | ....... 428/694 BH |

(Continued)

OTHER PUBLICATIONS

U.S. Appl. No. 12/753,738, by Lowery et al., filed Apr. 2, 2010.

(Continued)

*Primary Examiner* — Mark Ruthkosky
*Assistant Examiner* — Linda Chau
(74) *Attorney, Agent, or Firm* — K&L Gates LLP

(57) ABSTRACT

Magnetic storage media that include a multilayer structure are described. In general, the magnetic storage media include a substrate, an underlayer that includes a plurality of underlayer particles formed over the substrate, and a magnetic layer that includes a plurality of magnetic particles formed over the underlayer. The magnetic layer may define a saturated magnetization and thickness product less than or equal to approximately 1.00 memu per square centimeter, and the magnetic particles may be selected from the group consisting of magnetic platelet-shaped particles and magnetic particles with an aspect ratio less than or equal to approximately 1.5. In addition, the described magnetic storage media may exhibit minimal interlayer diffusion between the underlayer and magnetic layer. Reduced interlayer diffusion between different layers of a magnetic recording medium may result in an improved magnetic recording surface for recording and storing data.

20 Claims, 24 Drawing Sheets

(56) References Cited

U.S. PATENT DOCUMENTS

| | | |
|---|---|---|
| 2004/0151946 A1 | 8/2004 | Kato et al. |
| 2004/0207955 A1 | 10/2004 | Seki et al. |
| 2004/0209121 A1 | 10/2004 | Yajima et al. |
| 2008/0070066 A1* | 3/2008 | Mikamo et al. ............... 428/842 |
| 2009/0046396 A1 | 2/2009 | Nagata et al. |
| 2009/0087684 A1 | 4/2009 | Omura et al. |
| 2009/0092857 A1 | 4/2009 | Matsumoto et al. |
| 2009/0162701 A1 | 6/2009 | Jensen et al. |
| 2009/0174969 A1 | 7/2009 | Tada et al. |

OTHER PUBLICATIONS

U.S. Appl. No. 12/753,730, by Lowery et al., filed Apr. 2, 2010.

U.S. Appl. No. 12/725,369, by Jensen et al., filed Mar. 16, 2010.

Matsumoto et al., "High Recording Density Tape Using Fine Barium-ferrite Particles with Improved Thermal Stability," presented in nearly final form at the 2009 Intermag Conference, May 2009, published later in journal, IEEE Transactions on Magnetics, vol. 46(5), May 2010, 6 pp.

Shimizu et al., "Particle Orientation Effects of Barium Ferrite Particulate Media," presented at the MMM-Intermag Conference, Jan. 2010, published later in journal, IEEE Transactions on Magnetics, vol. 46(5): 1607-1609, Jun. 2010.

Harasawa et al., "Barium-Ferrite Particulate Media for High-Recording-Density Tape Storage Systems," presented at the MMM-Intermag Conference, Jan. 2010, published later in journal, IEEE Transactions on Magnetics, vol. 46(6): 1894-1897, Jun. 2010.

Berman et al., "6.7 Gb/in$^2$ Recording Areal Density on Barium Ferrite Tape," IEEE Transactions on Magnetics, vol. 43, No. 8, Aug. 2007, 7 pp.

Standard ECMA-319, "Data Interchange on 12, 7 mm 384-Track Magnetic Tape Cartridges-Ultrium-1-Format", Jun. 2001 (146 pp.).

Office Action from U.S. Appl. No. 12/753,738, dated Jun. 8, 2012, 15 pp.

\* cited by examiner

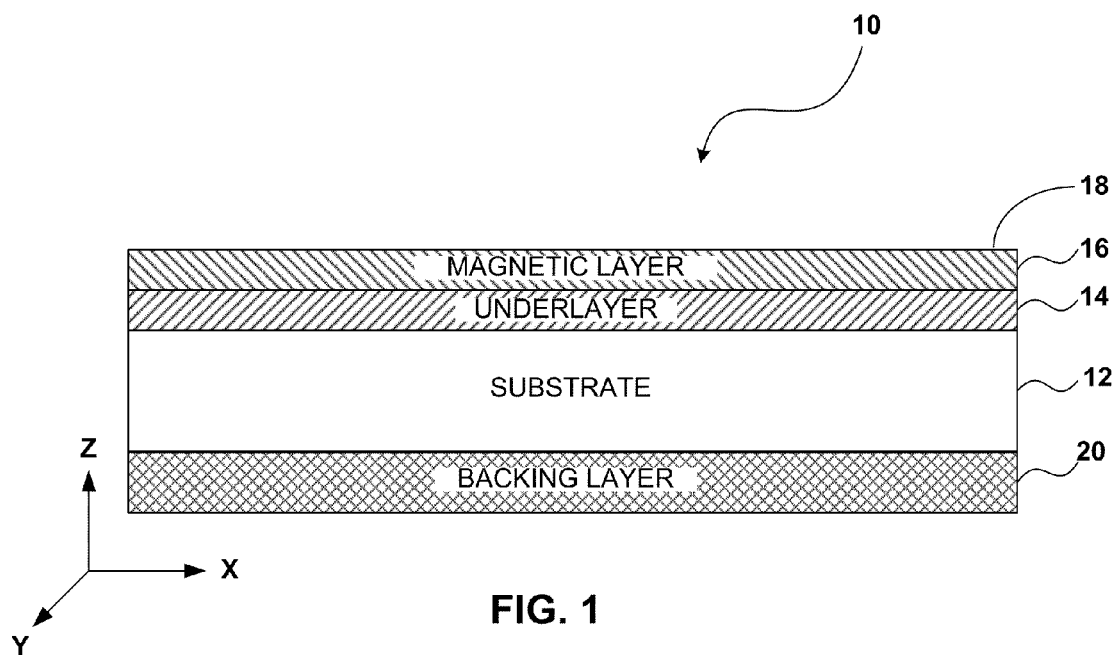
FIG. 1
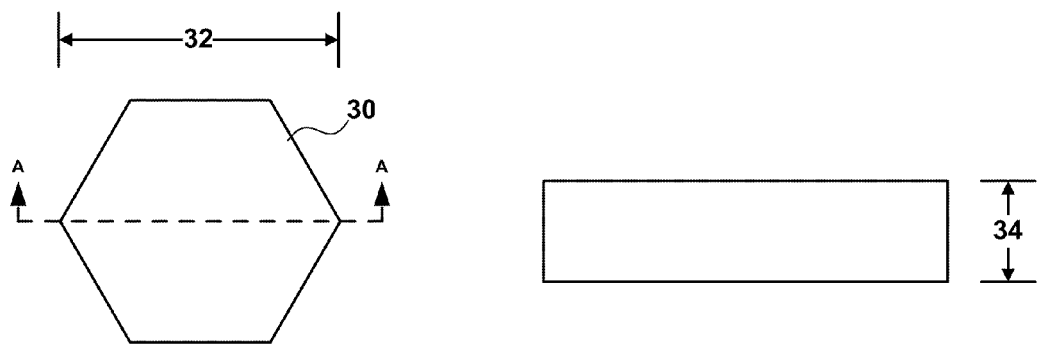
FIG. 2A  FIG. 2B

BARIUM FERRITE MAGNETIC STORAGE MEDIA

TECHNICAL FIELD

This disclosure relates to magnetic media and, in particular, to magnetic storage media.

BACKGROUND

Magnetic data storage media, such as magnetic tape and magnetic disks, are commonly used for storage and retrieval of data. The magnetic storage media generally have a series of transitions between different magnetized regions. The different magnetized regions may encode a series of bits that represent a value of "0" or "1". The magnetically oriented regions may be aligned on data tracks that divide the magnetic medium. In order to subsequently store data on the magnetic storage medium, a recording head of a magnetic drive, such as a tape drive or disk drive, encodes data by selectively orienting various magnetic regions on the medium. A read head of a magnetic drive may later detect the regions, and the drive can interpret the detected regions to retrieve the data.

Magnetic storage media such as magnetic tape and disks are typically manufactured by coating one or more magnetic layers on a substrate and then drying the resultant coating to form a magnetic film. One or more intermediate layers may reside between the magnetic layer and the substrate. For example, an intermediate layer known as an underlayer or sublayer may be coated over the substrate before coating a magnetic layer. An underlayer may be coated in a sequential process that is substantially simultaneous with the coating of the magnetic layer. A backing layer may be further attached to the substrate to provide mechanical and performance benefits. Together the various layers create the structure of a magnetic storage medium.

Larger data storage demands and technological advancements have led to increased data storage densities. The amount of data that a magnetic drive can store on a magnetic layer of a magnetic data storage medium is determined by the areal density with which bits of data are stored on the medium and the area of the magnetic layer of the medium. In general, higher storage density can be achieved by increasing the number of magnetic particles in a magnetic layer, adding additional magnetic layers, using thinner layers, or providing magnetic particles capable of increased density. Higher density data storage can improve data storage capacities or reduce the size of magnetic drives storing the same amount of data.

SUMMARY

In general, this disclosure relates to magnetic storage media that include a multilayered structure. For example, a magnetic storage medium may include a magnetic layer that is formed over a non-magnetic substrate. An underlayer may separate the magnetic layer from the non-magnetic substrate. Further, a backing layer may be formed over an opposite side substrate from the magnetic layer. Together, the various layers create the magnetic storage medium.

A standard magnetic storage medium may be formed using standard components and standard manufacturing techniques. For example, a standard magnetic storage medium may have a magnetic layer formed from a dispersion of iron oxide particles or iron metal particles. The particles may be readily processed and coated onto a substrate or onto an underlayer formed over a substrate. In some case, a wet-on-wet coating process may be used to form a standard magnetic storage medium by sequentially coating a wet magnetic particle dispersion over a previously established wet underlayer.

In some further cases, however, a higher capacity or higher quality magnetic storage medium may be created by using non-standard components or non-standard manufacturing techniques. As will be described in greater detail below, this disclosure includes materials and processing techniques that may be used to create a high capacity and high quality magnetic storage medium. In some examples, a controlled multilayered recording medium may be created in accordance with this disclosure. The multilayered medium may have controlled layers and limited interlayer diffusion, which may improve the quality and capacity of the resulting magnetic medium. The multilayered medium may also have a controlled recording surface substantially free of defects that can promote signal noise or impart data writing errors.

In an example, this disclosure describes a magnetic medium that includes a substrate, an underlayer that includes a plurality of underlayer particles formed over the substrate, and a magnetic layer that includes a plurality of magnetic particles formed over the underlayer. The magnetic layer defines a saturated magnetization and thickness product less than or equal to approximately 1.00 memu per square centimeter, and the magnetic particles are selected from the group consisting of magnetic platelet-shaped particles and magnetic particles with an aspect ratio less than or equal to approximately 1.5. In addition, the magnetic layer and the underlayer define a mixing zone that includes a mixture of the underlayer particles and the magnetic particles. A first depth of the mixing zone defines a concentration of magnetic particles equal to approximately 80 percent of a maximum concentration of magnetic particles in the magnetic layer. A second depth of the mixing zone defines a concentration of magnetic particles equal to approximately 20 percent of the maximum concentration of magnetic particles in the magnetic layer. In some examples, a distance between the first depth of the mixing zone and the second depth of the mixing zone is less than or equal to approximately 30 nanometers.

In another example, this disclosure describes a magnetic medium that includes a substrate that defines an average thickness between approximately 2.5 micrometers and 10 micrometers, an underlayer that includes a plurality of underlayer particles formed over the substrate, where the underlayer defines an average thickness between approximately 500 nanometers and approximately 1500 nanometers, and a magnetic layer that includes a plurality of magnetic particles formed over the underlayer. The magnetic layer defines a saturated magnetization and thickness product between approximately 0.34 memu per square centimeter and approximately 0.90 memu per square centimeter, and the magnetic particles are selected from the group consisting of magnetic platelet-shaped particles and magnetic particles with an aspect ratio less than or equal to approximately 1.5. In addition, the magnetic layer and the underlayer define a mixing zone that includes a mixture of the underlayer particles and the magnetic particles. A first depth of the mixing zone defines a concentration of magnetic particles equal to approximately 80 percent of a maximum concentration of magnetic particles in the magnetic layer. A second depth of the mixing zone defines a concentration of magnetic particles equal to approximately 20 percent of the maximum concentration of magnetic particles in the magnetic layer. In some examples, a distance between the first depth of the mixing zone and the second depth of the mixing zone is less than or equal to approximately 30 nanometers.

In a further example, this disclosure describes a magnetic storage system that includes a magnetic medium, a head that detects magnetic transitions on the medium and generates signals, a controller that controls a position of the head relative to the medium, and a signal processor that interprets signals generated by the head. The magnetic medium includes a substrate, an underlayer that includes a plurality of underlayer particles formed over the substrate, and a magnetic layer including a plurality of magnetic particles formed over the underlayer. The magnetic layer defining a saturated magnetization and thickness product less than or equal to approximately 1.35 memu per square centimeter, and the plurality of magnetic particles selected from the group consisting of magnetic platelet-shaped particles and magnetic particles with an aspect ratio less than or equal to approximately 1.5. In addition, the magnetic layer and the underlayer define a mixing zone that includes a mixture of the underlayer particles and the magnetic particles. A first depth of the mixing zone defines a concentration of magnetic particles equal to approximately 80 percent of a maximum concentration of magnetic particles in the magnetic layer. A second depth of the mixing zone defines a concentration of magnetic particles equal to approximately 20 percent of the maximum concentration of magnetic particles in the magnetic layer. In some cases, a distance between the first depth of the mixing zone and the second depth of the mixing zone is less than or equal to approximately 30 nanometers.

In an additional example, this disclosure describes a method that includes forming an underlayer over a substrate, drying the underlayer, heat-curing the underlayer, and forming a magnetic layer that includes a plurality of magnetic particles over the underlayer. The magnetic particles are selected from the group consisting of magnetic platelet-shaped particles and magnetic particles with an aspect ratio less than or equal to approximately 1.5. In addition, heat-curing the underlayer occurs prior to forming the magnetic layer over the underlayer.

In an example, this disclosure also describes a method that includes forming an underlayer over a substrate, where the substrate defines an average thickness between approximately 2.5 micrometers and approximately 10 micrometers, and forming the underlayer includes forming the underlayer so the underlayer defines an average thickness between approximately 500 nanometers and 1500 nanometers. The method also includes drying the underlayer, heat-curing the underlayer, and forming a magnetic layer that includes a plurality of magnetic particles over the underlayer. Further, forming the magnetic layer includes forming the magnetic layer so the magnetic layer defines a saturated magnetization and thickness product between approximately 0.34 memu per square centimeter and 0.90 memu per square centimeter. Also, heat-curing the underlayer occurs prior to forming the magnetic layer.

In an additional example, this disclosure describes a method of forming a magnetic medium that includes forming an underlayer over a substrate, drying the underlayer, milling a plurality of magnetic particles, and forming a magnetic layer that includes the plurality of magnetic particles over the underlayer. The magnetic particles are selected from the group consisting of magnetic platelet-shaped particles and magnetic particles with an aspect ratio less than or equal to approximately 1.5. In addition, milling the plurality of magnetic particles includes milling the plurality of magnetic particles so a magnetic medium formed in the absence of an applied magnetic field exhibits a longitudinal squareness less than or equal to approximately 0.40.

In a further example, this disclosure describes method of forming a magnetic medium that includes forming an underlayer over a substrate, where the substrate defines an average thickness between approximately 2.5 micrometers and 10 micrometers, and forming the underlayer includes forming the underlayer so the underlayer defines an average thickness between approximately 500 nanometers and 1500 nanometers. The method further involves drying the underlayer, milling a plurality of magnetic particles, and forming a magnetic layer that includes a plurality of ferrite particles comprising a hexagonal lattice structure over the underlayer. Forming the magnetic layer includes forming the magnetic layer so the magnetic layer defines a saturated magnetization and thickness product between approximately 0.34 memu per square centimeter and 0.90 memu per square centimeter. In addition, milling the plurality of ferrite particles comprising a hexagonal lattice structure includes milling the ferrite particles comprising a hexagonal lattice structure so a magnetic medium formed in the absence of an applied magnetic field exhibits a longitudinal squareness less than or equal to approximately 0.40.

In a further example, this disclosure describes is a method of forming a magnetic medium that includes directly depositing a substantially nonmagnetic underlayer on a substrate, where the substrate defines an average thickness between approximately 2.5 micrometers and 10 micrometers, and directly depositing the underlayer includes directly depositing the underlayer so the underlayer defines an average thickness between approximately 800 nanometers and 1000 nanometers. The method further includes drying the underlayer, milling a plurality of magnetic particles, wherein the magnetic particles are selected from the group consisting of magnetic platelet-shaped particles and magnetic particles with an aspect ratio less than or equal to approximately 1.5, and directly depositing a magnetic layer that includes the plurality of magnetic particles on the underlayer. Directly depositing the magnetic layer includes directly depositing the magnetic layer so the magnetic layer defines a saturated magnetization and thickness product between approximately 0.34 memu per square centimeter and 0.90 memu per square centimeter. In addition, heat-curing the underlayer occurs after forming the underlayer but prior to forming the magnetic layer over the underlayer. Further, milling the plurality of magnetic particles includes milling the plurality of magnetic particles so a magnetic medium formed in the absence of an applied magnetic field exhibits a longitudinal squareness less than or equal to approximately 0.40.

The details of one or more embodiments of this disclosure are set forth in the accompanying drawings and the description below. Other features, objects, and advantages of this disclosure will be apparent from the description and drawings, and from the claims.

BRIEF DESCRIPTION OF DRAWINGS

FIG. 1 is a cross-sectional schematic of an exemplary magnetic recording medium.

FIGS. 2A and 2B are conceptual diagrams illustrating aspect ratio parameters for an example magnetic particle.

DETAILED DESCRIPTION

Figure 3:
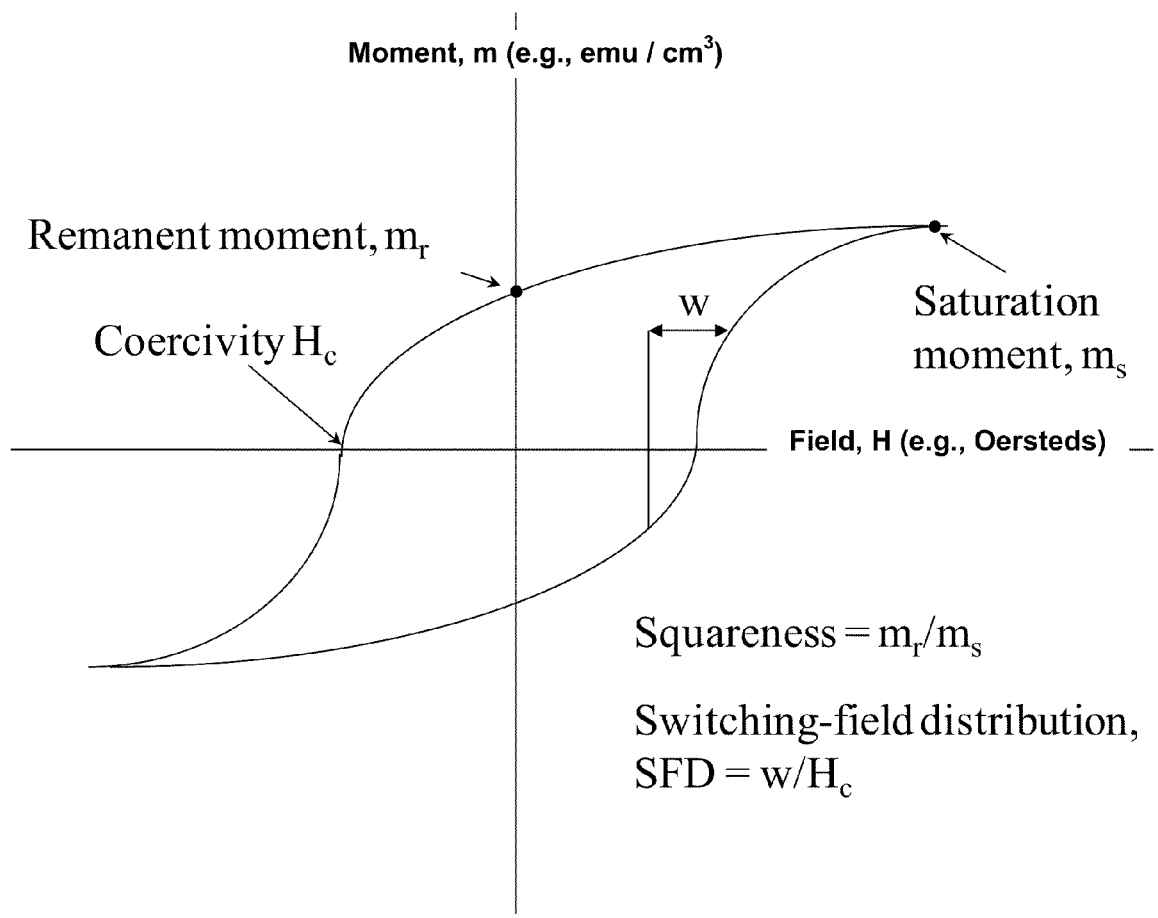
FIG. 3 is a schematic drawing of an example magnetic hysteresis curve.

In general, this disclosure relates to magnetic recording media that include a multilayered structure. A multilayered structure is a structure formed of multiple components that are fashioned into different layers. By controlling the selection and application of different components, a multilayered magnetic recording medium with improved quality and performance may be created.

A magnetic recording medium may include a multilayered stack that functions to provide structure for a magnetic recording surface. A concentration of magnetic particles may reside both on the magnetic recording surface and below the magnetic recording surface, in the magnetic layer. The magnetic particles can take different magnetic orientations, and the different magnetic orientations can translate into encoded data. As will be described in greater detail below, advanced magnetic particles such as platelet-shaped particles and small aspect ratio particles may be positioned in a magnetic recording layer to increase the capacity of a magnetic recording medium. In addition, a multilayer medium may be selectively processed to improve the quality of the recording surface of the magnetic recording layer. For example, interlayer interaction, such as interlayer diffusion, may be limited to increase the concentration and quality of magnetic particles in the magnetic recording layer. Further, processing steps such as heat-curing or calendering (e.g., pressing or smoothing material between rollers) may be implemented to improve the quality of a medium recording surface. While the described materials and techniques may benefit any recording medium, the materials and techniques may provide advantages when combined with a recording medium that includes one or more thin layers. Some or all of the features of this disclosure may result in an improved magnetic recording medium that exhibits increased data storage capacity and increased data storage quality as compared to standard magnetic recording media.

In this disclosure, different layers of multilayer structures are illustrated and described. Generally, the layers are adjacently positioned for ease of discussion, meaning that the different layers are positioned in abutting arrangement without intervening layers. However, unless otherwise noted, it should be appreciated that any of the disclosed layers may be formed over one another or directly deposited on one another. As used herein, the phrase "formed over" means that a magnetic recording medium layer is positioned over a previously established magnetic recording medium layer. The phrase "formed over" also means that one or more intervening components, for example, additional layers, features, or elements, may be included between one magnetic recording medium layer and another magnetic recording medium layer, although intervening components such as intervening layers are not required. By contrast, the phrase "directly deposited on" means that a magnetic recording medium layer is positioned directly adjacent to a previously established magnetic recording medium layer without any additional intervening components.

FIG. 1 is a cross-sectional schematic of an exemplary magnetic recording medium 10. By way of example, magnetic recording medium 10 may be a magnetic tape, a magnetic flexible disk, a magnetic rigid disk, or the like. Regardless, magnetic recording medium 10 includes a substrate 12. Substrate 12 defines a first side and a second side opposite the first side. A non-magnetic underlayer 14 is formed over the first side of substrate 12. Underlayer 14 contacts substrate 12 on one surface and defines a coating surface on an opposite surface. A backing layer 18 may be formed over the second side of substrate 12. In addition, magnetic layer 16 is formed over the coating surface defined by underlayer 14. Magnetic layer 16 defines a recording surface 18. Recording surface 18 may be the outward most surface of magnetic recording media 10 and may be the surface that a recording head traverses during a data reading or writing operation.

Substrate 12 functions as a support carrier for magnetic recording media 10 and may be formed from any suitable materials. For example, substrate 12 may include glass, plastics, organic resins, metals, and the like. In some cases, substrate 12 may include a polymeric film. Any suitable polymer or combination of polymers may be used. Polymers may be selected for chemical compatibility, to impart mechanical or electromagnetic characteristics to magnetic recording media 10, or based on other characteristics. Polymers that are flexible, rigid, electrically resistive, electrically conductive and the like are known in the art. Suitable polymers may include polyesters such as polyethylene terephthalate (PET), polyethylene naphthalate (PEN), blends or copolymers of polyethylene terephthalate and polyethylene naphthalate; polyolefins (e.g., polyethylene, polypropylene, polystyrene); cellulose derivatives; polyamides; polyimides; and combinations thereof. In addition, substrate 12 may various other polymers, binders, or additives, such as carbon black and silica.

Backing layer 18 may be formed over at least a portion of a backside of substrate 12. Backing layer 18 may have a controlled surface roughness that, for example, influences the winding and unwinding characteristics of certain types of magnetic recording media, such as a magnetic tape. Backing layer 18 may also provide dimensional stability to magnetic recording medium 10 by, for example, minimizing the cupping and curing of the edges of magnetic recording medium 10. In some examples, backing layer 18 may include a component that provides electrical resistivity to composite magnetic recording medium 10. For example, backing layer 18 may include carbon black. An electrically resistive backing layer may improve the electromagnetic characteristics of a magnetic recording medium 10. In addition, backing layer 18 may include binder components. Any suitable binder components that are chemically compatible and mechanically stable may be used. In some cases, binder components may include polyurethanes and polyolefins, a phenoxy resin, a nitrocellulose, polyvinylchloride, and combinations thereof. Backing layer 18 may include additional polymers, pigments, binders, solvents and additives, as will be appreciated by those skilled in the art.

Magnetic layer 16 is formed over substrate 12. In general, magnetic layer 16 includes a plurality of magnetic particles contained in a binder. Additives such as surfactants, wetting agents, lubricants, abrasives, and the like may be added to the plurality of magnetic particles to improve the quality and performance of the magnetic recording medium. As will be described, the various components of the magnetic layer composition can be combined and coated onto an article to form a magnetic layer that defines a recording surface. Improving the concentration, quality, or character of the magnetic particles arranged within the magnetic layer, including within the recording surface, may result in an improved magnetic recording medium. Although aspects of this disclosure may be applicable to magnetic recording media formed from any materials, magnetic layer 16 may have formulations and characteristics as described below.

In general, magnetic layer 16 includes a plurality of magnetic particles that form a pigment. Different magnetic particles define different shapes, and shape profiles may impact the storage density or storage quality of a formed magnetic recording medium. As examples, magnetic particles may define an acicular or needle-shape, a platelet-shape, a low aspect ratio shape, or magnetic particles may even define an amorphous shape. Magnetic layer 16 may include magnetic particles of any suitable shape. For example, magnetic layer 16 may include acicular particles. Typical acicular particles include particles of ferromagnetic or ferrimagnetic iron oxides, such as gamma-ferric oxide ($\gamma$-$Fe_2O_3$), complex oxides of iron, cobalt, and nickel, and various ferrites and metallic iron, cobalt, or alloy particles. However, non-acicular shaped particles may exhibit a better packing morphology than acicular shaped particles. For example, platelet-shaped particles may exhibit denser packing morphology than acicular particles when the platelet-shaped particles are oriented perpendicularly instead of lengthwise. As another example, low aspect ratio particles may not naturally stack on top of one another, resulting in a more uniform magnetic recording surface.

Accordingly, magnetic layer 16 may also include particles such as platelet-shaped particles and low aspect ratio particles. Suitable platelet-shaped or low aspect ratio particles may include various iron, cobalt, and nickel-based particles, including alloys of iron, cobalt and nickel, and compounds of iron, cobalt, and nickel with oxygen and/or nitrogen. In some examples, platelet-shaped or low aspect ratio particles may include particles that comprise a hexagonal lattice structure. For example, some ferrites such as barium ferrite (e.g., hexagonal barium ferrite) comprise a hexagonal lattice structure. Another example of platelet-shape particles suitable for use in a magnetic recording medium of this disclosure are strontium ferrite particles.

Barium ferrite particles for use in this disclosure may be prepared using any manufacturing process, such as a ceramic process, codeposition-sintering process, hydrothermal synthesis process, flux process, glass crystallization process, alkoxide process, or plasma jet process. In some examples, barium ferrite particles prepared using a hydrothermal synthesis process may exhibit improved magnetic properties (e.g., increased saturation magnetization) as compared to barium ferrite particles prepared using a different process. A hydrothermal synthesis process for manufacturing platelet-like magnetoplumbite type ferrite particles, such barium ferrite, may involve mixing a barium material such as barium carbonate, an iron material such as hematite, magnetite, maghemite, goethite, or the like, and one or more substituting element. Substituting elements may include a zinc material such as zinc oxide, zinc carbonate, zinc hydroxide, or the like, a titanium material such as titanium oxide, a cobalt material such as cobalt carbonate, cobalt hydroxide, basic cobalt carbonate ($2CoCO_3.3Co(OH)_2.H_2O$), or oxides, hydroxides or carbonates of other elements (e.g. Ga, Al, Ni). The various components can be heated (e.g., between 750 degrees Celsius and 950 degrees Celsius) and calcined in the presence of a flux (e.g., one or more of the halides of alkali metals and alkali earth metals, sulfates, or silicates). The calcined product can be crushed, washed with water and acid, and dried to produce a magnetic particle suitable for incorporation into a magnetic recording medium.

As noted, a magnetic recording medium may include low aspect ratio magnetic particles in addition to, or instead of, platelet-shaped magnetic particles. In some cases, a magnetic particle may be considered to define both a platelet-shape and a low aspect ratio. FIGS. 2A and B are conceptual profile views illustrating aspect ratio parameters for an example platelet-shaped magnetic particle 30. In general, the aspect ratio of a particle is the ratio of the maximum dimension of the particle to the minimum dimension of the particle. For example, the aspect ratio of a platelet-shaped particle may be the ratio of the width of the particle to the thickness of the particle. The width is measured on the longest axis of the particle, or, where there is not defined axis, a projected equivalent-circle diameters of the particle. The thickness is generally measured as a particle length that extends in a perpendicular direction from the plane that is defined by the particle width. In the illustrated example of FIG. 2A, particle 30 has a long-axis width 32. FIG. 2B is a cross-sectional view of particle 30 taken along the A-A cross-section line and shows a particle thickness 34. The aspect ratio for particle 30 therefore is the quotient of dimension 32 divided by dimension 34.

Low aspect ratio particles of this disclosure may define an aspect ratio less than or equal to approximately 2.0, such as less than or equal to approximately 1.50, less than or equal to approximately 1.25, or less than or equal to approximately 1.10. In some cases, low aspect ratio particles may define an aspect ratio greater than or equal to a specific value. For example, low aspect ratio particles may define an aspect ratio greater than or equal to approximately 1.0. Examples of low aspect ratio particles may include nitrides of iron.

Regardless of the specific particle shape selected for magnetic layer 16, the magnetic particles may be any suitable size and may exhibit any appropriate electromagnetic characteristics. In some cases, magnetic particles may have an average major axis length between approximately 10 nanometers and approximately 80 nanometers, such as between approximately 15 nanometers and approximately 60 nanometers, or between approximately 20 nanometers and approximately 40 nanometers. Because magnetic particles can take different shapes, the term average magnetic particle size means the following: (1) in the case where the shapes of particles are acicular or needle like, a particle size is indicated by the length of a long axis constituting the particle, i.e., a long axis length, (2) in the case where the shapes of particles are tabular or platelet like (provided that the thickness or height is smaller than the longest diameter of the tabular plane), a particle size is indicated by the longest diameter of the tabular plane, and (3) in the case where the shape of particles are spherical, polyhedral or amorphous and it is impossible to specify the length of long axis constituting the particle from the shape, a particle size is indicated by an equivalent-circle diameter of the particle.

In some cases, magnetic particles may be chemically treated to make the magnetic recording medium easier to manufacture or to improve the mechanical or electromagnetic performance of the recording medium. For example, magnetic particles may be treated with various acids or bases as is known in the art. As another example, magnetic particles may be doped with one or more ions of a polyvalent metal such as titanium, tin, cobalt, nickel, zinc, manganese, chromium, or the like. Magnetic particles may also have an oxide coating that surrounds a peripheral surface of the particles to prevent unwanted reactivity under ambient conditions. The magnetic particles may comprise between approximately 40% to approximately 90% by weight of a magnetic layer composition, such as approximately 60% to approximately 75% by weight. As used herein, the term weight percent refers to the weight of a constituent component relative to total weight of a final magnetic layer composition, excluding the weight of processing additives and solvents that would normally be removed, for example by evaporation, during the formation of the final magnetic layer composition.

As described, selected magnetic particles may be combined with a variety of binders, additives, and activators to form magnetic layer 16. Any binder materials that hold magnetic layer components in a reasonably fixed orientation after curing may be suitably used. In some examples, suitable binder components may include polyurethane resins, vinyl chloride resins, and combinations thereof. Examples of suitable binders for a magnetic layer composition include vinyl chloride vinyl acetate copolymers, vinyl chloride vinyl acetate vinyl alcohol copolymers, vinyl chloride vinyl acetate maleic acid polymers, vinyl chloride vinylidene chloride copolymers, vinyl chloride acrylonitrile copolymers, acrylic ester acrylonitrile copolymers, acrylic ester vinylidene chloride copolymers, methacrylic ester vinylidene chloride copolymers, methacrylic esterstyrene copolymers, thermoplastic polyurethane resins, phenoxy resins, polyvinyl fluoride, vinylidene chloride acrylonitrile copolymers, butadiene acrylonitrile copolymers, acrylonitrile butadiene acrylic acid copolymers, acrylonitrile butadiene methacrylic acid copolymers, polyvinyl butyral, polyvinyl acetal, cellulose derivatives, styrene butadiene copolymers, polyester resins, phenolic resins, epoxy resins, thermosetting polyurethane resins, urea resins, melamine resins, alkyl resins, urea formaldehyde resins and the like, and combinations thereof. The amount of binder component in a magnetic layer composition may vary depending, for example, on the specific binder component selected, the chemical properties of the binder component, and the desired mechanical properties for a magnetic recording medium. In some examples, the amount of binder component added to a magnetic layer composition may be proportional to the amount of magnetic particles added to the formulation. For instance, a binder component may comprise between approximately 5 and 40 weight parts per 100 weight parts of magnetic particles, such as between approximately 10 and 25 weight parts per 100 weight parts of magnetic particles.

In addition to a binder, a variety of other additives may be incorporated into the magnetic layer compositions described herein. Additives such as activators, head-cleaning agents, lubricants, carbon black, dispersants, and wetting agents may improve the quality or performance of a magnetic recording medium.

For example, a formulation of magnetic particles and a binder may also include an activator. An activator may crosslink binder components in a magnetic layer composition, resulting in a rigid network polymer that increases the durability of magnetic recording media 10. Selection of an activator may vary depending on, for example, the desired amount of crosslinking for magnetic media 10, the specific binder components selected for the magnetic layer composition, and the reaction rates necessary for processing. An example of a useful activator is a polyisocyanate activator. Polyisocyanate activators may include polyisocyanate activators that result in a tough and flexible film, rather than a brittle film. In cases, an activator may be formed from the reaction product of an excess of a polyisocyanate with polyols, including, in some cases, an oligomeric polyol. Examples of activators with one or more isocyanate functional groups include tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. A single activator may be used or a combination of two or more activators may be used. A magnetic layer composition may include between approximately 1 and 10 weight parts of activator per 100 weight parts of magnetic particles, such as between 1.5 and 5 weight parts per 100 weight parts of magnetic particles.

As another example, a magnetic layer composition may include one or more lubricants. After fabrication, a lubricant may migrate to recording surface 18 of magnetic recording media 10. The lubricant may then reduce friction between recording surface 18 and a magnetic recording head as the head traverses over the media during a data reading or writing operation. Suitable lubricants may include fatty acids, fatty acid esters, and combinations thereof. Suitable fatty acid lubricants include, for example, stearic acid, myristic acid, palmitic acid, oleic acid, and combinations thereof. Suitable fatty acid ester lubricants may include, for example, butyl stearate, isopropyl stearate, butyl oleate, butyl palmitate, butylmyristate, hexadecyl stearate, oleyl oleate, and combinations thereof. Other examples of useful lubricants include those selected from the group consisting of silicone compounds such as silicone oils, fluorochemical lubricants, fluorosilicones, and particulate lubricants such as powders of inorganic or plastic materials. If a lubricant or combination of lubricants is used in a magnetic layer composition, the formulation may include between approximately 0.1 and 10 weight parts of lubricant per 100 weight parts of magnetic particles, such as between approximately 1 and 4 weight parts of lubricant per 100 weight parts of magnetic particles.

As mentioned above, a magnetic layer composition may include other additives to improve the physical or electromagnetic characteristics of a magnetic recording medium. Additives may include head-cleaning agents, carbon black, dispersants, wetting agents, an antistatic compound, or similar performance enhancing compounds.

As an example, a magnetic layer composition may include a surfactant. Suitable surfactants may include phenylphosphinic acid (PPiA), 4-nitrobenzoic acid, various other adducts of sulfuric, sulfonic, phosphoric, phosphonic, carboxylic acids, and combinations thereof. If used, a magnetic layer composition may include between approximately 1 and 10 weight parts of surfactant per 100 weight parts of magnetic particles, such as between approximately 3 and 8 weight parts of surfactant per 100 weight parts of magnetic particles.

A magnetic layer composition may also include one or more wetting agents. A wetting agent may promote dispersion and deagglomeration of magnetic particles, and, as a result, provide a more uniform distribution of magnetic particle in a magnetic recording medium. While any suitable wetting agents may be used based, for example, on chemical compatibility with other magnetic layer coating components, specific examples of wetting agents may include acrylates, acrylate copolymers, and phosphoric acid esters such as mono-phosphorylated propylene oxide adducts of glycerol. When used, a magnetic layer composition may include between approximately 0.1 and 10 weight parts of wetting agent per 100 weight parts of magnetic particles, such as between approximately 1.5 and 5 weight parts of wetting agent per 100 weight parts of magnetic particles.

A magnetic layer composition may also include a head cleaning agent, such as a head cleaning agent that includes abrasive particles. Head cleaning agents in a magnetic recording medium may prevent fouling buildup on a magnetic recording head while reading and writing data the magnetic recording media. Also, abrasive particles in the magnetic recording medium may provide a load bearing surface for a magnetic recording head to traverse. In this manner, stiction may be reduced between a magnetic recording medium and a magnetic recording head, improving the overall performance of a magnetic data storage system.

Suitable abrasive particles that may be incorporated into a magnetic layer composition for head cleaning include alumina, chromium dioxide, zirconium dioxide, alpha iron oxide, titanium dioxide, silica, silicon carbide, antimony pentoxide, and combinations thereof. In some cases, abrasive particles may have an average major axis length between approximately 2 and 5 times greater than the thickness of magnetic layer 16. In some cases, abrasive particles may have an average major axis length between approximately 50 and 1000 nanometers, such as between approximately 65 and 350 nanometers. In appropriate cases, a combination of different sized particles may be used. As a non-limiting example, abrasive particles with an average major axis length between approximately 150 and 450 nanometers, such as approximately 250 nanometers may be combined with abrasive particles with an average major axis length between approximately 50 and 125 nanometers, such as approximately 70 nanometers. The particles may be combined proportionally or in unequal ratios. For example a ratio of smaller particles to larger particles may be approximately 1-to-1, approximately 3-to-1, approximately 5-to-1, or even approximately 10-to-1.

As will be described in greater detail below, components for a magnetic layer composition, whether selected according to the guidance provided above or selected according to different parameters, may be combined and processed to form a magnetic recording layer.

In the illustrated example of FIG. 1, magnetic recording media 10 includes underlayer 14. Underlayer 14 may provide a smooth surface for forming magnetic layer 16. In turn, a smooth magnetic layer 16 may facilitate higher magnetic bit density, thereby increasing the data storage capacity of magnetic recording media 10. If used, an underlayer composition may include any components that provide a chemically compatible, mechanically stable structure for forming magnetic layer 16. In some examples, however, underlayer 14 may have a formulation and characteristics as described below.

In general, an underlayer composition may include a primary pigment and a binder. Various other additives may be added to the underlayer composition. Together, the constituent components of an underlayer composition may be combined and processed, as will be described, to form underlayer 14. Once formed, underlayer 14 may define a coating surface that magnetic layer 16 can be formed over.

As noted, an underlayer composition generally includes a primary pigment. Suitable primary pigments may include non-magnetic particles, such as iron oxides, titanium dioxide, titanium monoxide, alumina, tin oxide, titanium carbide, silicon carbide, silicon dioxide, silicon nitride, boron nitride, and the like. In some cases, a primary pigment may include an α-iron oxide. In some examples, primary pigment particles may include a coating layer that coats a peripheral surface of the pigment particles. For example, primary pigment particles may be coated with an electro-conductive material such as carbon, tin, or similar materials, which may affect the electromagnetic characteristics of magnetic recording medium 10.

Primary pigment particles may vary in size and may fall within a size distribution arrangement. Further, the size distribution arrangement can be used to calculate an arithmetic average particle size. While primary pigment particles of any size may be used for underlayer compositions of this application, in some examples, an average pigment particle size may be between approximately 35 and 250 nanometers, such as between approximately 50 and 80 nanometers. Regardless, a distribution of particle sizes may be present in the underlayer composition.

Among all components, the primary pigment may comprise between approximately 40 and 90 weight percent of an underlayer composition, such as between approximately 55 and 70 weight percent of an underlayer composition. As used herein, the phrase weight percent refers to the weight of a constituent component relative to total weight of the final underlayer composition, excluding the weight of processing additives and solvents that would normally be removed, for example by evaporation, during the formation of the final underlayer composition.

Aside from a primary pigment, an underlayer composition may include a binder or a combination of binders. In general, any binder that is chemically compatible and the holds underlayer components in a relatively fixed orientation during the service life a magnetic recording medium may be used. In some examples, an underlayer composition may include one or more of a polyurethane resin, a vinyl chloride resin, a vinyl chloride-vinyl acetate copolymer, vinyl chloride-vinyl acetate-vinyl alcohol copolymer, vinyl chloride-vinyl acetate-maleic anhydride, a non-halogenated vinyl copolymer, copolymers of monomers such as (meth)acrylonitrile; a non-halogenated, hydroxyl functional vinyl monomer; a non-halogenated vinyl monomer bearing a dispersing group, and one or more non-halogenated nondispersing vinyl monomers, and combinations thereof. Instead of, or in addition to, the listed binders, an underlayer composition may also a polyurethane binder such as polyester-polyurethane, polyether-polyurethane, polycarbonate-polyurethane, polyester-polycarbonate-polyurethane, polycaprolactone-polyurethane, and combinations thereof. Other resins may be used in addition to, or instead of, the resins listed above. In cases, a resin such as bisphenol-A epoxide, styrene-acrylonitrile, or nitrocellulose may be used as a binder component for the underlayer.

The amount of binder added to the underlayer composition may vary depending on the specific binder material used and the selection of other underlayer components. In some cases, a binder may be between approximately 5 and 25 weight parts per 100 weight parts of primary pigment, such as between approximately 10 and 15 weight parts per 100 weight parts of primary pigment.

An activator or combination of activator components may also be added to an underlayer coating formulation to react and crosslink various underlayer components. In some cases, an activator may contain one or more isocyanate functional groups, such as the activators listed above with respect to the magnetic layer composition. As with other underlayer components, the amount of activator may vary depending on the specific activator selected and the composition of other underlayer components. That being said, an exemplary amount of activator may be between approximately 1 and 6 weight parts per 100 weight parts of primary pigment, such between approximately 2.0 and 4.5 weight parts per 100 weight parts of primary pigment.

Further additives may be incorporated into an underlayer composition to improve the quality or performance of the underlayer. For instance, an underlayer composition may include a carbon black component to reduce the electrical resistivity of a recording surface of a magnetic recording medium. Reduced electrical resistivity of the recording surface may improve compatibility between a magnetic recording medium and commercially available magnetoresistance and giant magnetoresistance heads. Different types of carbon black, such as furnace black, thermal black, and acetylene black, may be incorporated into an underlayer coat formulation. While the amount of carbon black may vary depending, for example, on the specific type of carbon black used and the desired electromagnetic characteristics of a magnetic recording medium, in some examples, an underlayer composition may have between approximately 1 and 25 weight parts of carbon black per 100 weight parts of primary pigment, such as between approximately 3 and 15 weight parts of carbon black per 100 weight parts of primary pigment.

A wetting agent may also be incorporated in an underlayer composition. A wetting agent may reduce the surface tension of an underlayer composition and promote dispersion of constituent underlayer components. In this manner, a wetting agent may improve the dispersion rheology of an underlayer composition. In some examples, a wetting agent may include an acrylate polymer, such as an acrylate block copolymers. When used, a wetting agent may added to an underlayer composition between approximately 1 and 7.5 weight parts per 100 weight parts of primary pigment, such as between approximately 2.5 and 5.5 weight parts per 100 weight parts of primary pigment.

As noted, the underlayer may include further components, such as surfactants, lubricants, and the like. Surfactants that may be incorporated into an underlayer composition include, for example, phenylphosphinic acid (PPiA), 4-nitrobenzoic acid, various other adducts of sulfuric, sulfonic, phosphoric, phosphonic, carboxylic acids, and combinations thereof.

Lubricants may also be incorporated into underlayer 14. After fabrication, the lubricants may migrate to a recording surface of the magnetic recording medium. In this manner, friction can be reduced between a magnetic recording medium and a magnetoresistance head during a data reading or writing operation, resulting in improved electromechanical performance. An exemplary lubricant includes a stearic acid lubricant, for example formed from a butyl stearate fatty acid ester. Further fatty acids that can be used instead of, or in addition to, a stearic acid lubricant, include, for example, myristic acid, palmitic acid, oleic acid, and combinations thereof. An underlayer may also include a fatty acid ester lubricant such as butyl stearate, isopropyl stearate, butyl oleate, butyl palmitate, butylmyristate, hexadecyl stearate, oleyl oleate, and combinations thereof. Other examples of useful lubricants include those selected from the group consisting of silicone compounds such as silicone oils, fluorochemical lubricants, fluorosilicones, and particulate lubricants such as powders of inorganic or plastic materials. If a lubricant or combination of lubricants is used in an underlayer composition, the amount of lubricant may vary based on the number of lubricants employed, the desired performance characteristics of the magnetic recording medium, and the characteristics of the other components selected for the underlayer composition. However, in some cases an underlayer composition may include between approximately 1 and 10 weight parts per 100 weight parts of primary pigment, such as between approximately 3 and 7 weight parts per 100 weight parts of primary pigment.

As will be described, components for an underlayer composition, whether selected according to the guidance provided above or selected according to different parameters, may be combined and processed Forming a magnetic recording medium that includes an underlayer, a magnetic layer, or both an underlayer and a magnetic layer may require multiple processing steps. For example, a traditional process used to make a magnetic recording medium is a wet-on-wet coating process. A weton-wet coating process may sequentially coat an underlayer over a substrate and then coat a magnetic layer over the underlayer. The sequential coating steps may be performed simultaneously or near simultaneously, such that a previously coated layer does not fully dry before a subsequent coating layer is formed over the previously established layer. Examples of coating systems for wet-on-wet coating may include slide coaters with multiple slide blocks, slot coaters, curtain coaters, of the like that deposit an underlayer coating out of a first coating location and then deposit a magnetic layer coating out of a second location. In some cases, a wet-on-wet coating process may be used to form a magnetic recording medium as provided in this disclosure.

While a wet-on-wet coating process may provide manufacturing and cost efficiencies, in some cases, a magnetic recording medium of this disclosure may instead be formed from a wet-on-dry manufacturing process. Traditionally, wet-on-wet coating processes were used under the belief that interlayer mixing and/or diffusion of components from one layer into a different layer did not affect the overall performance of a formed magnetic recording medium. Interlayer interaction, it was believed, was confined to a small region at the interface of the two layers and thus did not deteriorate the electromagnetic characteristics of a magnetic recording medium at a recording surface. While wet-on-wet coating, and the interlayer mixing inherent in such processes, may be sufficient for some cases, in further cases, a magnetic recording medium formed from a wet-on-dry process as provided herein may exhibit improved quality and performance characteristics. For example, reduced interlayer mixing and/or reduced interlayer diffusion as compared to a wet-on-wet formed magnetic recording medium may increase the concentration of magnetic particles at a recording surface of a magnetic medium, thereby providing a higher signal-to-noise ratio and higher data storage capacity for the recording medium. Further, a wet-on-dry coating process may permit additional processing steps to be performed on an underlayer. Processing steps such as calendering, heat-soaking, or the like may result in a higher quality magnetic recording medium. While any magnetic recording medium may exhibit the benefits of a wet-on-dry coating process, in some examples, the benefits may be accentuated in a magnetic recording medium that include one or more thin layers.

As described, the formation of a magnetic recording medium, whether performed using a wet-on-wet coating technique, a wet-on-dry coating technique, or some further technique, may begin with the combination and processing of the constituent components that comprise an underlayer coating formulation. In general, the underlayer constituent components may be combined by mixing the various components together using, for example, a double planetary mixer. Processing solvents such as cyclohexanone, methyl ethyl ketone, toluene, xylene, tetrahydrofuran, methyl isobutyl ketone, methyl amyl ketone, or the like may be added to improve dispersion and mixing of the various components. In addition, the mixture of underlayer components may be deagglomerated using, for example, a sand milling process. Deagglomeration promotes uniform average particle sizes in an underlayer mixture, which may help form a smooth underlayer.

Techniques may then be used to form an underlayer from the resultant underlayer mixture. For example, the underlayer mixture may be spread, sprayed, painted, or otherwise transferred to a substrate. In some examples, an apparatus such a coating system may be used to transfer an underlayer mixture to a substrate. Various coating systems that may be used are known, including slot die coating, extrusion coating, curtain coating, roll coating, gravure coating, bar coating, and the like.

After coating an underlayer mixture over a substrate, the underlayer may be dried to solidify the coated underlayer and to prepare the coated substrate for further processing. In general, an underlayer may be dried any suitable amount before forming a magnetic layer over the underlayer. In the case of a wet-on-wet coating process, for instance, an underlayer may not be dried at all before a magnetic layer is formed over the underlayer. In further cases, however, an underlayer may be at least partially dried to, for example, partially remove processing solvents, partially crosslink underlayer components, or to partially solidify a coated underlayer. In some examples, a drying process may be relatively short to minimize processing time. For example, a coating process may occur in the form of a moving web that is transported relative to one or more generally fixed coating apparatuses. A drying process may simply be air drying as the web moves from a first coating apparatus that coats an underlayer composition to a second coating apparatus that coats a magnetic layer composition. The phrase air drying generally refers to the process of drying a coated layer under substantially ambient conditions. In further cases, a drying process may be more involved. For example, a coated substrate may be allowed to air dry for an extended period of time. In some cases, an underlayer may be allowed to air dry for greater than approximately 5 minutes, such as greater than approximately 15 minutes, or greater than approximately 1 hour, before a magnetic layer is formed over the underlayer.

While air drying may be sufficient in some cases, in some further cases, an underlayer may be subject to enhanced drying conditions before a magnetic layer is formed over the underlayer. Enhanced drying conditions may include changes in temperature, pressure, or even changes in makeup gases that surround a coating layer. For instance, a drying process may involve subjecting an underlayer coating to a temperature greater than 30 degrees Celsius for a period less than approximately two hours, such as a period less than approximately 30 minutes, a period less than approximately 15 minutes, or a period less than approximately 5 minutes. As a specific example, a coating process may occur in the form of a moving web, and the moving web may traverse through a heating element, such as a convention oven, to partially dry or solidify an underlayer coating.

In addition to, or instead of, a regular drying step, an underlayer coating may be subject to a heat-curing process. Heat-curing an underlayer, according to this disclosure, may be an additional processing step beyond the traditional processing steps used to manufacturing a magnetic recording medium. As discussed, a wet-on-wet coating process may generally be used to form a magnetic recording medium. A wet-on-wet process may involve applying an underlayer coating and a magnetic layer coating to a substrate substantially simultaneously. In some additional cases, a wet-on-dry process may be used where an underlayer is dried a limited amount before a magnetic layer is formed over the underlayer. However, heat-curing may be a more involved drying and curing step than has traditionally been used.

Heat-curing may be similar to a regular drying process in that heat-curing may allow an underlayer to dry and solidify. However, heat-curing may involve more intense processing than a regular drying process. For example, heat-curing may involve higher drying temperatures, longer drying times, additional processing steps, or a combination of increased processing variables. As a specific example, heat-curing may involve winding a web-type substrate with an underlayer coating into a roll and then transferring the roll into an oven for extended drying. After drying, the roll may be transferred out of the oven and unwound before a magnetic layer is applied to the heat-cured underlayer. The specific heat-curing temperature and duration of heat-curing may vary based, for example, on the thickness of the underlayer, the material compositions and heat tolerances of the underlayer and substrate, the amount of processing solvent used in the underlayer coating formulation, and other similar variables. In addition, heat-curing temperature and heat-curing duration may be related such that a higher heat-curing temperature may allow for a lower heat-curing duration, or vice versa, as will be appreciated by those of ordinary skill in the art.

In some examples, an underlayer of this disclosure may be heat-cured prior to forming a magnetic layer over the underlayer by subjecting the underlayer to temperatures greater than approximately 35 degrees Celsius, such as greater than approximately 40 degrees Celsius, greater than approximately 50 degrees Celsius, or greater than approximately 75 degrees Celsius. In some additional examples, an underlayer of this disclosure may be a heat-cured prior to forming a magnetic layer over the underlayer by subjecting the underlayer to temperatures less than approximately 125 degrees Celsius, such as less than approximately 100 degrees Celsius, or less than approximately 85 degrees Celsius. For example, an underlayer may be heat-cured prior to forming a magnetic layer over the underlayer by subjecting the underlayer to temperatures between approximately 30 and 80 degrees Celsius, such as approximately 40 and 65 degrees Celsius, or approximately 47.5 and 58.5 degrees Celsius.

In addition, an underlayer may be heat-cured prior to forming a magnetic layer over the underlayer by subjecting the underlayer to heat-curing temperatures for greater than approximately 2 hours, such as greater than approximately 6 hours, greater than approximately 12 hours, greater than approximately 24 hours, or greater than approximately 48 hours. In some examples, an underlayer may be heat-cured prior to forming a magnetic layer over the underlayer by subjecting the underlayer to heat-curing temperatures for less than approximately 120 hours, such as less than approximately 96 hours, less than approximately 72 hours, or less than approximately 48 hours. For example, an underlayer may be heat-cured prior to forming a magnetic layer over the underlayer by subjecting the underlayer to heat-curing temperatures between approximately 4 and 48 hours, such as between approximately 12 and 36 hours, or between approximately 18 and 30 hours.

Heat curing an underlayer, according to this disclosure, may result in a higher quality magnetic recording medium that exhibits increased storage capacity as compared to a magnetic recording medium with an underlayer that is not heat-cured before a magnetic layer is formed over an underlayer. Heat-curing may substantially dry a recently formed underlayer composition by, for example, evaporating residual processing solvents. Residual processing solvents may migrate to a recording surface of a magnetic recording medium, potentially causing surface defects on recording surface that may impact data storage capacity. Residual processing solvents may also promote delamination between an underlayer and a subsequently formed magnetic layer, potentially reducing the service life of a magnetic recording medium or even resulting in the failure of a magnetic recording medium and the loss of data stored on the recording medium. In addition, heat-curing may induce or accelerate crosslinking between activators and reactive functional groups in an underlayer composition, thereby curing and hardening the coating surface defined by the underlayer.

When a magnetic layer is subsequently formed over the hardened coating surface of the underlayer, the formed magnetic recording medium may exhibit reduced interlayer mixing as compared to a magnetic recording medium without a heat-cured underlayer. Reduced interlayer mixing may reduce dilution of the magnetic layer by underlayer components, thereby resulting in a higher concentration of magnetic particles at a recording surface. An increased concentration of magnetic particles at a recording surface may result in an increased number of magnetic bits per square inch of magnetic recording medium, thus increasing the storage capacity of the magnetic recording medium.

Regardless of whether an underlayer is heat cured prior to forming a magnetic layer over the underlayer, in appropriate cases, an underlayer may be calendered prior to forming the magnetic layer over the underlayer. Calendering may smooth the underlayer coating surface, which in turn may translate into a smooth magnetic layer recording surface and/or a smooth interface between a magnetic layer and an underlayer. A smooth magnetic layer recording surface may permit a decreased head-to-tape separation, and increased magnetic bit density, thereby increasing the storage capacity of the magnetic recording medium.

In general, an underlayer may be calendered using one or more in-line calendering apparatuses, one or more off-line calendering apparatuses, or a combination of both. An in-line calendering apparatus may be used when a magnetic recording medium is manufactured on moving web that is transported relative to one or more generally fixed piece of processing equipment. The web may be traversed through the one or more calendering apparatuses as part of a continuing manufacturing process, and thus may be referred to as in-line calendering. By contrast, when calendering occurs outside of a continuous manufacturing line, calendering may be referred to as off-line calendering.

Regardless of whether calendering occurs in-line or off-line, calendering may include compliant-on-steel (COS) calendering, steel-on-steel (SOS) calendering, or combinations of both COS and SOS calendering. COS calendering may employ one or more nip stations having a steel or other generally non-compliant roller that contacts the coating surface of an underlayer and a rubberized or other generally compliant roller that applies pressure to a backside of the underlayer (e.g., contacts a substrate that the underlayer is formed over). By contrast, SOS calendering may employ one or more nip stations that have generally non-compliant (e.g., steel) rollers that contact both a coating surface of the underlayer and backside of the underlayer.

Calendering effectiveness may vary based, for example, on the temperature of the calendering operation, the nip pressure, the number of nips, or the dwell time in the calender nips. In some cases, one or more calendering rollers may heated to, for example, make the underlayer coating surface more pliable, thereby increasing the smoothing effect achieved by the calendering operation. For example, calender roll face temperatures may heated to a temperature that is higher than a glass transition temperature (Tg) of the front-side coatings of a magnetic recording medium to be calendered, where the term front-side coatings refers to all coatings that are formed over the surface of a substrate that includes a magnetic layer (e.g., the combined glass transition temperature of the underlayer and magnetic layer in FIG. 1). In some examples, calender roll face temperatures may be greater than or equal to approximately 20 degrees Celsius above the glass transition temperature of the front-side coatings of a magnetic recording medium, such as a temperature greater than or equal to approximately 30 degrees Celsius above the glass transition temperature of the front-side coatings of a magnetic recording medium. In further examples, absolute calendering roll face temperatures may be greater than approximately 50 degrees Celsius, such as greater than approximately 100 degrees Celsius, or greater than approximately 150 degrees Celsius.

As noted, calendering effectiveness may vary based on factors other than temperature. Hence, a normalized value that captures multiple parameters of calendering can be useful to characterize a calendering operation. One type of value that captures different calendering variables (e.g., nip pressure, total number of nips, line speed (i.e. dwell time in the nips)) is pressure-to-velocity ratio. The pressure component of the ratio can be calculated by calculating the force applied in each nip per unit length across a calendered article. The pressure per unit length can then be totaled for all nips in a calendering apparatus. This pressure component may have units of "pounds per linear inch", or pli. Further, the pressure component can be divided by the transport speed an article moves through a calendar apparatus (e.g., in feet per minute, or fpm). This calculation returns a normalized pressure-to-velocity ratio (P/v) ratio, which may be in units of pli/fpm.

In some examples, an underlayer of this disclosure may be calendered with a pressure-to-velocity ratio less than approximately 50 pli/fpm, such as less than approximately 25 pli/fpm, less than approximately 15 pli/fpm, less than approximately 10 pli/fpm, or less than approximately 5 pli/fpm. In additional examples, an underlayer may be calendered with a pressure-to-velocity ratio greater than approximately 0.5 pli/fpm, such as greater than approximately 2.5 pli/fpm, or greater than approximately 5 pli/fpm. For example, an underlayer may be calendered with a pressure-to-velocity ratio between approximately 1.5 and 10 pli/fpm, such as between approximately 3 and 7.5 pli/fpm, or between approximately 4 and 6 pli/fpm. The pressure-to-velocity ratios listed above may be applied with a calender roller that has a roll face temperature greater than or equal to approximately 30 degrees Celsius above the glass transition temperature of the front-side coatings of a magnetic recording medium to be calendered.

While some magnetic recording media may exhibit improved quality when an underlayer is calendered prior to forming a magnetic layer over the underlayer, in other cases, other types of magnetic recording media may exhibit improved electromagnetic performance if no calendering is applied to the underlayer prior to forming a magnetic layer over the underlayer. For example, some magnetic recording media may exhibit broad band signal-to-noise ratio improvements greater than approximately +0.25 decibels, such as greater than approximately +0.75 decibels, or greater than approximately +1.0 decibels without underlayer calendering as compared to when the same recording media is formed by calendering the underlayer with a pressure-to-velocity ratio of approximately 12.9.

When used, an underlayer may be calendered at any suitable point in a manufacturing process. For example, an underlayer may be calendered after the underlayer is formed and dried but prior to any underlayer heat-curing step. Alternatively, an underlayer may be formed, heat-cured, and then calendered. Calendering after heat-curing may be beneficial because a heat-curing process may cure an underlayer and relieve residual stress in the underlayer, thus limiting the amount that an underlayer may deform after calendering. In additional cases, an underlayer may be calendered multiple times during the manufacturer of a magnetic recording medium. For instance, an underlayer may be calendered after formation and drying, after formation and heat soaking, or an underlayer may be calendered as part of one or more calendering steps performed on a magnetic recording medium after a magnetic layer is formed over the underlayer.

In general, after an underlayer is formed over a substrate and suitably processed, a magnetic layer is formed over the underlayer. Magnetic layer formation may begin by selecting desired components for a magnetic layer composition. The constituent components can then be combined together and processed to form the magnetic layer. Any suitable processes may be used to combine, react, and disperse the components of a magnetic layer composition. For example, constituent magnetic layer components may be combined, mixed, and dispersed to create a magnetic layer using the tools and techniques discussed above with respect formation of the underlayer.

However, in some examples, one or more constituent components of a magnetic layer may benefit from enhanced processing. As an example, some types of magnetic particles may aggressively agglomerate and create discontinuities in an otherwise substantially homogeneous magnetic layer composition. Individual platelet-shaped magnetic particles or low aspect ratio magnetic particles, for instance, may exhibit a tendency to agglomerate into larger particles comprised of multiple individual particles. These particles may exhibit agglomeration tendencies because platelet-shape particles and low aspect ratio particles may have higher surface areas than comparable spherical or acicular particles. Higher surface areas may increase the probability that individual particles will contact and adhere together, thus creating an agglomerated particle. Further, some magnetic particles may exhibit a magnetic pole perpendicular to a major surface, such as a platelet surface, and the magnetic poles between different magnetic particles may align to create magnetic particle-to-particle contact affinity.

Regardless of the specific mechanism driving particle agglomeration, in some cases, an enhanced deagglomeration process may be usefully employed when creating a magnetic layer composition. While any suitable deagglomeration process may be used, in some examples, magnetic particles may be milled to promote particle surface wetting and uniform particle distribution. One type of milling process that may be used is a sand milling process. Magnetic particles may be combined together with appropriate solvents, binders, additives, and the like using, for example, a double planetary mixer, to form a colloidal dispersion. The dispersion may then be subject to high shear forces by, for example, pumping the dispersion through a highly agitated bed of inert beads. The shear forces may break agglomerated groups of magnetic particles into individual magnetic particles, thus creating a substantially uniform distribution of magnetic particles.

Different characterization techniques may be used to determine the appropriate amount of milling required to create a substantially uniform distribution of magnetic particles. For example, a magnetic layer composition may be visually inspected to determine magnetic particle homogeneity and deagglomeration. Further, microscope instruments, such as a scanning electron microscope, atomic force microscope, or the like may be usefully employed to detect magnetic particle deagglomeration. In additional cases, magnetic particle deagglomeration may be identified through bulk electromagnetic characteristics exhibited by the magnetic particle dispersion or a subsequently formed magnetic recording medium.

An example of an electromagnetic characteristic that may be indicative of magnetic particle deagglomeration is magnetic squareness. The term squareness as used herein refers to the ratio of remanent moment to saturation moment for a magnetic material, which may be measured using a vibrating-sample magnetometer (VSM) with a defined saturation field of 10,000 Oersted. The remanent moment and saturation moment parameters for a magnetic material may be observed on a magnetic hysteresis curve. A hysteresis curve defines how a magnetic material can be magnetically oriented or reoriented in response to application and removal of magnetic fields. FIG. 3 is a schematic drawing of an example hysteresis curve. In the example, remanent moment, $m_r$, refers to the magnetization that remains in a magnetic material after saturation in a strong magnetic field, while saturation moment, $m_s$, refers to the magnetization in the magnetic material when saturated. In addition, coercivity, $H_c$, refers to the field strength applied to a magnetic material after saturation with a strong field in the opposite direction that is just sufficient to reduce the moment, m, to zero. FIG. 3 also illustrates switching field distribution (SFD), which is a measure of the interval of magnetic field strength over which a given magnetization can be completely reversed, normalized by the coercivity, $H_c$. SFD is typically measured as the full width, w, of a hysteresis curve at half the maximum value of the peak that is calculated by differentiating the hysteresis curve with respect to magnetic field, H.

Magnetic squareness is identified in the example hysteresis curve of FIG. 3 by the ratio of remanent moment, $m_r$, to saturated moment, $m_s$ (i.e., $m_r/m_s$). In some cases, a higher squareness value indicates less magnetic particle agglomeration than a corresponding magnetic material with a lower squareness value. While FIG. 3 identifies the general location of different hysteresis parameters, the curve is only provided for illustration of a general case of squareness and is not intended to represent the hysteresis plot for any particular material contemplated herein.

A hysteresis curve for a magnetic material can be measured in any direction of a magnetic material. For example, a hysteresis curve can be measured in a direction parallel to a recording surface a magnetic recording medium (e.g., a direction parallel to the direction a substrate is transported in a web manufacturing process), perpendicular to a recording surface of a magnetic recording medium (i.e., in the Z direction indicated in FIG. 1), or crosswise to a recording surface of a magnetic recording medium (i.e., in the X direction indication in FIG. 1). Further, squareness values can be determined for each hysteresis curve measured in each different direction. In general, an increased squareness value in one direction (e.g., perpendicular to the surface of a magnetic recording medium) correlates with a decreasing squareness in another direction (e.g., parallel to the surface of the magnetic recording medium), and vice versa. Consequently, a higher squareness value measured in a direction parallel to a magnetic recording medium may correlate with decreased magnetic particle agglomeration while a lower squareness value measured in a direction perpendicular to the magnetic recording medium may also correlate with decreased magnetic particle agglomeration.

As described, the squareness of a magnetic material may vary depending, for example, on the orientation of magnetic particles in the material or the orientation of the material itself One orientation of squareness is along a long axis of a recording medium, such as an axis parallel to a length of magnetic tape or an axis parallel to the direction a substrate is transported in a web manufacturing process. Hence, this type of squareness may be referred to as a longitudinal squareness. A hysteresis curve may be determined by measuring the magnetic characteristics exhibited by the medium when the medium is oriented in the described longitudinal arrangement. A squareness value may subsequently be calculated based on the determined hysteresis curve. According to this disclosure, a magnetic recording medium formed and dried in the absence of any applied magnetic field (e.g., the magnetic layer is formed over the underlayer and dried without applying an orienting magnetic field to wet magnetic particles) may exhibit a longitudinal squareness value less than or equal to approximately 0.75, such as less than or equal to approximately 0.50, less than or equal to approximately 0.4, or less than or equal to approximately 0.30. In some examples, a magnetic recording medium formed and dried in the absence of any applied magnetic field may exhibit a longitudinal squareness value greater than or equal to approximately 0.10, such as greater than or equal to approximately 0.175, or greater than or equal to approximately 0.25. For example, a magnetic recording medium formed and dried in the absence of any applied magnetic field may exhibit a longitudinal squareness value between approximately 0.15 and 0.55, such as between approximately 0.25 and 0.40, or between approximately 0.30 and 0.375.

Squareness values, as noted, may vary based on the orientation of a medium when a hysteresis curve is measured. Accordingly, a formed magnetic recording medium may be characterized by the maximum squareness value exhibited by the medium. That is, a formed magnetic recording medium may exhibit a maximum squareness value that is independent of the direction in which squareness in measured (e.g., a squareness value measured in any direction). In some examples, a magnetic recording medium formed and dried in the absence of any applied magnetic field may exhibit a maximum squareness value less than or equal to approximately 0.8, such as less than or equal to approximately 0.65, or less than or equal to approximately 0.5. In some additional examples, a magnetic recording medium formed and dried in the absence of any applied magnetic field may exhibit a maximum squareness value greater than or equal to approximately 0.15, such as greater than or equal to approximately 0.6, or greater than or equal to approximately 0.8. For example, a magnetic recording medium formed and dried in the absence of any applied magnetic field may exhibit a maximum squareness value between approximately 0.175 and approximately 0.95, such as between approximately 0.25 and approximately 0.70, or between approximately 0.35 and approximately 0.60. Some magnetic recording media may exhibit a longitudinal squareness value that is a maximum squareness value.

As described herein, squareness may be a characteristic of both a magnetic particle dispersion and a formed magnetic recording medium. Further, dispersion milling may affect magnetic particle deagglomeration which, in turn, may affect the specific squareness values exhibited by a magnetic particle dispersion and/or a magnetic recording medium formed from a particle dispersion. The amount of magnetic particle milling required to form a magnetic recording medium that exhibits a given squareness value may vary depending on different factors. For example, the specific components and magnetic particles selected for the magnetic layer composition, the geometry and process parameters of the specific milling apparatus, and the specific squareness value targeted may all affect milling requirements. In some cases, iterative trials may be conducted using a given magnetic layer composition and a given milling apparatus to determine the appropriate amount of magnetic particle milling required to achieve a formed magnetic recording medium that exhibits a specific squareness value.

When appropriate, a portion of a magnetic particle dispersion may be sampled during a milling process to evaluate a characteristic of squareness. The sample may be applied to a test substrate and dried in the absence of an applied magnetic field. For example, a sample of a magnetic particle dispersion may be spread on a polymeric substrate using, for example, a sampling knife The sample may then be evaluated to determine a characteristic indicative of squareness, such a characteristic indicative of maximum squareness. In some examples, the characteristic may be determined for a sample and compared to previously established data that correlate the characteristic to squareness. In some cases, the characteristic may be a physical property of the dispersion. In additional cases, the characteristic may be a characteristic of a hysteresis curve.

After a magnetic particle dispersion is milled, as necessary, and a magnetic layer is formed over a substrate, the magnetic particles in the magnetic layer may be oriented in an applied magnetic field. As an example, magnetic particles in a wet magnetic layer may be oriented by traversing the magnetic layer through an applied magnetic field formed by one or more electrical coils, one or more permanent magnet, or a combination of both. In some cases, one or more of the electrical coils may comprise a solenoid. The magnetic particles may assume a longitudinal magnetic anisotropy or a perpendicular magnetic anisotropy through directional control of the applied magnetic field. When assuming a longitudinal anisotropy, the magnetic anisotropy may extend parallel to the plane of the medium. In other words, the magnetic orientation of individual magnetized regions may be generally parallel to the recording surface of the medium. In a perpendicular anisotropy, on the other hand, magnetic anisotropy may be perpendicular to the plane of the medium. In other words, the magnetic orientation of individual magnetized regions may be perpendicular to the recording surface of the medium.

In general, a magnetic field of any suitable strength appropriate to achieve a specific magnetic orientation may be applied. Factors that may affect a choice of magnetic field strength include, for example, the types magnetic particles in the magnetic layer, the additional types of components in the magnetic layer composition, and the specific equipment used to apply a magnetic field. In some examples, magnetic field strength may be correlated to squareness values, which are discussed above, and an applied magnetic field may be adjusted to achieve a specific squareness value. For example, a magnetic layer may be conditioned with an applied magnetic field until the magnetic layer exhibits a longitudinal squareness greater than approximately 0.25, such as greater than approximately 0.5, or greater than approximately 0.65. In additional examples, a magnetic layer may be conditioned with an applied magnetic field until the magnetic layer exhibits a longitudinal squareness less than approximately 0.9, such as less than approximately 0.75, or less than approximately 0.45. For example, a magnetic layer may be conditioned with an applied magnetic field until the magnetic layer exhibits a longitudinal squareness between approximately 0.35 and 0.85, such as between approximately 0.45 and 0.65, or between approximately 0.475 and 0.525.

A magnetic field may be applied to a magnetic layer at any suitable point in a manufacturing process or even at multiple points in a manufacturing process. For example, a magnetic field may be applied while a magnetic layer is still wet to allow magnetic particles to rotate within the layer. After being controllably rotated, the magnetic particles may exhibit an appropriate magnetic anisotropy. In some cases, a magnetic field may be applied shortly after a magnetic layer is formed over a substrate. For example, when a magnetic recording medium is manufactured by coating a magnetic layer over a moving web, a magnetic field may be applied shortly after the web exits the coating apparatus that applies the magnetic layer. By applying a magnetic field before the magnetic layer has settled and started to dry, magnetic particles within the magnetic layer may be more susceptible to rotation and magnetic alignment. As a result, a formed magnetic recording medium may exhibit a stronger and more uniform magnetic anisotropy, which may increase the number of magnetic bits available on the formed magnetic recording medium for storing data. In some cases, a magnetic field may be applied to a magnetic recording medium less than or equal to approximately 10 seconds after a magnetic layer is coated onto a substrate, such as less than or equal to approximately 1 second, less than or equal to approximately 0.5 seconds, or less than or equal to approximately 0.25 seconds. In additional cases, a magnetic field may be applied to a magnetic recording medium greater than or equal to approximately 0.1 seconds after a magnetic layer is coated onto a substrate, such as greater than or equal to approximately 0.3 seconds. For example, a magnetic field may be applied between approximately 0.15 and 2.25 seconds after a magnetic layer is coated onto a substrate, such as between 0.20 and 0.85 seconds, or between approximately 0.30 and 0.50 seconds.

In addition to, or instead of, a magnetic field applied shortly after a magnetic layer is coated on the substrate, one or more magnetic fields may be applied later in a magnetic recording medium manufacturing process. For example, one or more magnetic fields may be applied greater than approximately 10 seconds after a magnetic layer composition is applied to a substrate, such as greater than approximately 30 seconds. The later applied magnetic field may function, for example, to magnetically orient magnetic particles in a magnetic layer or to accentuate a previously established magnetic anisotropy.

When used, a magnetic field may be applied in any direction and at any strength appropriate to achieve a desired magnetic anisotropy. For example, when a moving web coating process is used, an applied magnetic field direction may coincide with the direction of the moving web. That is, the applied magnetic field may be parallel to the direction of the web. In other cases, a magnetic field may be angled relative to the direction of the web, such as perpendicular to the direction of the web or acutely angled relative to the direction of the web. Regardless of the direction of the magnetic field, the field strength required to achieve a substantially uniform magnetic anisotropy may vary based, for example, on the composition of a magnetic layer, the thickness of the magnetic layer, and the amount of time the magnetic layer resides within the magnetic field. In some examples, a magnetic field strength between approximately 3000 and approximately 5000 gauss may be applied to a magnetic layer.

While a magnetic layer may be conditioned with an applied magnetic field to achieve a magnetic anisotropy, in other cases, a magnetic recording medium may be constructed without applying an external magnetic field to a magnetic layer. For example, magnetic particles in a magnetic recording medium may exhibit a random orientation, resulting in a magnetically isotropic recording medium. In further cases, magnetic particles within a magnetic layer may naturally assume a specific magnetic anisotropy without the application of an external field. Fluid forces within a magnetic layer, for instance, may naturally align the magnetic particles during the coating and drying process to achieve a magnetically anisotropic recording medium. This phenomenon may be exhibited with some platelet-shaped or low aspect ratio shaped particles that may naturally assume a perpendicular anisotropy. By allowing fluid forces to magnetically align a plurality of magnetic particles, a magnetic recording medium may be easier to manufacture.

After a magnetic layer is formed over a substrate and optionally magnetically oriented, the magnetic layer may be subject to further processing steps. For example, the substrate coated with a magnetic layer may be dried and heat-cured similar to the process described above with respect to the underlayer. Heat-curing may induce or accelerate crosslinking between activators and reactive functional groups in the magnetic layer. Further, heat-curing may relax residual stress in the entire magnetic recording medium to prevent later curling or warping of the medium. As examples, a magnetic recording medium, such as a wound roll of magnetic tape, may be heat-cured by placing the recording medium in an environment greater than approximately 45 degrees Celsius, such as greater than 55 degrees Celsius, for a period greater than approximately 12 hours, such as a period of approximately 48 hours.

In addition, the magnetic layer may be calendered similar to the calendering step discussed above with respect to the underlayer. Calendering may smooth the magnetic recording surface of the magnetic recording medium to reduce data-error rates in subsequent use. In some examples, a magnetic layer may be calendered with a pressure-to-velocity ratio less than approximately 25 (pounds per linear inch)/(foot per minute) (hereinafter, "pli/fpm"), such as less than approximately 10 pli/fpm, or less than approximately 7.5 pli/fpm. In additional examples, a magnetic layer may be calendered with a pressure-to-velocity ratio greater than approximately 0.5 pli/fpm, such as greater than approximately 2.5 pli/fpm, or greater than approximately 5 pli/fpm. For example, a magnetic layer may be calendered with a pressure-to-velocity ratio between approximately 1.5 and 10 pli/fpm, such as between approximately 3 and 7.5 pli/fpm.

When appropriate, additional processing steps as will be appreciated by those skilled in the art may be implemented during the manufacturing process of a magnetic recording medium. For instance, a magnetic recording medium may include a backing layer that is formed over a substrate opposite the side of the substrate that the magnetic layer is formed over. As a consequence, a processing step during the manufacture of a magnetic recording medium may include forming a backing layer over a substrate, such as attaching a backing layer or coating a backing layer coating formulation on the substrate. A backing layer may be formed over a substrate prior to forming an underlayer or magnetic layer over the substrate, after forming the underlayer or magnetic layer over the substrate, or even as an intermediate step, such as between forming the underlayer and magnetic layer. Other processing steps may also be used to manufacture a magnetic recording medium. Exemplary steps may include slitting, burnishing, wiping, degaussing, servo pattern writing, spooling, and the like.

A variety of different example processing steps have been described in relation to the manufacture of a magnetic recording medium that includes an underlayer, a magnetic layer, or a magnetic layer and an underlayer. Each of the described processing steps may be used singly or in combination.

Figure 4:
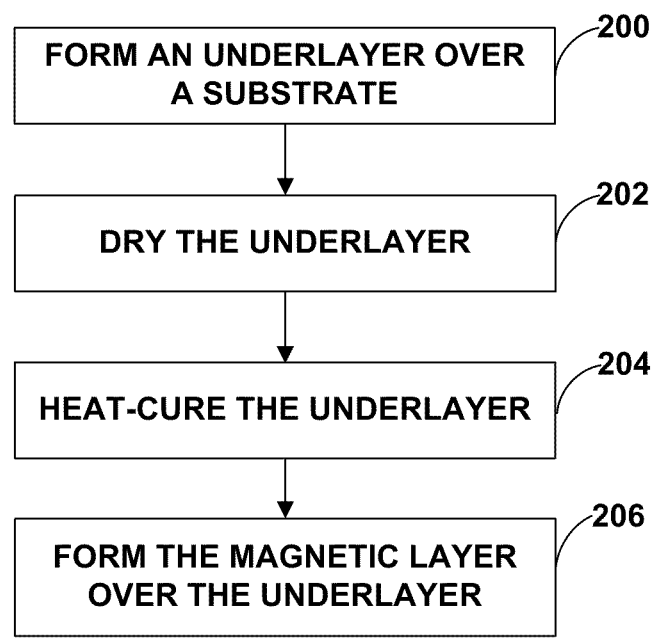
FIG. 4 is a flow diagram illustrating an example process that may be used to form a magnetic recording medium of this disclosure.

FIG. 4 is a flow diagram illustrating an exemplary process that may be used to form a magnetic recording medium according to this disclosure. According to the example process, a manufacturer obtains a substrate and forms an underlayer over the substrate (200). The underlayer may have a composition as described herein or a different composition. Regardless, the underlayer may be formed over the substrate by coating a wet underlayer composition on the substrate. After forming the wet underlayer, the manufacturer dries the underlayer (202). The underlayer may be air dried or more intensively dried, such as through the application of heat or changes in pressure. After sufficiently drying the underlayer, the manufacturer heat-cures the underlayer (204). As described, heat-curing can solidify the underlayer, crosslink chemical components in the underlayer, and even remove residual solvents in the underlayer. Heat-curing may involve winding the underlayer into a roll, transporting the roll into an oven, and heating the roll for an extended period of time, such as greater than 24 hours. After removing the underlayer from the heat-curing process, the manufacturer forms a magnetic layer over the underlayer. Similar to the process of forming the underlayer, the magnetic layer may be wet coated from a magnetic layer composition. The magnetic layer composition may have a composition as described herein or a different composition. Regardless, by following the process illustrated in FIG. 4, a manufacturer may create a magnetic recording medium with an increased concentration of magnetic particles at a recording surface and fewer recording surface defects as compared to a magnetic recording medium created using a standard wet-on-wet coating process.

Figure 5:
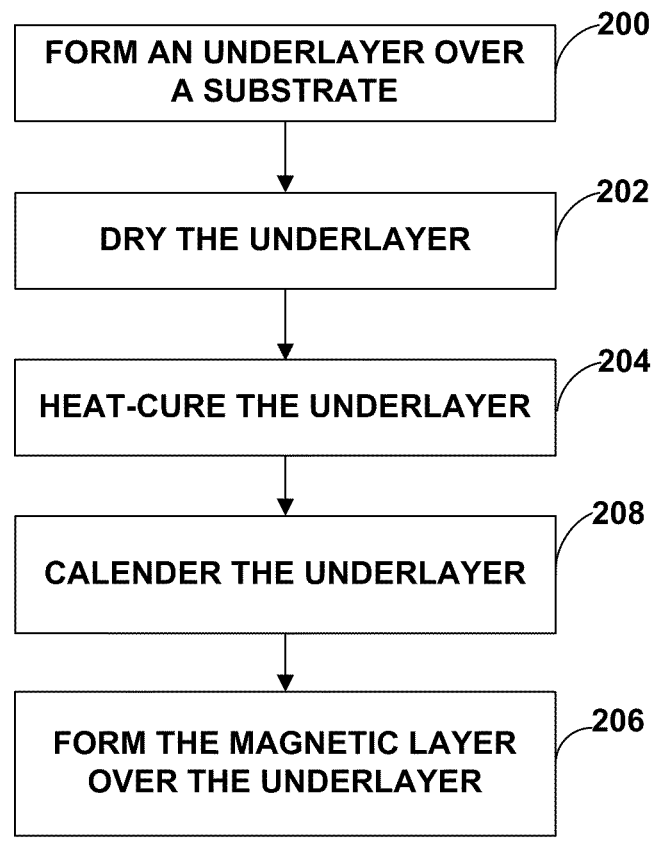
FIG. 5 is a flow diagram illustrating another example process that may be used to form a magnetic recording medium.

While the example of FIG. 4 provides a combination of processing steps as described herein, additional combinations may be readily employed. For example, FIG. 5 is a flow diagram illustrating another exemplary process that may be used to form a magnetic recording medium. In the example of FIG. 5, processing steps similar to processing steps already described in relation to FIG. 4 are indicated with like reference numerals. In the example of FIG. 5, a manufacture forms an underlayer over a substrate (200), dries the underlayer (202), and heat-cures the underlayer (204). Unlike the process illustrated in FIG. 4, however, a manufacturer in the process of FIG. 5 also calenders the underlayer (208). While calendering may occur before a heat-curing process in addition to, or instead of, occurring after a heat-curing process, in the illustrated example calendering is shown after a heat-curing process. As noted, calendering can smooth the underlayer, and a smooth underlayer can lead to a smooth magnetic layer, which in turn may result in a magnetic recording medium that exhibits fewer data writing errors than a comparatively rougher magnetic layer. Additionally, the manufacturer forms the magnetic layer over the underlayer to create a magnetic recording medium (206). By following the process illustrated in FIG. 5, a manufacturer may create a smooth magnetic recording medium that exhibits increased data storage capacity and fewer data writing errors as compared to a magnetic recording medium created using a standard wet-on-wet coating process.

Figure 6:
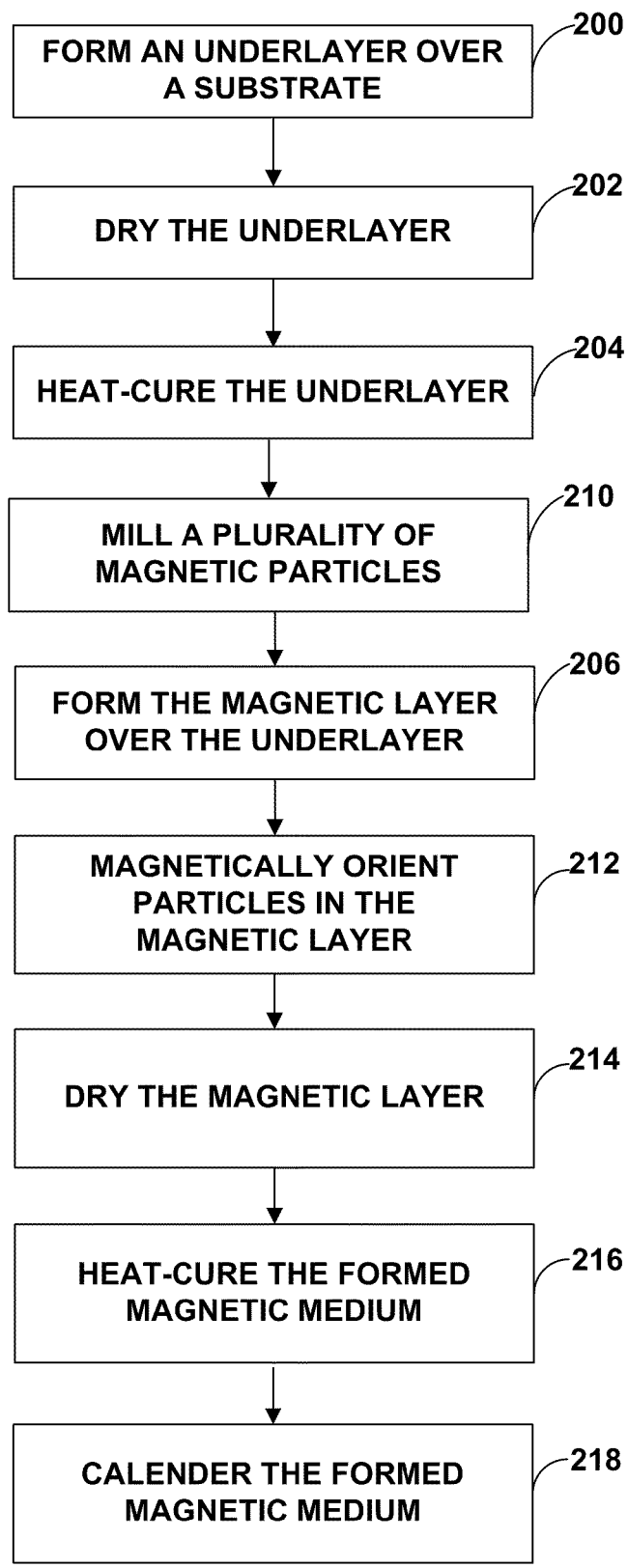
FIG. 6 is a flow diagram of another example process that may be used to form a magnetic recording medium.

A magnetic recording medium as provided herein may be manufactured using additional or different processing steps. For example, FIG. 6 is a flow diagram of a further exemplary process that may be used to form a magnetic recording medium. As with the previous example, processing steps similar to those processing steps already described are indicated with like reference numerals. In the example of FIG. 6, a manufacture forms an underlayer over a substrate (200), dries the underlayer (202), and heat-cures the underlayer (204). In addition, the manufacturer mills a plurality of magnetic particle in preparation for forming a magnetic layer composition (210). The manufacturer may mill the plurality of magnetic particles so that a magnetic recording medium formed without the use of magnetic orienting fields exhibits a specific longitudinal squareness value, such as less than or equal to approximately 0.40. If the manufacturer is using certain magnetic particles, such as platelet-shaped particles or low aspect ratio shaped particles, the manufacturer may need to mill the plurality of magnetic particles significantly longer than comparative needle-shaped particles, such as three to five times longer when using similar milling equipment. After milling the plurality of magnetic particles and preparing a magnetic layer composition, the manufacturer forms the magnetic layer over the underlayer (206). The manufacturer may then magnetically orient the particles in the magnetic layer (212), when, for example, the magnetic layer is still wet. Magnetic orientation may produce a magnetic recording medium that exhibits a perpendicular magnetic anisotropy or a longitudinal magnetic anisotropy. The manufacturer may further dry the magnetic layer after suitably orienting the plurality of magnetic particles in the magnetic layer (214). Similar to the process of drying the underlayer (202), the magnetic layer may be air dried or more intensively dried, such as through the application of heat or changes in pressure.

Subsequent to drying the magnetic layer, the formed magnetic recording medium in the example of FIG. 6 is subject to additional processing steps. For example, the manufacturer may heat-cure the formed magnetic recording medium (216). Heat-curing, as described herein, may crosslink chemical components in the magnetic layer, may remove residual solvents from the magnetic layer, and may also release residual stress from magnetic recording medium. As illustrated, the process of heat-curing the formed magnetic recording medium (216) is in addition to the antecedent step of heat-curing the underlayer (204), which occurs prior to forming the magnetic layer over the underlayer. Similar to the process of heat-curing the underlayer, heat-curing the magnetic recording medium may involve winding the magnetic recording medium into a roll, transporting the roll into an oven, and heating the roll for an extended period of time, such as greater than 24 hours. In addition, the manufacturer calenders the formed magnetic recording medium (218). While calendering may occur before heat-curing (216) in addition to, or instead of, occurring after heat-curing (216), in the illustrated example of FIG. 6, calendering is shown after heat-curing (216). Calendering may smooth the recording surface of the formed magnetic recording medium, thus presenting a smoother surface for subsequent data reading and writing operations. By following the process illustrated in FIG. 6, a manufacturer may create a high performance magnetic recording medium that exhibits increased data storage quality and capacity as compared to a magnetic recording medium created using a standard wet-on-wet coating process.

A magnetic recording medium constructed in accordance with this disclosure may exhibit a number of desirable physical characteristics. To begin, a magnetic recording medium of this disclosure may exhibit reduced interlayer mixing, such as reduced mixing between an underlayer and magnetic layer. In the example of FIG. 1, underlayer 14 is formed over substrate 12. Further, magnetic layer 16 is formed over underlayer 14. Although underlayer 14 and magnetic layer 16 are illustrated as having well defined boundaries including, for example, a sharp interface between magnetic layer 16 and underlayer 14, in practice, the interface boundaries between the different layers of a standard magnetic recording medium may not so well defined. As discussed above, magnetic recording media are traditionally formed using a wet-on-wet coating process. A wet-on-wet coating process may involve coating different layers of a magnetic recording medium substantially simultaneously or in such close temporal proximity that a first coated layer is not fully cured before a second coated layer is wet coated over the first coated layer. A wet-on-wet coating process may result in a magnetic recording medium without a well-defined interface between an underlayer and a magnetic layer. Underlayer components may diffuse into an area defined as the magnetic layer. Further, magnetic components may diffuse into an area defined as the underlayer. In some cases, underlayer components may even migrate to a recording surface of a magnetic recording medium, occupying valuable surface area that may otherwise be used to store magnetically oriented data.

A magnetic recording medium formed using a wet-on-dry process, in accordance with this disclosure, may exhibit reduced interlayer component diffusion. A magnetic recording medium with reduced interlayer component diffusion may exhibit increased data storage capacity and improved electromagnetic quality characteristics as compared to a magnetic recording medium with more pronounced interfacial mixing. For example, reduced interlayer mixing may reduce magnetic particle dilution by underlayer components. A more concentrated magnetic layer may have more magnetic particles at a recording surface, which may result in more magnetic bits for storing data.

Figure 7:
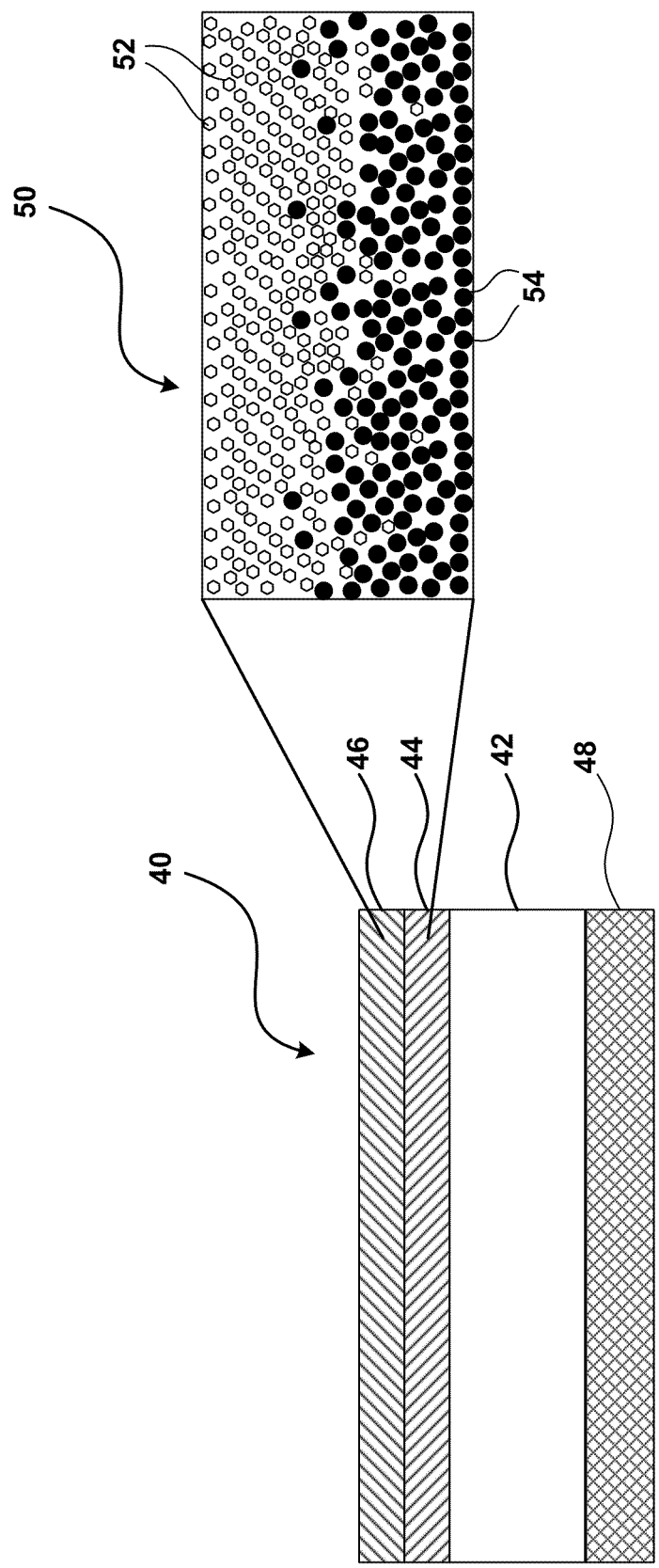
FIG. 7 is a cross-sectional schematic of an example magnetic recording medium with an exploded view of an interfacial mixing region between a magnetic layer and an underlayer.

FIG. 7 is a cross-sectional schematic of an example magnetic recording medium 40 with an exploded view of an interfacial mixing region 50. In the illustrated example, magnetic recording medium 40 includes substrate 42. An underlayer 44 is formed over substrate 42. Underlayer 44 contacts substrate 42 on one surface and defines a coating surface on an opposite surface. A backing layer 48 may be formed over a side of substrate 42. In addition, magnetic layer 46 is formed over the coating surface defined by underlayer 44.

Although underlayer 44 may be described as defining a coating surface over which magnetic layer 46 may be formed, as noted above, components from the magnetic layer (e.g., magnetic particles) and/or components from the underlayer (e.g., underlayer particles) may migrate through the defined coating surface during formation of the magnetic recording medium. Because of this phenomenon, the interface between magnetic layer 46 and underlayer 44 may, in some case, be characterized as defining a mixing zone of magnetic particles and underlayer particles. FIG. 7 illustrates an example of such a mixing zone. Mixing zone 50 is an exploded conceptual view of the interface between magnetic layer 46 and underlayer 44. Mixing zone 50 includes a plurality of underlayer particles 54. Mixing zone 50 also includes a plurality of magnetic particles 52. The plurality of magnetic particle 52 are intermixed with the plurality of underlayer particles 54 within a portion of the illustrated mixing zone 50. Although mixing zone 50 is illustrated and described with discrete magnetic particles and discrete underlayer particles, it should be appreciated that any magnetic layer components may intermix with any underlayer components. In some examples, a component or combination of components may not define a definite particle shape.

Mixing zone 50 may exhibit different concentration distributions or different concentration gradients. In some cases, mixing zone 50 may exhibit a uniform concentration gradient, for example a liner gradient, between a high concentration of the plurality of magnetic particles 52 on one side and a high concentration of the plurality of underlayer particles 54 on the other side. In some further cases, mixing zone 50 may exhibit an asymmetrical distribution between the plurality of magnetic particles 52 and the plurality of underlayer particles 52. For example, mixing zone 50 may exhibit one or more concentration peaks of the plurality of magnetic particles 52, the plurality of underlayer particles 54, or both.

Any suitable analytical technique may be used to measure the size of a mixing zone and the concentrations of different components within the defined mixing zone. As an exemplary technique, a mixing zone may be characterized using TEM-EDS, which is energy dispersive spectroscopy (EDS) imaging of magnetic particles from transmission electron microscopy (TEM) cross sections. According to this exemplary technique, a magnetic recording medium may be exposed on a cross-sectional plane (e.g., the Z-X plane illustrated in FIG. 1) by, for example, cutting the medium transversely. A medium sample between approximately 30 nanometers and approximately 80 nanometers thick (i.e., in the Y direction illustrated in FIG. 1) may be used for TEM analysis. A TEM probe may be traversed across the different layers on the exposed cross section beginning, for example, at the recording surface and working in an orthogonal direction away from the recording surface. Spectroscopy imaging results may then indicate a concentration of magnetic particles within a given area of the recording medium, and a mixing zone and/or different concentrations of components within different planes of the medium may be identified. As an example, TEM-EDS characterization on a magnetic recording medium that includes barium ferrite particles may involve identifying different concentrations of barium atoms and then determining concentrations of magnetic particles from the concentrations of barium atoms. Similarly, TEM-EDS characterization on a magnetic recording medium that includes metal particles that include cobalt may involve identifying different concentrations of cobalt atoms and then determining concentrations of magnetic particles from the concentrations of cobalt atoms.

Figure 8:
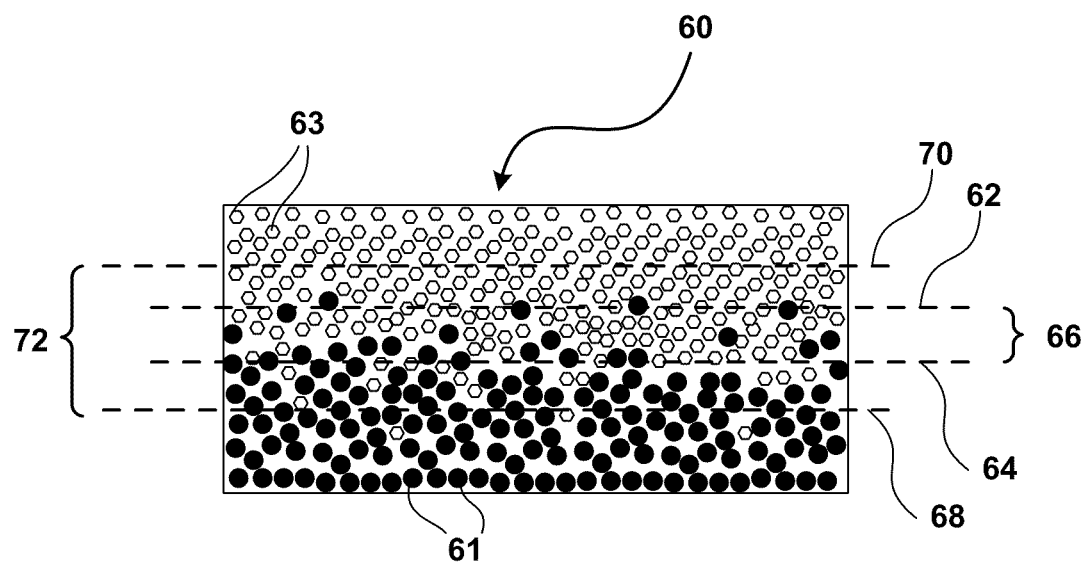
FIG. 8 is an exploded view of an interfacial mixing region between a magnetic layer and an underlayer with concentration depth markings

FIG. 8 is an exploded conceptual view of an interfacial mixing zone 60 between a magnetic layer and an underlayer. Mixing zone 60 includes a plurality of underlayer particles 61 and a plurality of magnetic particles 63. In the illustrated example, different mixing zone depths indicative of different particle concentrations are identified by dashed lines. For example, a first depth 70 of mixing zone 60 may define a concentration of magnetic particles. The concentration of magnetic particles may be equal to approximately 80 percent of a maximum concentration of magnetic particles found anywhere in the magnetic layer. For example, a maximum concentration of magnetic particles may be identified near a recording surface of a magnetic recording medium, immediately below the recording surface of the medium, in the middle of the magnetic layer of the recording medium, or any other location where magnetic particles may concentrate. Regardless, a magnetic recording medium may exhibit different magnetic particle concentrations at different locations. As another example, a second depth 68 of mixing zone 60 may define a second concentration of magnetic particles. The concentration of magnetic particles at the second depth 68 may be equal to approximately 20 percent of a maximum concentration of magnetic particles in the magnetic layer. A concentration of magnetic particles less than approximately 50 percent of a maximum concentration may indicate that underlayer particles predominate at that depth.

Although first depth 70 and second depth 68 are illustrated in FIG. 4, a mixing zone may have a plurality of depths. For example, mixing zone 60 may include a third depth 62 that defines a concentration of magnetic particles equal to approximately 60 percent of a maximum concentration of magnetic particles in the magnetic layer. Similarly, a fourth mixing zone depth 64 may define a concentration of magnetic particles equal to approximately 40 percent of a maximum concentration of magnetic particles in the magnetic layer. Further depths that define magnetic particle concentrations anywhere between approximately 0 percent and approximately 100 percent, inclusive, may be identified instead of, or in addition to, the mixing zone depths identified with respect to FIG. 8.

In addition to the various mixing zone depths that mixing zone 60 may exhibit, a plurality of different mixing zone distances may be measured between different mixing zone depths. The different mixing zone distances may be characteristic of how much intermixing occurs between and underlayer composition and a magnetic layer composition. A smaller mixing zone distance may indicate less underlayer and magnetic layer component mixing than a larger mixing zone distance. As a result, a mixing zone distance may indicate how sharp an interface is between an underlayer and a magnetic layer. In the example of FIG. 8, mixing zone 60 includes first mixing zone distance 72 and second mixing zone distance 66. First mixing zone distance 72 is the distance between a first depth 70 that defines a concentration of magnetic particles equal to approximately 80 percent of a maximum concentration of magnetic particles found in the magnetic layer, and second depth 68 that defines a concentration of magnetic particles equal to approximately 20 percent of a maximum concentration of magnetic particles found in the magnetic layer. In a magnetic recording medium of this disclosure, a mixing zone distance between an 80 percent maximum concentration of magnetic particles and 20 percent maximum concentration of magnetic particles may be less than approximately 45 nanometers, such as less than approximately 30 nanometers, or less than approximately 20 nanometers. In some cases, the distance between an 80 percent maximum concentration of magnetic particles and 20 percent maximum concentration of magnetic particles may greater than a certain value, such as greater than approximately 5 nanometers, or greater than approximately 10 nanometers. In additional cases, a mixing zone distance between an 80 percent maximum concentration of magnetic particles and 20 percent maximum concentration of magnetic particles may be between a range of values. For example, a mixing zone distance between an 80 percent maximum concentration of magnetic particles and 20 percent maximum concentration of magnetic particles may be between approximately 10 and 55 nanometers, such as between approximately 17.5 and 40 nanometers, or between approximately 25 and 32.5 nanometers.

As noted, mixing zone 60 also includes second mixing zone distance 66. Second mixing zone distance 66 is the distance between third depth 62 that defines a concentration of magnetic particles equal to approximately 60 percent of a maximum concentration of magnetic particles found in the magnetic layer, and fourth depth 64 that defines a concentration of magnetic particles equal to approximately 40 percent of a maximum concentration found in the magnetic layer. In a magnetic recording medium of this disclosure, a mixing zone distance between a 60 percent maximum concentration of magnetic particles and 40 percent maximum concentration of magnetic particles may be less than approximately 20 nanometers, such as less than approximately 15 nanometers, or less than approximately 10 nanometers. In some cases, the distance between a 60 percent maximum concentration of magnetic particles and 40 percent maximum concentration of magnetic particles may greater than a certain value, such as greater than approximately 1 nanometers, or greater than approximately 5 nanometers. In additional cases, a mixing zone distance between a 60 percent maximum concentration of magnetic particles and 40 percent maximum concentration of magnetic particles may be between a range of values. For example, a mixing zone distance between an 60 percent maximum concentration of magnetic particles and 40 percent maximum concentration of magnetic particles may be between approximately 5 and 35 nanometers, such as between approximately 7.5 and 20 nanometers, or between approximately 10 and 15 nanometers. Although mixing zone 60 only includes two mixing zone distances, a mixing zone may define any number of mixing zone distances. For example, mixing zone distances may be defined between mixing zone depths that define magnetic particle concentrations of 99 percent maximum concentration and 1 percent maximum concentration, depths that define magnetic particle concentrations of 90 percent maximum concentration and 10 percent maximum concentration, or depths that define magnetic particles concentrations of 70 percent maximum concentration and 30 percent concentration.

A magnetic recording medium constructed in accordance with this disclosure may exhibit other favorable physical properties. For example, a magnetic recording medium as described herein may exhibit fewer recording surface defects than a comparable medium not constructed according to this disclosure. Surface defects may cause data writing or reading errors, potentially resulting in the loss of important data. Further, surface defects may occupy space on a recording surface of a magnetic recording medium. Space occupied by defects may otherwise be occupied by magnetic particles that can store data.

Recording surface defects may assume different shapes and may be caused be different phenomena. Typical sources of recording surface defects may include impurities in one or more coating formulations, improper or insufficient mixing of one or more coating formulations, or improper application of a coating formulation to a substrate. These types of recording surface defects may define recording surface indentations or protrusions with angular or jagged edges. In further cases, recording surface defects may be caused by improper processing techniques or incompatible chemistry between different layers of a magnetic recording medium. For instance, a magnetic layer may be formed over an underlayer before the underlayer has fully crosslinked and hardened. As a result, at least some portions of a subsequently formed magnetic layer may delaminate from the underlayer, causing recording surface defects. As another example, a magnetic layer may be formed over an underlayer before an underlayer is sufficiently dried and cured. Components in the underlayer, such as residual solvents, may then migrate to the underlayer coating surface. These underlayer surface chemicals may cause a subsequently formed magnetic layer to delaminate or dewet from the previously established underlayer, resulting in recording surface defects. Recording surface defects cause by improper processing techniques or incompatible chemistry may define recording surface indentations or protrusions (i.e., defects) with arcuate edges, such as substantially circular or substantially elliptical surface defects.

Figure 9A:
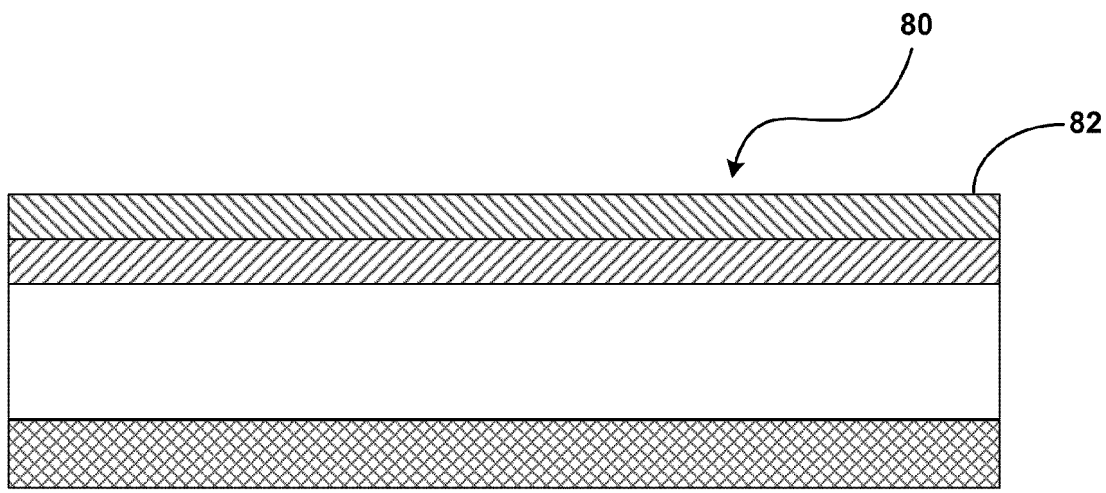
FIGS. 9A-C are plan views of an exemplary magnetic recording medium recording surface as well as a cross-sectional schematic of the same magnetic recording medium.

Regardless of the specific mechanism causing recording surface defects, a magnetic recording medium constructed in accordance with this disclosure may have fewer recording surface defects and/or small recording defects than a magnetic recording medium constructed according to different parameters. To illustrate, FIG. 9A is a cross-sectional schematic of an exemplary magnetic recording medium 80. Magnetic recording medium 80 has a multilayered structure that defines magnetic recording surface 82. Magnetic recording surface 82 may exhibit surface defects. For example, FIGS. 9B and 9C are conceptual plan views of recording surface 82 with surface defects 84, 86.

Figure 9B:
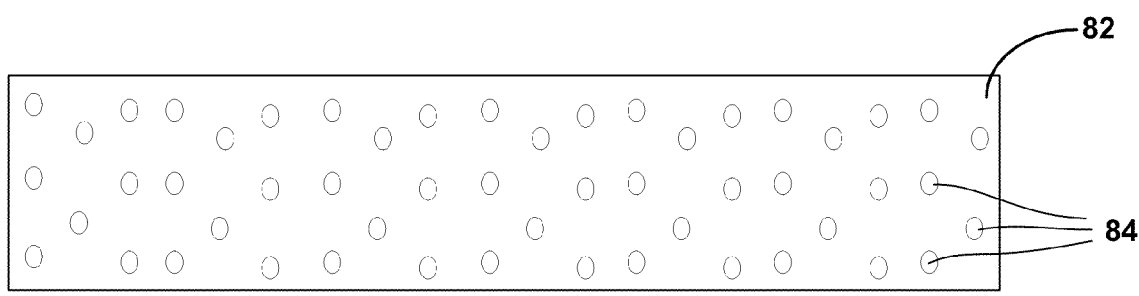
Figure 9C:
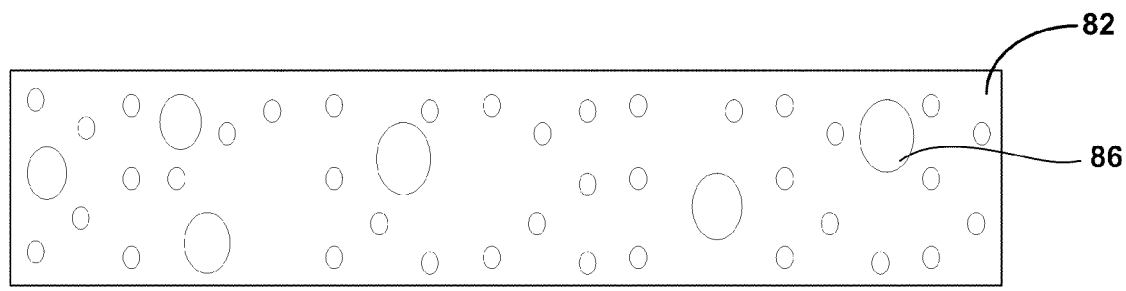

In the example of FIG. 9B, recording surface defects 84 are shown as discontinuous defects that define a substantially elliptical shape. Surface defects 84 are substantially uniform in size and distribution across the plane defined by recording surface 82. In further examples, surface defects 84 may be continuous across the plane defined by recording surface 82 such that surface defects 84 have linked edged. Further, surface defects 84 may exhibit different dimensions or be distributed differently than surface defects 84 illustrated in FIG. 9B. For example, FIG. 9C illustrates recording surface 82 with surface defects 86. Recording surface defects 86 are also shown as discontinuous defects that define a substantially elliptical shape. However, recording surface defects 86 have a random distribution across the plane defined by recording surface 82. Further, different individual defects among recording surface defects 86 have different dimensions.

In general, the size of a recording surface defect may be measured in the plane defined the recording surface. That is, the plane that defines the cross-sectional area of the recording surface. The surface defect may be measured across a major axis, such as the longest axis defined by the defect. In the case of a circular defect, for example, a major axis may be the diameter of the defect, while in the case of an amorphously shaped defect, a major axis may be longest measurable distance across the defect. In the example of FIG. 9C, recording surface defects 86 define different major axis lengths, including major axis lengths 87, 88, and 89.

A magnetic recording medium constructed in accordance with this disclosure may be substantially free of recording surface defects with a major axis length greater than or equal to approximately 10 micrometers, such as a major axis length greater than or equal to approximately 5 micrometers, a major axis length greater than or equal to approximately 2.5 micrometers, or a major axis length greater than or equal to approximately 0.5 micrometers. The phrase "substantially free" means that a recording surface exhibits an average of less than one defect of a given size every 0.01 square centimeters. A magnetic recording medium substantially free of surface defects of a given size may exhibit favorable electromagnetic characteristics because individual surface defects may promote data reading or writing errors. In further cases, however, the electromagnetic characteristics of a magnetic recording medium may by controlled by controlling the average characteristics of the medium, such as the average size or cross-sectional area of surface defects on the recording surface. Accordingly, if a magnetic recording medium as described herein exhibits recording surface defects, the recording surface defects my define an average major axis length less than or equal to approximately 10 micrometers, such as less than or equal to approximately 5 micrometers, less than or equal to approximately 2.5 micrometers, or less than or equal to approximately 0.5 micrometers.

While the foregoing description focused on surface defects with a substantially elliptical shape for purposes of illustration, it should be appreciated that a magnetic recording medium may exhibit recording surface defects that define different shapes, different dimensions, or the recording defects may assume different configurations than those illustrated in FIGS. 9B and 9C. Further, the defects may extend into the plane defined by the recording surface of the magnetic recording medium, out of the plane defined by the recording surface of the magnetic recording medium, may be coplanar with the recording surface of the magnetic recording medium, or may be combinations thereof. A defect that extends into the plane defined by the recording surface may be a defect that indents into the recording surface, such as a cavity, depression, or similar indenting feature. On the other hand, a defect that extends out of the recording surface may be a defect that protrudes out of the recording surface, such as a bubble, bulge, or similar protruding feature. Further, a coplanar defect may be a structural or material discontinuity in an otherwise homogenous recording surface.

While the materials and techniques described herein may benefit any recording medium, the materials and techniques may provide advantages when used to create a recording medium that includes one or more thin layers. Minor processing defects, material incompatibilities, or interlayer mixing phenomena that may otherwise be attenuated in a thicker material may be accentuated when constructing a comparatively thinner magnetic recording medium or a magnetic recording medium that includes one or more comparatively thin layers. These issues may manifest by reducing the electromagnetic performance of a magnetic recording medium. Thus, although the features of this disclosure may be beneficially implemented to produce a magnetic recording medium of any suitable size, in some examples, a magnetic recording medium of this disclosure may be thinner than a standard magnetic recording medium or may include one or more layers that are thinner than the corresponding layers found in a standard magnetic recording medium.

Figure 10:
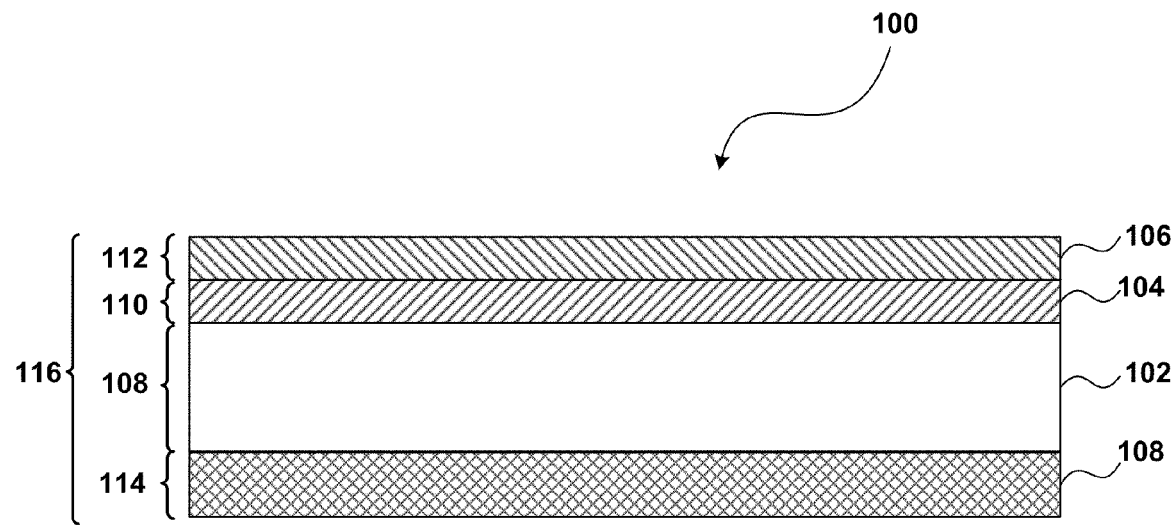
FIG. 10 is a cross-sectional view of another example magnetic recording medium showing dimensional markings for different layers of the recording medium.

The term thickness may refer to a dimension of the magnetic recording medium measured orthogonally from a plane defined by a recording surface of the medium. For example, FIG. 10 is a schematic cross-sectional view of an example magnetic recording medium 100 that shows dimensional markings for different layers of the recording medium. Magnetic recording medium 100 includes substrate 102 that defines thickness 108. Underlayer 104 is formed over a first side of substrate 102 and defines thickness 110. Backing layer 108 is formed over a second side of substrate 102 and defines thickness 114. Further, magnetic layer 106 is formed over underlayer 104 and defines thickness 112. Together, the different layers of magnetic recording medium 100 combine together to define overall magnetic recording medium thickness 116.

In some examples, magnetic recording medium thickness 116 may be less than or equal to approximately 7500 nanometers, such as less than or equal to approximately 6750 nanometers. In some additional examples, magnetic recording medium thickness 116 may be greater than or equal to approximately 4000 nanometers, such as greater than or equal to approximately 5500 nanometers. For instance, magnetic recording medium thickness 116 may between approximately 5750 and 7250 nanometers, such as between approximately 6250 nanometers and 6750 nanometers.

Individual components of a magnetic recording medium may also define thicknesses. For example, substrate 102 defines substrate thickness 108. Substrate thickness 108 may be any suitable value and may be influenced by a number of different factors. For example, substrate thickness 108 affects overall magnetic recording medium thickness 116, which may be controlled by external considerations. Also, substrate thickness 108 may affect the cost, performance, and durability of the magnetic recording medium itself. As an example, a thicker substrate may provide a more durable magnetic recording medium. Further, a substrate material may be less expensive than other materials used to form a composite magnetic recording medium. As a result, competitive advantage may be achieved by increasing substrate thickness 108 while reducing the thickness of corresponding magnetic recording medium components. In accordance with this disclosure, an average substrate thickness 108 may be greater than or equal to approximately 1000 nanometers, such as greater than or equal to approximately 3500 nanometers, or greater than or equal to approximately 10,000 nanometers. In some cases, an average substrate thickness 108 may be less than or equal to a given value. For example, an average substrate thickness 108 may be less than or equal to approximately 15,000 nanometers, such as less than or equal to approximately 10,000 nanometers, or less than or equal to approximately 8500 nanometers. As an example, an average substrate thickness 108 may be between approximately 1500 nanometers and 11,500 nanometers, such as between approximately 2500 nanometers and 10,000 nanometers, or approximately 4500 nanometers and 5500 nanometers. As used herein, the phrase average thickness means an arithmetic mean thickness of substrate 102 as compiled from a plurality of measurements.

In the example illustrated in FIG. 10, magnetic recording medium 100 includes underlayer 104 that may define thickness 110. Similar to the selection of substrate 102, a number of criteria may be balanced when selecting a thickness for underlayer 104. For example, manufacturing capabilities and magnetic recording medium performance capabilities may be considered when selecting underlayer thickness 110. Traditional magnetic recording medium include a relatively thick underlayer under the belief that a thick underlayer leads to a smooth magnetic recording surface, which in turn improves the performance capabilities of the magnetic recording medium. However, as discussed, other issues such as interlayer mixing may also affect the performance capabilities of a magnetic recording medium. Regardless, a magnetic recording medium of the present disclosure may advantageously use a relatively thin underlayer while providing high quality electromagnetic characteristics. An average underlayer thickness 110 may be greater than or equal to approximately 100 nanometers, such as greater than or equal to approximately 650 nanometers, or greater than or equal to approximately 1250 nanometers. In some cases, an average underlayer thickness 110 may be less than equal to a given value. For example, an average underlayer thickness 110 may be less than equal to approximately 1750 nanometers, such as less than or equal to approximately 1000 nanometers, less than or equal to approximately 800 nanometers, or less than or equal to approximately 250 nanometers. As an example, an average underlayer thickness 110 may be between approximately 200 nanometers and 1200 nanometers, such as between approximately 600 nanometers and 1000 nanometers, or between approximately 750 nanometers and 950 nanometers.

Magnetic recording medium 100 also includes magnetic layer 106 that may define thickness 112. Factors that may affect a desired magnetic layer thickness 112 include, for example, the type of magnetic material used, the quality of the medium, and the dimensions of the other components selected for magnetic recording medium 100. Magnetic layer 106 may be any suitable thickness.

In some examples, magnetic layer 106 may define a definite measureable thickness 112. For example, a well-defined interface may exist between underlayer 104 and magnetic layer 106, thus providing a suitable demarcation line for measuring magnetic layer thickness 112. Magnetic layer thickness 112 can then be measured, for example, visually or with the aid of a microscope instrument. In such cases, an average magnetic layer thickness 112 may be less than approximately 150 nanometers, such as less than approximately 100 nanometers, or less than approximately 75 nanometers. In some examples, an average magnetic layer thickness 112 may be greater than approximately 25 nanometers, such as greater than approximately 55 nanometers, or greater than approximately 67.5 nanometers. For example, an average magnetic layer thickness may be between approximately 45 nanometers and 115 nanometers, such as between approximately 60 nanometers and 90 nanometers.

Although magnetic layer 104 may be characterized according to a measurable magnetic layer thickness 112, in further examples, magnetic layer 104 may usefully be characterized according to bulk electromagnetic properties. Interlayer mixing between underlayer 104 and magnetic layer 106 may contaminate the boundary line between the two layers, making the dimensions of magnetic layer 104 difficult to detect.

Further, bulk electromagnetic properties may be more readily detected than visual inspection of magnetic layer thickness 112.

One electromagnetic parameter that may correlate with magnetic layer thickness 112 is the product of saturation magnetization and thickness. In general, a saturation magnetization and thickness product can be determined by placing a portion of magnetic recording medium with a known magnetic surface area into a vibrating-sample magnetometer (VSM). The magnetic moment of the magnetic recording medium can be determined in saturation field, such as a saturation field defined as 10,000 Oersted. Further, the determined magnetic moment of the magnetic recording medium can be divided by the magnetic surface area (e.g., the recording surface area) of the magnetic recording medium to arrive at the product of saturation magnetization and thickness. Because the magnetic moment of a sample portion of magnetic medium is proportional to the volume of magnetic material present in the medium, dividing the magnetic moment value by the magnetic surface area may provide a reasonable proxy for magnetic layer thickness 112.

A magnetic recording medium as provided in this disclosure may exhibit a saturation magnetization and thickness product less than or equal to approximately 1.25 memu per square centimeter (memu/cm$^2$), such as less than or equal to approximately 1.00 memu per square centimeter, less than or equal to 0.67 memu per square centimeter, less than or equal to approximately 0.34 memu per square centimeter, or less than or equal to approximately 0.19 memu per square centimeter. In some examples, a magnetic recording medium may exhibit a saturation magnetization and thickness product greater than or equal to approximately 0.09 memu per square centimeter, such as greater than or equal to approximately 0.15 memu per square centimeter, or greater than or equal to approximately 0.49 memu per square centimeter. For example, a magnetic recording medium may exhibit a saturation magnetization and thickness product between approximately 0.19 and 1.00 memu per square centimeter, such as between approximately 0.34 and 0.90 memu per square centimeter, or between approximately 0.51 and 0.67 memu per square centimeter.

When used, a backing layer may also define a thickness, such as backing layer thickness 114 illustrate on magnetic recording medium 100. As examples, a backing layer thickness may be between approximately 100 and 800 nanometers, such as between approximately 250 and 750 nanometers, or between approximately 355 and 575 nanometers.

Although the magnetic recording media described and illustrated herein generally included a backing layer, a substrate, an underlayer, and a magnetic layer, it should be appreciated that one or more layers may be added or removed from the described structures without departing from the scope of this disclosure. As an example, particular layers described may in fact be formed from a plurality of layers. For instance, a magnetic recording medium may include multiple substrate layers, multiple underlayers, multiple magnetic layers, or combinations thereof. As a further example, a backing layer may be omitted from a magnetic recording medium or even replaced with a different type of layer.

Figure 11:
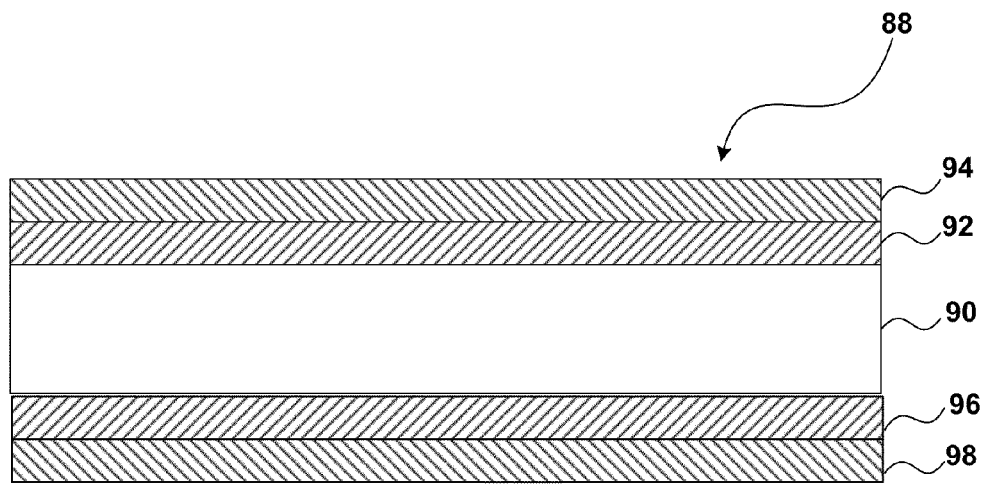
FIG. 11 is a cross-sectional schematic of an example double-sided magnetic recording medium.

FIG. 11 is a conceptual cross-sectional view of an exemplary magnetic recording medium 88 that includes a different arrangement of layers than the previously described magnetic recording media. Magnetic recording medium 10 includes substrate 90. Substrate 90 defines a first side and a second side opposite the first side. A first underlayer 92 is formed over the first side of substrate 90 to define a first coating surface. A second underlayer 96 is formed over the second side of substrate 90 to define a second coating surface. First magnetic layer 94 and second magnetic layer 98 are further formed over the coating surfaces respectively defined by first underlayer 92 and second underlayer 96. Because magnetic recording medium 88 provides two opposing recording surfaces, magnetic recording medium 88 may provide twice the storage capacity as a comparable single-sided magnetic recording medium.

Dual-sided magnetic recording medium 88 may be constructed using the materials and techniques described herein. In some examples, underlayers 92 and 96 and/or magnetic layers 94 and 98 may include similar materials and may be formed using similar techniques. As a non-limiting example, underlayer 92 may be coated on substrate 90 and dried. Underlayer 96 may subsequently be coated on a reverse side of substrate 90 and dried. The substrate with two underlayers may then be heat-cured. After heat-curing, the substrate with two underlayers may be passed through one or more calendering stations to simultaneously calendar underlayer 92 and underlayer 94. Further, magnetic layers 94 and 98 may be coated over their respective underlayers and subject to further processing as desired.

Alternatively, underlayers 92 and 96 and/or magnetic layers 94 and 98 may include different materials or may be formed using different processing techniques. As a non-limiting example, underlayer 92 may be formed over substrate 90, dried, heat-cured, and calendered. Magnetic layer 94 comprising a plurality of milled platelet-shaped or low aspect ratio particles may then be formed over underlayer 92, dried, heat-cured, and calendered. In contrast, magnetic layer 98 and underlayer 96, whether formed before or after magnetic layer 94 and underlayer 92, may be wet-on-wet coated over a reverse side of substrate 90. A dual-sided magnetic recording medium constructed according to this process may provide one higher performance magnetic recording surface and one lower performance magnetic recording surface. Such a medium may be attractive for providing low cost duplicate storage capacity or emergency reserve storage capacity.

Figure 12:
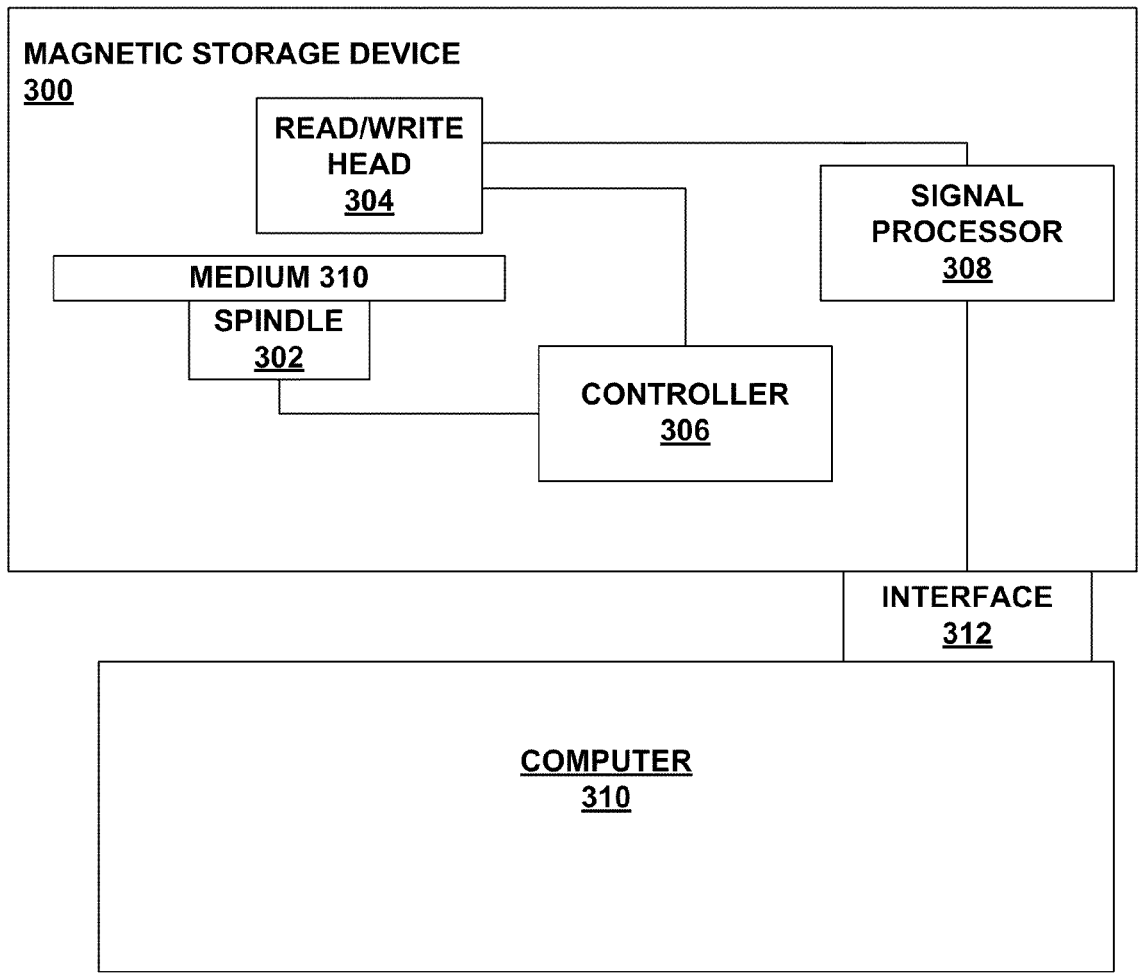
FIG. 12 is a block diagram of a magnetic storage system that may employ a magnetic recording medium.
Figure 13:
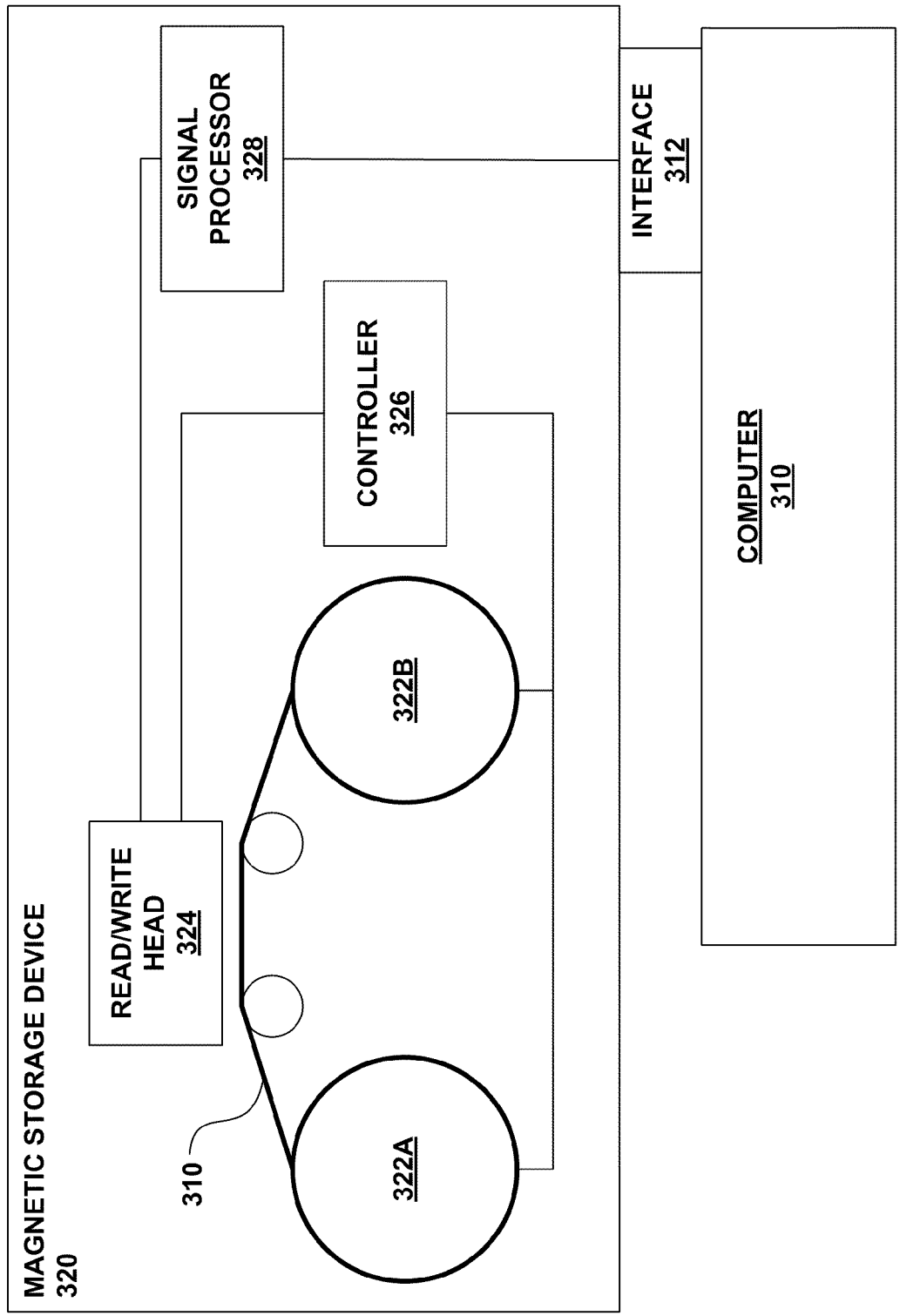
FIG. 13 is a block diagram of another exemplary magnetic storage system that may employ a magnetic recording medium.

FIGS. 12 and 13 are block diagrams of exemplary magnetic storage devices that may be used to read or record data on medium described herein. As shown in FIG. 12, magnetic storage device 300 may be used with a disk shaped configuration of magnetic recording medium 310. In that case, magnetic storage device 300 may comprise a magnetic disk drive, a hard disk drive, a floppy disk drive, or the like. The magnetic recording medium 310 may include a substrate, an underlayer, and a magnetic layer. The magnetic layer may define a product of saturated magnetization and thickness less than or equal to approximately 1.00 memu per square centimeter. Further, the magnetic layer and underlayer may define a mixing zone with a mixing zone distance between a concentration of magnetic particles equal to 80 percent of a maximum concentration of magnetic particles and a concentration of magnetic particles equal to 20 percent of a maximum concentration of magnetic particles less than or equal to approximately 80 nanometers. Spindle 102 may be used to spin medium 310 and read/write head 304 may be positioned to detect magnetic transitions on medium 310. A controller 306 controls spindle 302 and read/write head 304 to precisely position read write head 304 relative to medium 310. Signal processor 308 interprets detected magnetic transitions.

As illustrated in FIG. 12, magnetic storage device 300 may be coupled to a computer 310 via an interface 312. For example, computer 310 may comprise a central processing unit for any of a variety of computer devices, including, for example, a PC, a Macintosh, a computer workstation, a handheld data terminal, a palm computer, a cell phone, digital paper, a digital television, a wireless device (in which case interface 312 may be wireless), a personal digital assistant, a laptop computer, a desktop computer, a digital camera, a digital recording device, or the like.

As shown in FIG. 13, magnetic storage device 320 may be used with a configuration of magnetic recording medium 310 that includes magnetic tape. In that case, magnetic storage device 320 may comprise a magnetic tape drive, a magnetic tape cartridge drive, or the like. Medium 310 may include magnetic tape spooled onto one or more spools 322A and 322B. Spools 322 may be housed in a cartridge, although the disclosure is not limited in that respect. The magnetic recording medium 310 in the form of magnetic tape may include a substrate, an underlayer, and a magnetic layer. The magnetic layer may define a product of saturated magnetization and thickness less than or equal to approximately 1.00 memu per square centimeter. Further, the magnetic layer and underlayer may define a mixing zone with a mixing zone distance between a concentration of magnetic particles equal to 80 percent of a maximum concentration of magnetic particles and a concentration of magnetic particles equal to 20 percent of a maximum concentration of magnetic particles less than or equal to approximately 80 nanometers. Read/write head 324 may be positioned to detect magnetic transitions on medium 310. A controller 326 controls the positioning of read/write head 324 as well as the movement of medium 310 such as by turning spools 322A and/or 322B to precisely position read/write head 324 relative to medium 310. A signal processor 328 interprets detected magnetic transitions.

Like in FIG. 12, magnetic storage device 320 of FIG. 13 may be coupled to a computer 310 via an interface 312. Again, computer 310 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like.

Beyond the devices illustrated in FIGS. 12 and 13, magnetic recording medium 310 may be configured to function with other types of storage devices. For example, magnetic recording medium 310 can be configured for use in high density recording applications, such as for use with T10000, LTO3, LTO4, LTO5, Quantum S5, Quantum S6, 3592, or other suitably designed magnetic recording tape drives.

The following examples may provide additional details about magnetic recording medium formed in accordance with this disclosure.

EXAMPLES

Different magnetic recording media samples were constructed for testing in the following examples. Each magnetic recording media sample included a polyethylene napthalate (PEN) substrate that exhibited a maximum magnetic-side average surface roughness (Ra) of 4 and a maximum magnetic-side average peak-to-valley depth (Rz) of 100. Except as noted below, magnetic recording media samples were constructed from substantially identical materials using substantially identical techniques. For example, each magnetic recording media sample was constructed as a magnetic recording tape. Each magnetic recording tape was slit into half inch width tape sections for testing. As a result, magnetic recording media samples only varied based on the control parameters studied and identified in the examples below. For examples that involved calendering, calender roll faces were heated to a temperature greater than approximately 30 degrees Celsius above the glass transition temperature of the front-side coatings of the magnetic recording media to be calendered. Further, where surface roughness parameters are provided, all surface roughness parameter descriptions and derivations are available in the book "Rough Surfaces", Tom R. Thomas, $2^{nd}$ edition, 1999, Imperial College Press, London, ISBN 1-86094-100-1.

Example 1

Six different magnetic recording media were constructed for electromagnetic performance testing. The different magnetic recording media were created using identical materials. For example, the magnetic layer of each magnetic recording medium included standard metal particle magnetic particles. As a result, only two parameters varied among different test samples. First, samples varied based on the manufacturing technique used to construct a specific sample. Some test samples were constructed using a wet-on-dry processing technique that coated a wet magnetic layer over a previously formed, dried, and heat-cured underlayer, while some comparison samples were constructed using a wet-on-wet (WoW) processing technique that coated a wet magnetic layer over a wet underlayer. Second, different test samples received different amounts of underlayer calendering. Underlayer calendered samples were all calendered using a steel-on-steel in-line calendering apparatus. For each sample, underlayer calendering was conducted before each underlayer was heat-cured. Each magnetic layer was then formed over the previously calendered underlayer. Table 1 illustrates the different processing parameters for the magnetic recording media involved in the electromagnetic performance testing.

TABLE 1

| Recording Medium | Processing Technique | Underlayer In-line Calendering Pressure-to-Velocity ratio (pli/fpm) |
|---|---|---|
| Sample 1 | Wet-on-Dry | 0 |
| Sample 2 | Wet-on-Dry | 2.7 |
| Sample 3 | Wet-on-Dry | 6.6 |
| Sample 4 | Wet-on-Dry | 2.7 |
| Comparison Sample 1 | Wet-on-Wet | 0 |
| Comparison Sample 2 | Wet-on-Wet | 0 |

After constructing different magnetic recording media according to the parameters outlined above, the media were subject to signal-to-noise ratio (SNR) testing. SNR testing on each magnetic recording medium was performed using a 4 micrometer gap read/write head operating at 190,000 flux changes per inch (hereinafter 190 kfci). Table 2 illustrates respective SNR values for each magnetic recording medium involved in the test. SNR differences between one wet-on-wet processed sample and one wet-on-dry processed sample are provided in Table 3. SNR differences between different wet-on-wet processed samples and different wet-on-dry processed samples are provided in Table 4.

TABLE 2

| Recording Medium | Broad Band Signal-to-Noise Ratio (decibels) | Broad Band Signal Amplitude (decibels) | Broad Band Noise (decibels) |
|---|---|---|---|
| Sample 1 | 25.4 | −67.7 | −93.1 |
| Sample 2 | 25.1 | −67.4 | −92.5 |
| Sample 3 | 24.5 | −68.8 | −93.4 |
| Sample 4 | 25.4 | −67.7 | −93.0 |
| Comparison Sample 1 | 23.4 | −69.3 | −92.7 |
| Comparison Sample 2 | 23.7 | −68.8 | −92.6 |

TABLE 3

| Comparison | Difference Between Broad Band Signal-to-Noise Ratios (decibels) | Difference Between Broad Band Signal Amplitudes (decibels) | Difference Between Broad Band Noises (decibels) |
|---|---|---|---|
| Sample 4 - Comparison Sample 2 | 1.7 | 1.1 | −0.4 |

TABLE 4

| Comparison | Difference Between Broad Band Signal-to-Noise Ratios (decibels) | Difference Between Broad Band Signal Amplitudes (decibels) | Difference Between Broad Band Noises (decibels) |
|---|---|---|---|
| Sample 1 - Comparison Sample 1 | 2.0 | 1.6 | −0.4 |
| Sample 2 - Comparison Sample 1 | 1.7 | 1.9 | 0.2 |
| Sample 3 - Comparison Sample 1 | 1.1 | 0.5 | −0.7 |

As shown in Tables 2-4, wet-on-dry processed magnetic recording media consistently exhibited increased broad band signal-to-noise ratios greater than +1.0 decibels better than similar wet-on-wet processed magnetic recording media. According to these data, the improved signal-to-noise ratios may be more attributable to increased signal amplitudes than to reduced noise amounts. These data may be consistent with an increase in magnetic particle concentration at a recording surface of a magnetic medium as opposed to reduced roughness between an underlayer and a magnetic layer (i.e., interfacial roughness). Without being bound by theory, it is suggested that significant improvements in interfacial roughness may have resulted in signal-to-noise ratio improvements attributable to reduced noise values, as opposed to increased amplitude values.

Example 2

In this example, different samples of magnetic recording media were constructed for further electromagnetic performance testing. The different magnetic recording media were created using identical materials and processing parameters. Unlike the media studied in Example 1, however, the magnetic layers of each magnetic recording medium in this example included barium ferrite magnetic particles. Otherwise, the only difference between different media samples in this example was whether a magnetic recording medium was formed using a wet-on-wet (WoW) manufacturing process or a wet-on-dry (WoD) manufacturing process. Wet-on-wet samples were constructed by coating a wet magnetic layer over a wet underlayer, while wet-on-dry samples were constructed by coating a wet magnetic layer over a previously formed, dried, and heat-cured underlayer.

Figure 14A:
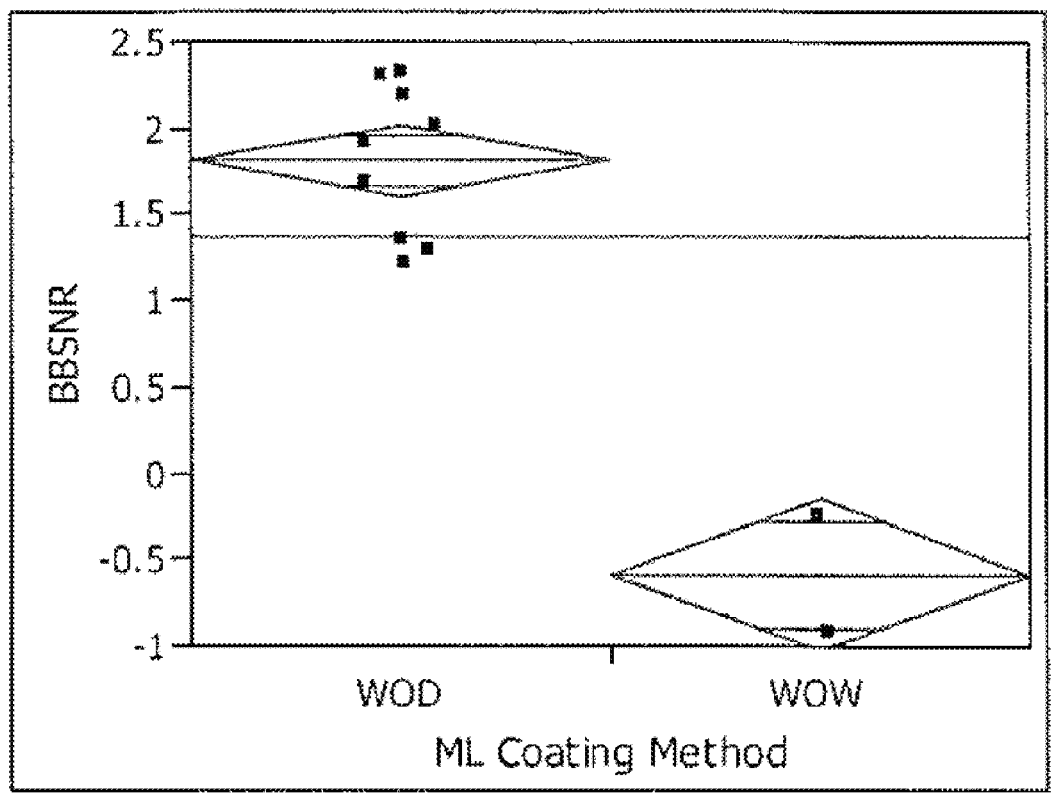
FIG. 14A is a plot of broad band signal-to-noise ratios for different example magnetic recording media manufactured using different techniques.
Figure 14B:
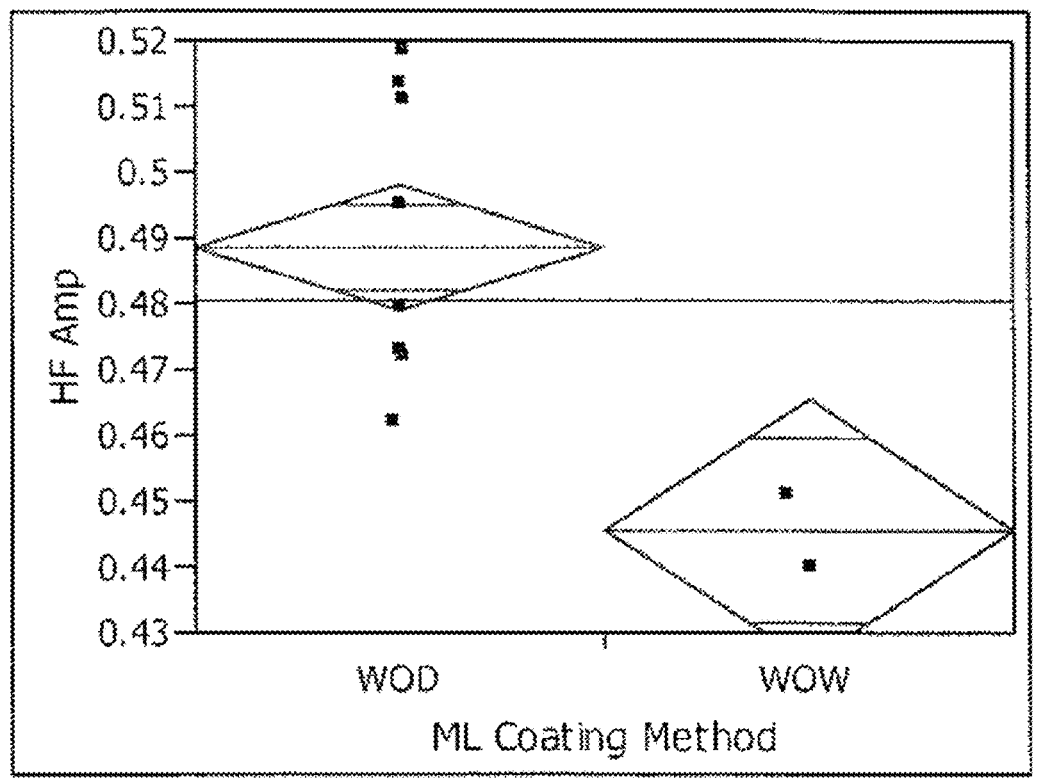
FIG. 14B is a plot of HF amplitudes for different example magnetic recording media manufactured using different techniques.

Electromagnetic performance characteristics for the different media were measured using a 4 micrometer gap read/write head operating at 190 kfci. Testing results are illustrated in FIGS. 14A and 14B and Table 5. FIG. 14A is a plot illustrating broad band signal-to-noise ratios (BBSNR) in decibels for magnetic recording media manufactured using wet-on-wet (WoW) and wet-on-dry (WoD) manufacturing processes. Different data points in FIG. 14A represent different test results for different magnetic recording media samples. FIG. 14B is a plot illustrating high frequency, HF, amplitudes (i.e., high frequency amplitudes relative to fractional signal strengths) in millivolts for the same magnetic recording media presented in FIG. 14A. In addition, Table 5 illustrates mean example broad band signal-to-noise ratio values, including mean signal amplitude and mean noise amplitude values, for the wet-on-wet processed media and the wet-on-dry processed media involved in the test.

TABLE 5

| Process | Broad Band Signal-to-Noise Ratio (decibels) | Signal Amplitude (decibels) | Noise Amplitude (decibels) |
|---|---|---|---|
| Wet-on-Wet | 16.5 | −78.5 | −95 |
| Wet-on-Dry | 17.6 | −76.6 | −94.2 |
| Difference | 1.2 | 1.9 | 0.7 |

According to the data presented in FIGS. 14A and 14B, broad band signal-to-noise ratios improved by approximately +2.4 decibels when using a wet-on-dry manufacturing process as compared to a wet-on-wet manufacturing process. Similarly, HF amplitudes increased by approximate 10 percent when using a wet-on-dry manufacturing process as compared to a wet-on-wet manufacturing process. According to the data presented in Table 5, broad band signal-to-noise ratios improved by approximately +1.2 decibels when using a wet-on-dry manufacturing process as compared to a wet-on-wet manufacturing process. Because signal-to-noise ratios may degrade with increasing interfacial roughness between an underlayer and a magnetic layer, the data in FIGS. 14A and 14B and Table 5 suggest that a wet-on-dry manufacturing process may reduce interfacial facial roughness and improve interfacial uniformity between an underlayer and a magnetic layer as compared to a wet-on-wet manufacturing process.

Although not illustrated, cross-sectional images of the magnetic recording media samples in this example were also observed with a transmission electron micrograph (TEM). These images also indicated that magnetic recording media manufactured through a wet-on-dry process exhibited improved interfacial uniformity as compared to magnetic recording media manufactured through a wet-on-wet process.

Example 3

Magnetic recording media samples were constructed to test how underlayer thickness may impact magnetic recording surface smoothness and magnetic recording surface electromagnetic performance. A first type of comparison magnetic recording medium was constructed with standard acicular iron oxide magnetic particles using a wet-on-wet coating process. In the created media samples, underlayer thicknesses varying between approximately 15 microinches and 40 microinches were generated by simultaneously applying a magnetic layer coating over an underlayer coating, which in turn was simultaneously applied on a 20 gauge substrate. Further, a second type of test magnetic recording medium was constructed with barium ferrite magnetic particles using a wet-on-dry coating process. In these created media samples, varying underlayer thicknesses were deposited on a 20 gauge substrate. After drying and heat-curing the formed underlayers, magnetic layers were formed over the underlayers.

The comparison magnetic recording media and test magnetic recording media were evaluated for surface roughness parameters and electromagnetic performance characteristics. Electromagnetic performance characteristics for the comparison magnetic recording media were evaluated using a LTO4 read/write head operating at 190 kfci. Electromagnetic performance characteristics for the test magnetic recording media were evaluated using a 4 micrometer gap read/write head operating at 190 kfci. Further, surface roughness parameters for both types of media were determined using an atomic force microscope (AFM). In each case, the atomic force microscope employed a probe with a radius of curvature less than or equal to 10 nanometers that was traversed across an area at least 10 micrometers by 10 micrometers.

Figure 15:
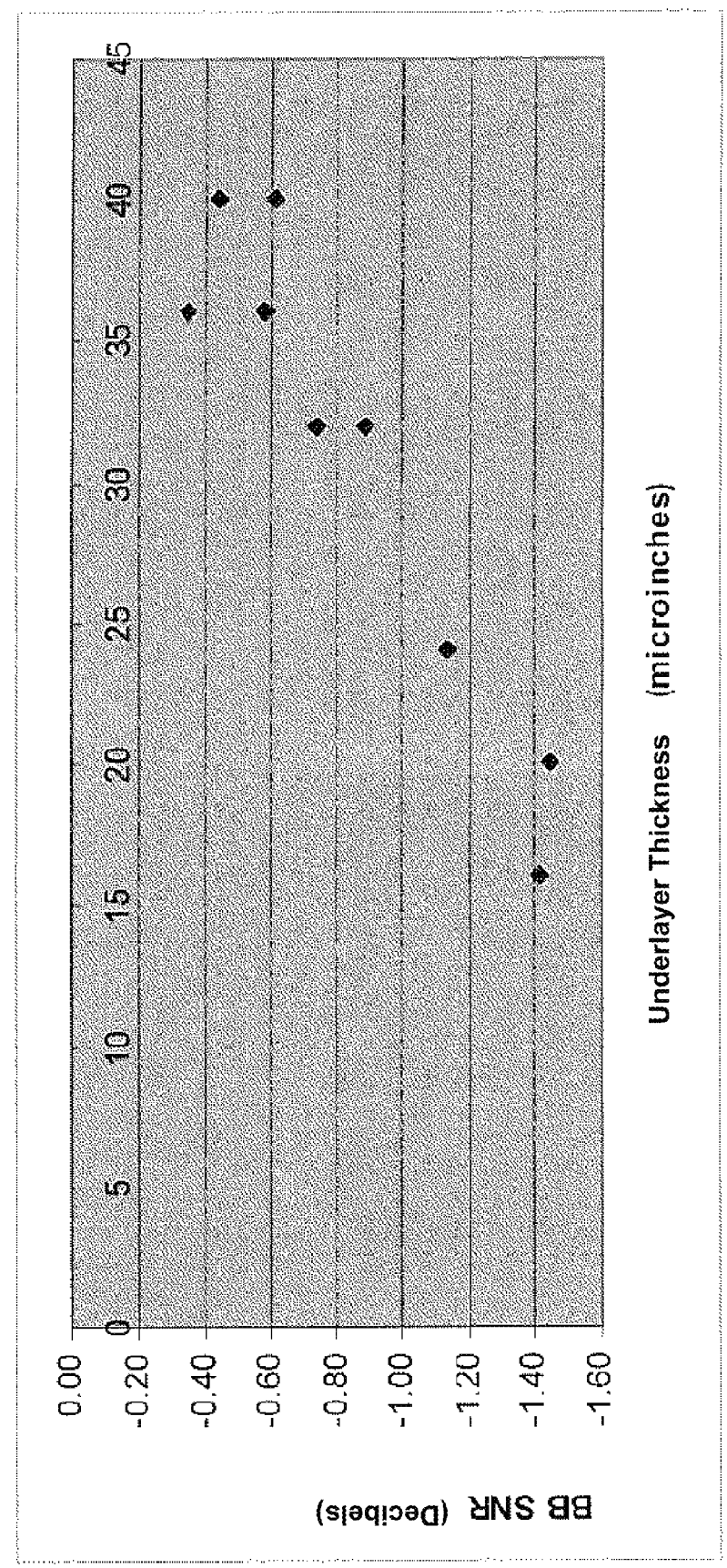
FIG. 15 is a plot of normalized broad band signal-to-noise ratios for wet-on-wet manufactured example magnetic recording media as a function of underlayer thickness.
Figure 16:
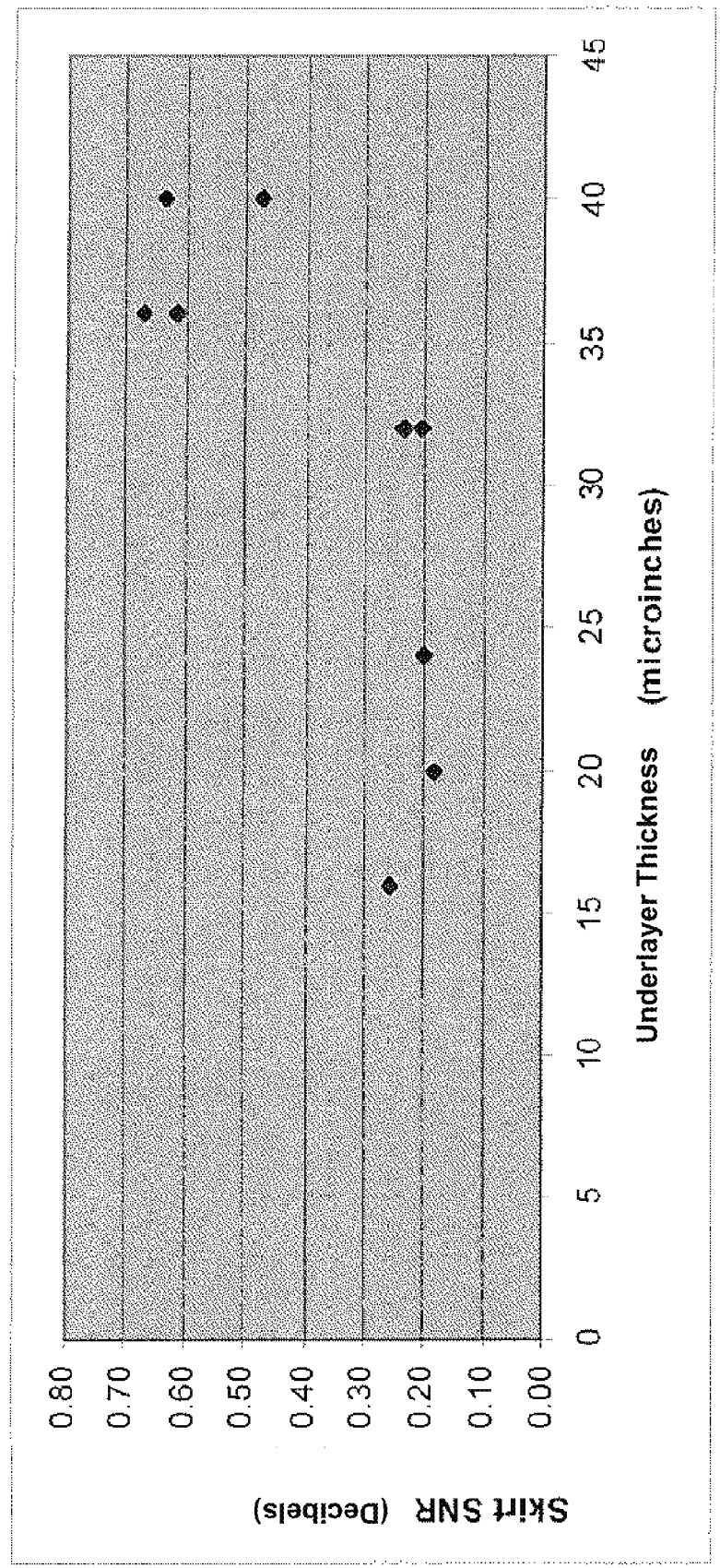
FIG. 16 is a plot of normalized skirt signal-to-noise ratios for wet-on-wet manufactured example magnetic recording media as a function of underlayer thickness.

Testing results for the comparison media are illustrated in FIGS. 15-17. Different data points in the figures represent different test results for different magnetic recording media samples. FIG. 15 is a plot illustrating normalized broad band signal-to-noise ratios (BBSNR) in decibels for wet-on-wet manufactured media as a function of underlayer thickness in microinches. FIG. 16 is a plot illustrating normalized skirt signal-to-noise ratios in decibels for wet-on-wet manufactured media, also as a function of underlayer thickness in microinches. Together, FIGS. 15 and 16 exhibit a trend of improving broad band signal-to-noise ratios and improving skirt signal-to-noise ratios as underlayer thicknesses increase.

As noted, comparison magnetic recording media were also subject to surface roughness characterization. FIG. 17 is a bar graph of magnetic recording surface average surface roughness (Ra) values and surface roughness relative to centerline average height (Rpm) values for media with different underlayer thicknesses. The lighter shaded bars 440 indicate Ra values in nanometers while the darker shaded bars 442 indicate Rpm values in nanometers. The data in FIG. 17 exhibit a trend of decreasing recording surface roughness as underlayer thicknesses increase. Additional surface roughness data for two of the data points provided in FIG. 17 are presented in Table 5 below.

Figure 17A:
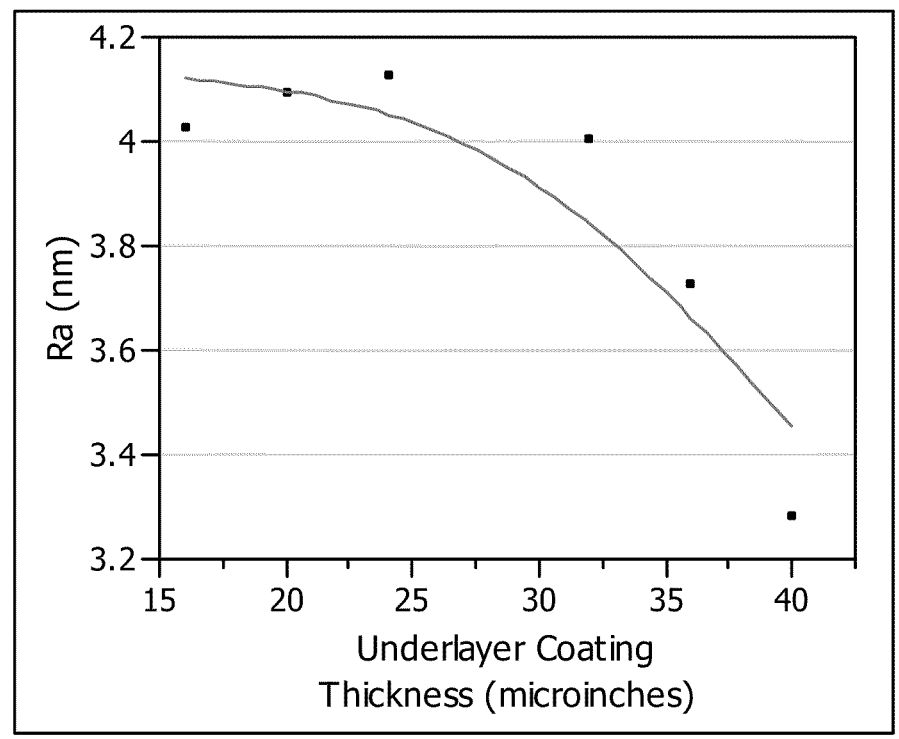
FIG. 17A is a plot of average surface roughness (Ra) for wet-on-wet manufactured example magnetic recording media as a function of underlayer thickness.
Figure 17B:
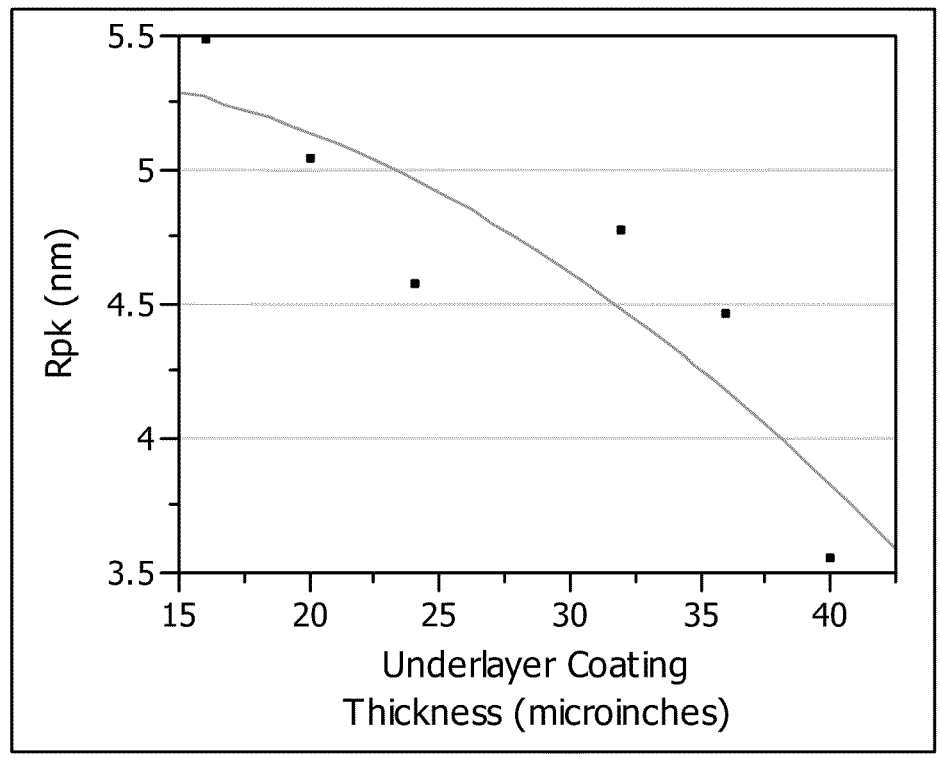
FIG. 17B is a plot of surface roughness relative to reduced peak height (Rpk) for wet-on-wet manufactured example magnetic recording media as a function of underlayer thickness.

As noted, comparison magnetic recording media were also subject to surface roughness characterization. FIG. 17A is a plot of average surface roughness (Ra) for wet-on-wet manufactured example magnetic recording media as a function of underlayer thickness. FIG. 17B is a plot of surface roughness relative to reduced peak height (Rpk) for wet-on-wet manufactured example magnetic recording media as a function of underlayer thickness. The data in FIGS. 17A and FIG. 17B exhibit a trend of decreasing recording surface roughness as underlayer thicknesses increase.

In addition to the comparison magnetic recording media described above, two additional comparison magnetic recording media samples were created with underlayer thicknesses of 36 microinches and 44 microinches, respectively. The two additional samples were also prepared using a wet-on-wet coating process. Unlike the comparison magnetic recording media described above, however, the two additional magnetic recording media samples were constructed with a dispersion of barium ferrite magnetic particles. In the two created media samples, underlayer thicknesses of approximately 36 microinches and 44 microinches were generated by simultaneously applying a magnetic layer coating over an underlayer coating, which in turn was simultaneously applied on a 18 gauge substrate. The magnetic recording media were then evaluated using a 4 micrometer gap read/write head operating at 190 kfci. As with previous media samples, the medium with the thicker underlayer (i.e., 44 microinches) had an improved broad-band signal-to-noise ratio (BBSNR) compared to the medium with the thinner underlayer (i.e., 36 microinches). However, the impact of a thicker underlayer was more pronounced in the barium ferrite media samples than the iron oxide media samples. For example, the medium with the 44 microinch thick underlayer exhibited a BBSNR approximately 2.5 decibels better than the medium with the 36 microinch thick underlayer. The disparity in results between barium ferrite media samples and iron oxide media samples may be attributed to increased testing sensitivity with the higher-density barium ferrite media. Additional surface roughness data for the two barium ferrite media samples are presented in Table 6 below.

TABLE 6

|  | Underlayer Thickness (microinches) | Ra (nm) | Rsk (nm) | Rku (nm) | Rz (nm) | Rpk (nm) | Rk (nm) |
| --- | --- | --- | --- | --- | --- | --- | --- |
| Sample 1 | 44 | 1.9 | 0.01 | 3.7 | 48 | 2.7 | 6.1 |
| Sample 2 | 36 | 2.3 | 0.11 | 10.2 | 190 | 2.9 | 7.4 |

In Table 6, surface roughness is quantified as average surface roughness (Ra). Skewness, or lack of symmetry in the roughness data, is captured in the column labeled Rsk. Table 5 indicates peak-to-valley roughness height in the column Rz and the reduced peak height in the column Rpk. In addition, the column labeled Rku, the kurtosis, indicates whether a data distribution is peaked or flat relative to a normal distribution. Finally, the column labeled Rk indicates working roughness, which is the stable roughness that remains after the surface is subject to significant sliding contact with another similar surface.

The data in Table 6 suggest that changes in average surface roughness for wet-on-wet coated magnetic recording media may be driven by a reduction in large peak roughness, as evidence in kurtosis data (Rku), the peak-to-valley data (Rz), and the reduced peak height (Rpk). These changes may be attributable to a thicker underlayer, which may cover substrate roughness and provide compliance to absorb magnetic layer roughness during final magnetic layer calendering.

Figure 18:
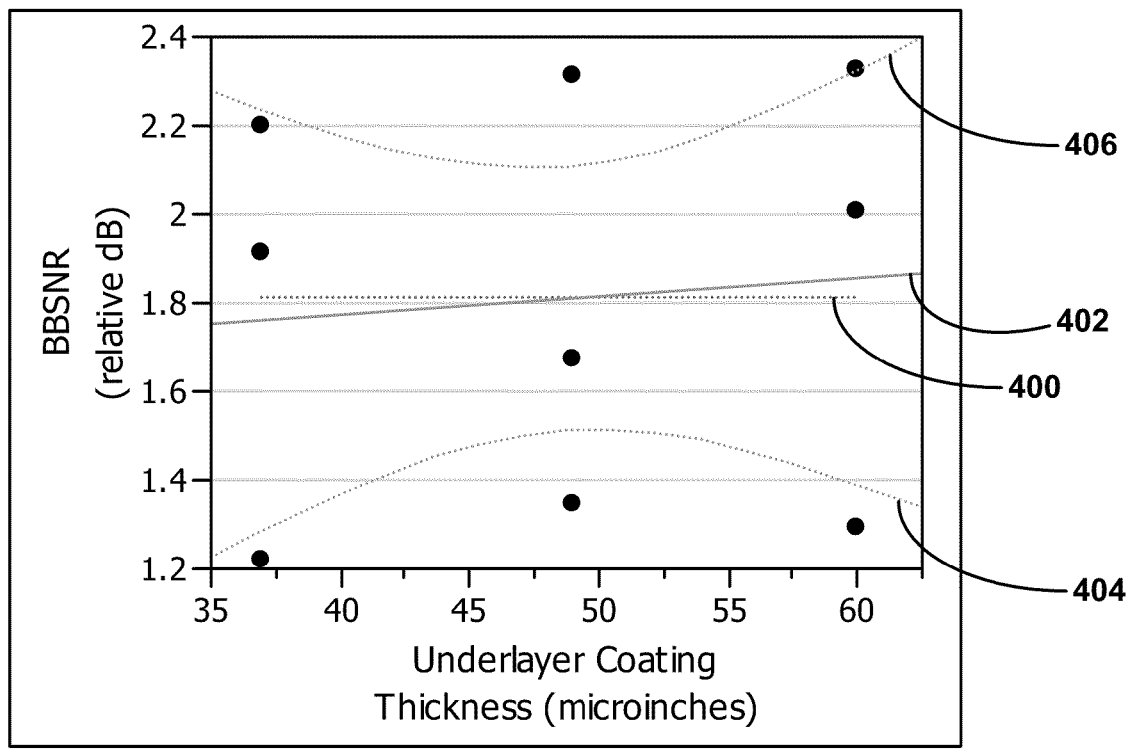
FIG. 18 is a plot of broad band signal-to-noise ratios for wet-on-dry manufactured example media as a function of underlayer thickness.
Figure 19:
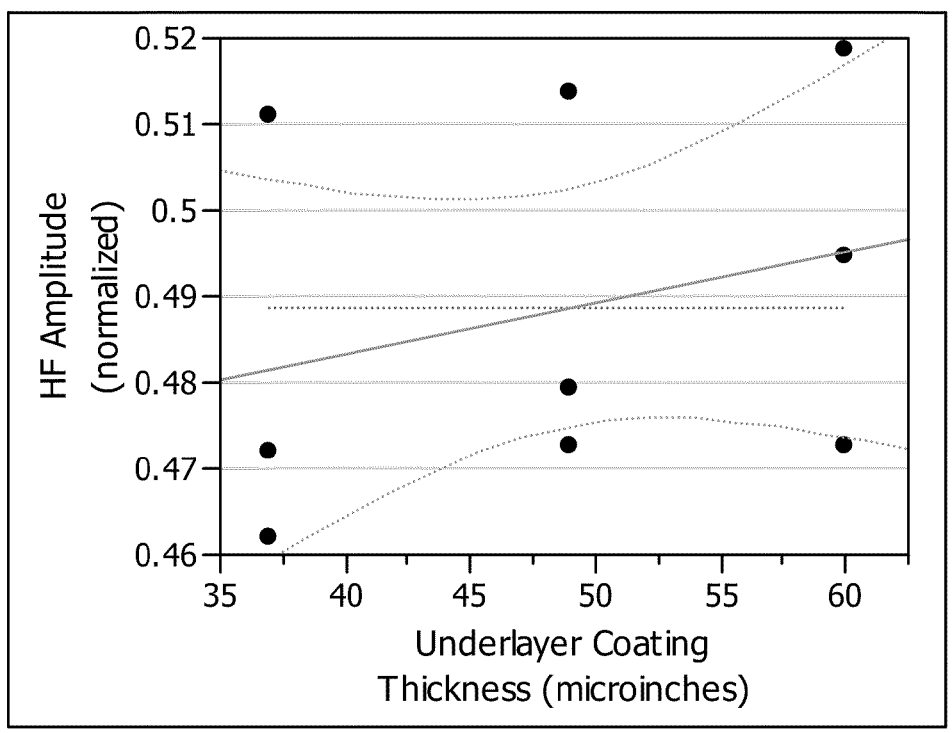
FIG. 19 is a plot of HF amplitudes for wet-on-dry manufactured example media as a function of underlayer thickness.
Figure 20:
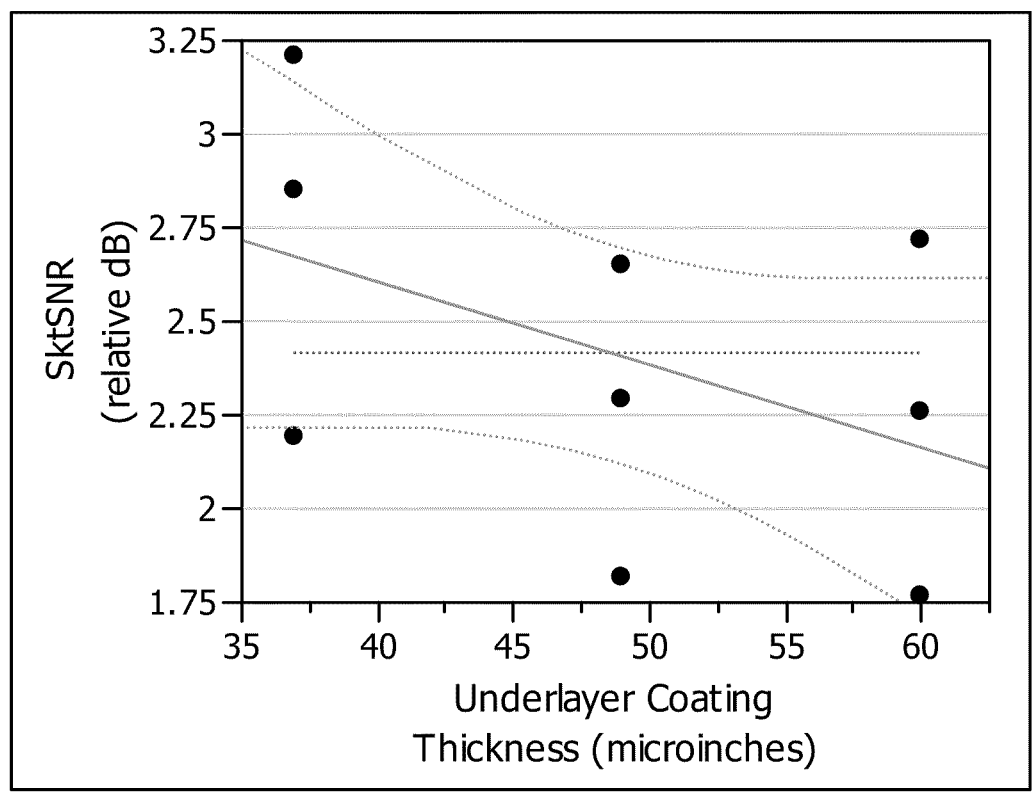
FIG. 20 is a plot of skirt signal-to-noise ratios for wet-on-dry manufactured example media as a function of underlayer thickness.

In contrast to the comparison magnetic recording media, data from the test magnetic recording media are provided in FIGS. 18-22. Different data points in the figures represent different test results for different magnetic recording media samples. In each of the figures, horizontal dashes lines (e.g., line 400 in FIG. 18) indicate grand mean of all data, the solid diagonal lines (e.g., line 402 in FIG. 18) indicate the regression fit to the data, and the curved dotted lines (e.g., lines 404, 406 in FIG. 18) indicate the 90 percent confidence limits to the associated regression lines. Where both dotted 90 percent confidence limit lines cross the horizontal dashed grand mean line, the relationship is significant at greater than 90 percent confidence. FIG. 18 is a plot illustrating broad band signal-to-noise ratios (BBSNR) in decibels for wet-on-dry manufactured media as a function of underlayer thickness in microinches. Underlayer thicknesses of 37 microinches, 49 microinches, and 60 microinches were evaluated. FIG. 19 is a plot illustrating HF amplitude as a function of underlayer thickness for the same magnetic media evaluated with respect to FIG. 18. FIG. 20 is a plot illustrating skirt signal-to-noise ratio in decibels as a function of underlayer thickness for the same magnetic media evaluated with respect to FIGS. 18 and 19. Unlike the comparison magnetic recording media discussed above, the data for the test magnetic recording media illustrated in FIGS. 18-20 do not exhibit significant improvement with increasing underlayer thickness. Indeed, the sample skirt signal-to-noise ratio data captured in FIG. 19 slightly decrease with increasing underlayer thickness.

Figure 21:
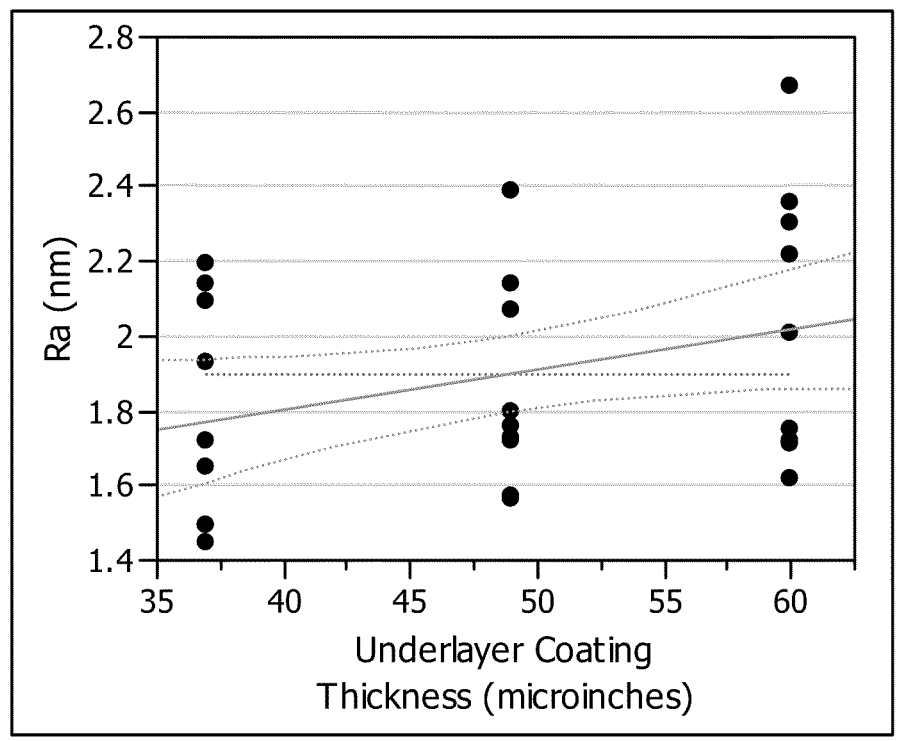
FIG. 21 is a plot of magnetic recording surface average surface roughness (Ra) values for wet-on-dry manufactured example media as a function of underlayer thickness.
Figure 22:
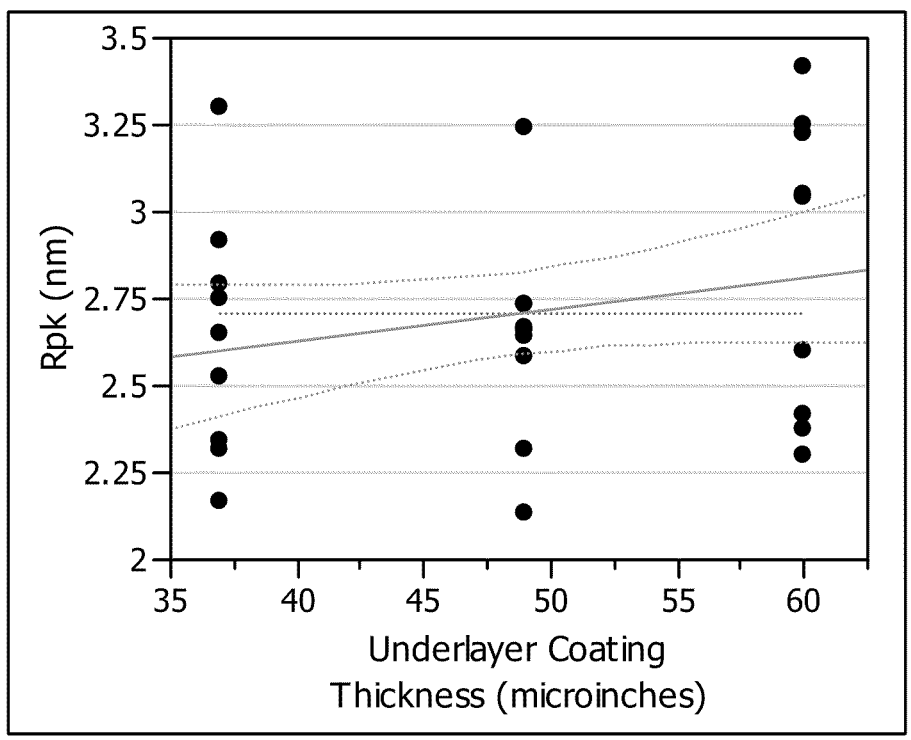
FIG. 22 is a plot of example reduced peak height (Rpk) values for wet-on-dry manufactured example media as a function of underlayer thickness.

FIGS. 21 and 22 illustrate surface roughness data for the test wet-on-dry magnetic recording media studied above in relation to FIGS. 18-20. Different data points in the figures represent different test results for different magnetic recording media samples. FIG. 21 is a plot illustrating magnetic recording surface average surface roughness (Ra) values as a function of underlayer thickness. Similarly, FIG. 22 is a plot illustrating surface roughness relative to reduced peak height (Rpk) values for media with different underlayer thicknesses. Consistent with the data in FIGS. 18-20, the data in FIGS. 21 and 22 do not show increasing improvement with increasing underlayer thickness. In fact, average surface roughness appeared to increase slightly within the samples tested.

The data suggest that an underlayer previously formed and dried may more effectively isolate a subsequently applied magnetic layer from underlying substrate roughness than when a magnetic layer is simultaneously applied with an underlayer. The data further suggest that thinner underlayers may be used to achieve equivalent or improved performance characteristics when using a wet-on-dry manufacturing technique as compared to a wet-on-wet manufacturing technique.

Example 4

In this example, magnetic recording media underlayers were calendered at different pressures to evaluate how underlayer calendering forces may affect the electromagnetic performance characteristics of a formed magnetic recording medium. The test articles were constructed by coating an underlayer composition over a substrate and then fully drying and curing the underlayer. The underlayers were then selectively calendered prior to coating a magnetic layer over the underlayer. Some underlayers were not calendered (i.e., calendering pressure equal to zero) to provide control samples for the experiment. Other underlayers were in-line calendered using a five roll steel-on-steel calendering apparatus that defined four nip points. The in-line calendering apparatus was operated at 800 feet per minute and the pressure at each nip station was altered for each test article. Finally, a magnetic layer coating that included barium ferrite magnetic particles was formed over the dried underlayer to define a recording surface. Except for the different calendering forces, each test article included the same materials, deposited to the same thicknesses, using the same processing equipment. As a result, samples only varied based on the amount of calendering force applied to the underlayer.

After forming the test articles, the magnetic recording surface of each article was physically and electromagnetically characterized. Electromagnetic performance characteristics for the test magnetic recording media were evaluated using a 4 micrometer gap read/write head operating at 190 kfci. Surface roughness parameters for the magnetic recording media were determined using an atomic force microscope (AFM). The atomic force microscope employed a probe with a radius of curvature less than or equal to 10 nanometers that was traversed across an area at least 10 micrometers by 10 micrometers.

Figure 23:
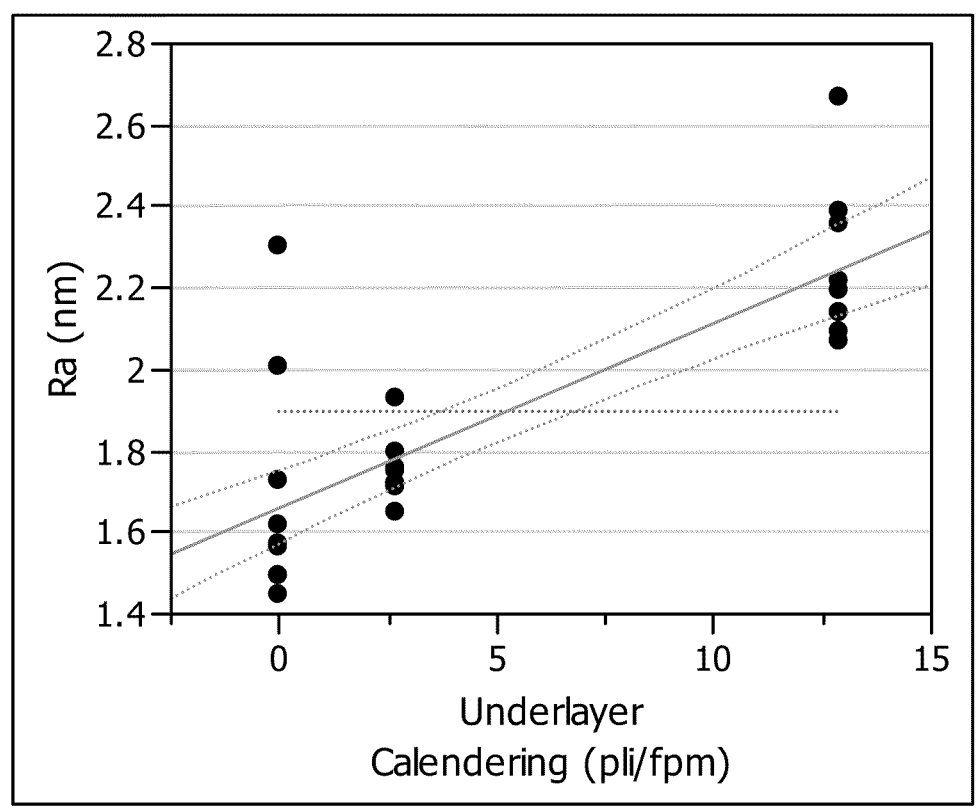
FIG. 23 is a plot of example average surface roughness data (Ra) as a function of underlayer pressure-to-velocity calendering force.
Figure 24:
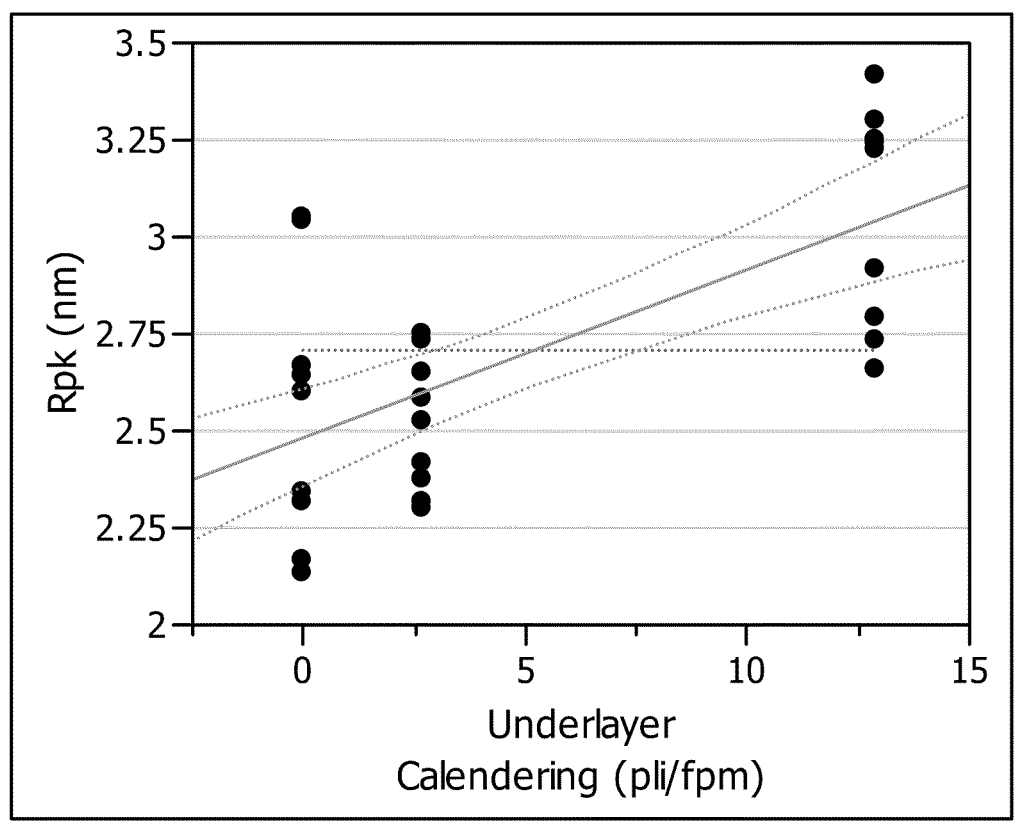
FIG. 24 is a plot of example reduced peak height (Rpk) values as a function of underlayer pressure-to-velocity calendering force.

FIGS. 23 and 24 are plots illustrating surface roughness data for different magnetic recording surfaces as a function of underlayer calendering pressure. Different data points in the figures represent different test results for different magnetic recording media samples. FIGS. 23 and 24 are plots illustrating average surface roughness data (Ra) and reduced peak height (Rpk) values as a function of underlayer pressure-to-velocity calendering force.

Figure 25:
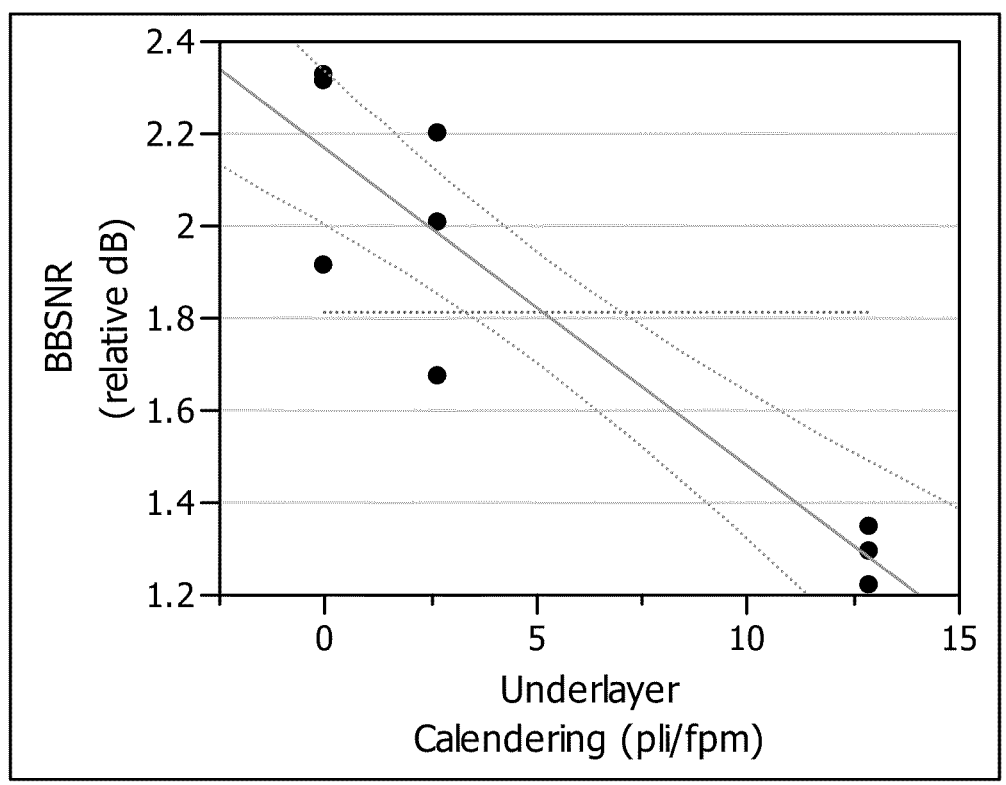
FIG. 25 is a plot of example broad band signal-to-noise ratios as a function of underlayer pressure-to-velocity calendering force.
Figure 26:
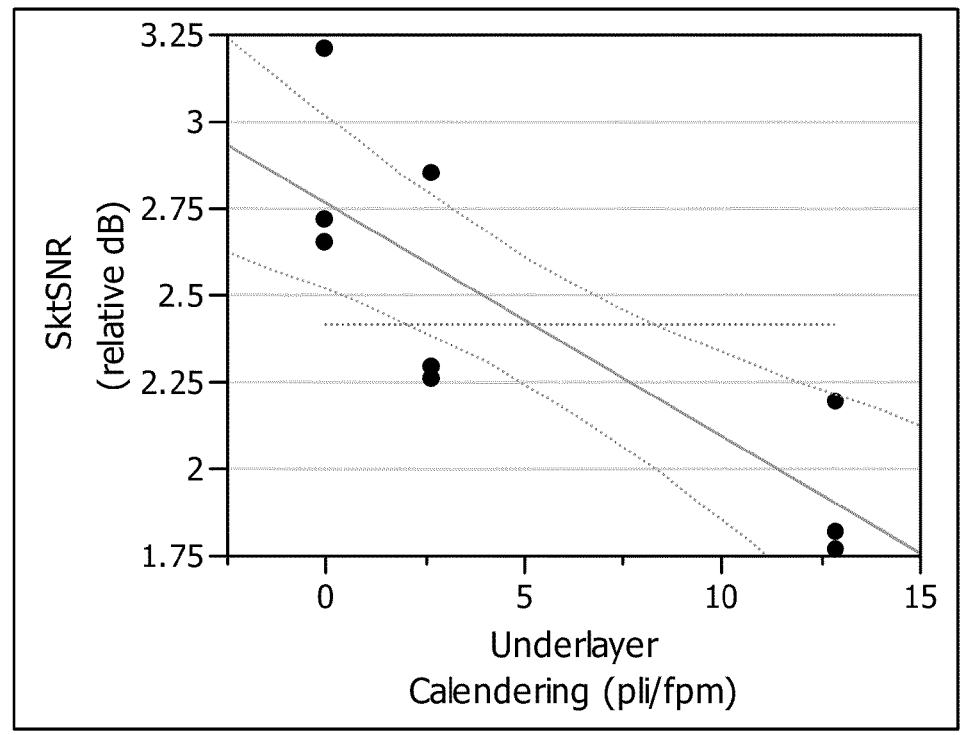
FIG. 26 is a plot of example skirt signal-to-noise ratios as a function of underlayer pressure-to-velocity calendering force.
Figure 27:
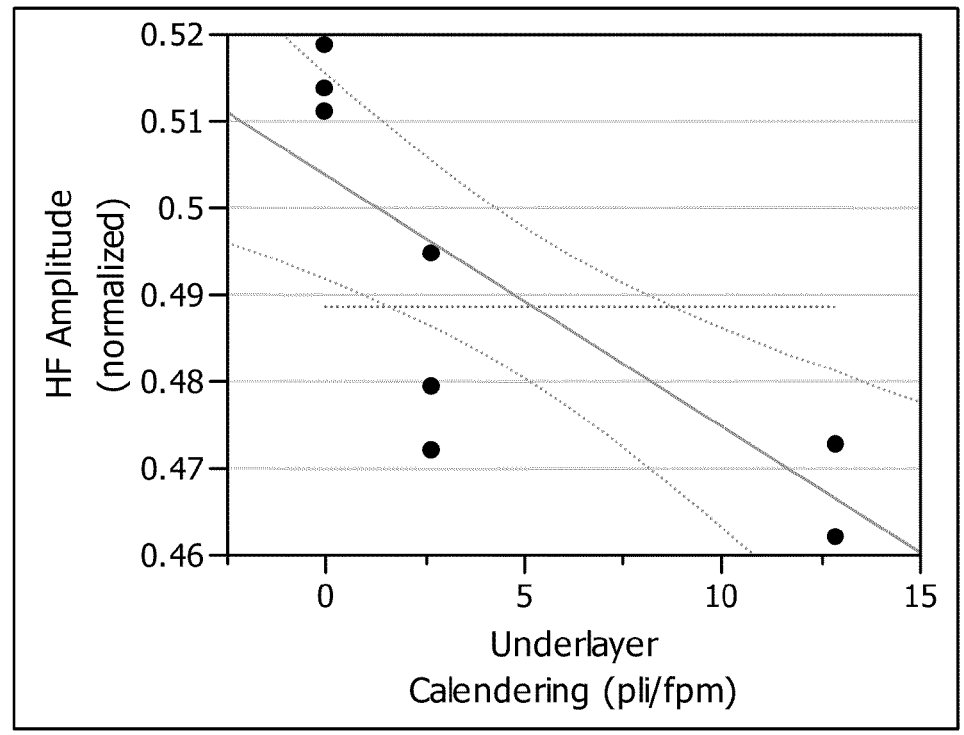
FIG. 27 is a plot of example HF amplitude values as a function of underlayer pressure-to-velocity calendering force.

FIGS. 25-27 are plots illustrating electromagnetic characteristics for the magnetic recording media evaluated with respect to FIGS. 23 and 24. Different data points in the figures represent different test results for different magnetic recording media samples. FIG. 25 is a plot of example broad band signal-to-noise ratios as a function of underlayer pressure-to-velocity calendering force. FIG. 26 is a plot of example skirt signal-to-noise ratios as a function of underlayer pressure-to-velocity calendering force. FIG. 27 is a plot of example HF amplitude values as a function of underlayer pressure-to-velocity calendering force.

As illustrated, average surface roughness decreased as underlayer calendering was reduced, and the lowest average surface roughness values were recorded on magnetic recording media that included uncalendered underlayers. Likewise, magnetic recording surface signal-to-noise ratio parameters continuously improved as calendering pressure was reduced, and the best signal-to-noise ratio values were recorded on magnetic media that included uncalendered underlayers. These data suggest that minimizing or eliminating underlayer calendering on some magnetic recording samples may improve the recording surface quality of the magnetic recording medium.

Example 5

Three magnetic particle dispersions were prepared to examine how magnetic particle milling time may affect the electromagnetic characteristics of a subsequently formed magnetic recording medium. A first magnetic particle dispersion was prepared as a control sample using standard iron oxide magnetic particles. The control dispersion was milled a standard amount of time in a sand milling apparatus to deagglomerate the particles in the dispersion. Afterwards, a second magnetic particle dispersion was prepared as a test sample using barium ferrite magnetic particles. The test dispersion was milled in the same sand milling apparatus used for the control sample, however, the test dispersion was milled for approximately fifty percent longer than the control sample. Finally, a third magnetic particle dispersion was prepared as another test sample using barium ferrite magnetic particles. This third dispersion was milled in the same sand milling apparatus used for the prior two samples. However, the third sample was milled significantly longer than either of the prior two samples.

Different magnetic recording media were prepared from the dispersions identified above. The magnetic recording media were then tested for electromagnetic performance using a 4 micrometer gap read/write head operating at 190 kfci. The magnetic recording media exhibited the characteristics indicated in Table 7 below.

TABLE 7

| Recording Medium | Type of Magnetic Particle | Normalized Milling Time (percent relative to the Comparison Sample) | Broad Band SNR (decibels) (relative to the Comparison Sample) |
|---|---|---|---|
| Comparison Sample | Iron Metal | 100 | 0 |
| Sample 1 | Barium Ferrite | 142 | −0.47 |
| Sample 2 | Barium Ferrite | 558 | 2 |

As shown in Table 7, high surface area barium ferrite particles may require more than 1.4 times the amount of milling that a standard dispersion of iron metal particles requires to achieve comparable broad band signal-to-noise ratio values. In some cases, high surface area barium ferrite particles may require more than 5.5 times the amount of milling that a standard dispersion of iron metal particles requires to realize the maximum broad band signal-to-noise ratio potential of barium ferrite particles.

Example 6

Two different types of magnetic recording media were constructed for head/tape spacing calculation. A first type of magnetic recording media was constructed using barium ferrite magnetic particles. For comparison purposes, a second type of magnetic recording media was constructed using standard iron oxide magnetic particles. The two different types of magnetic recording media were created using identical processing techniques. As a result, the only difference between the two types of media was the type of magnetic particles in the magnetic layer of each media.

The two different types of magnetic recording media were formed into magnetic recording tape and placed in tape decks and tested using a 4 micrometer gap head operating at 190 kfci. Distances between the tips of the heads and the surfaces of the different magnetic recording media were calculated from noise frequency response data. Different magnetic recording media exhibited the characteristics indicated in the plot of FIG. 33.

Figure 28:
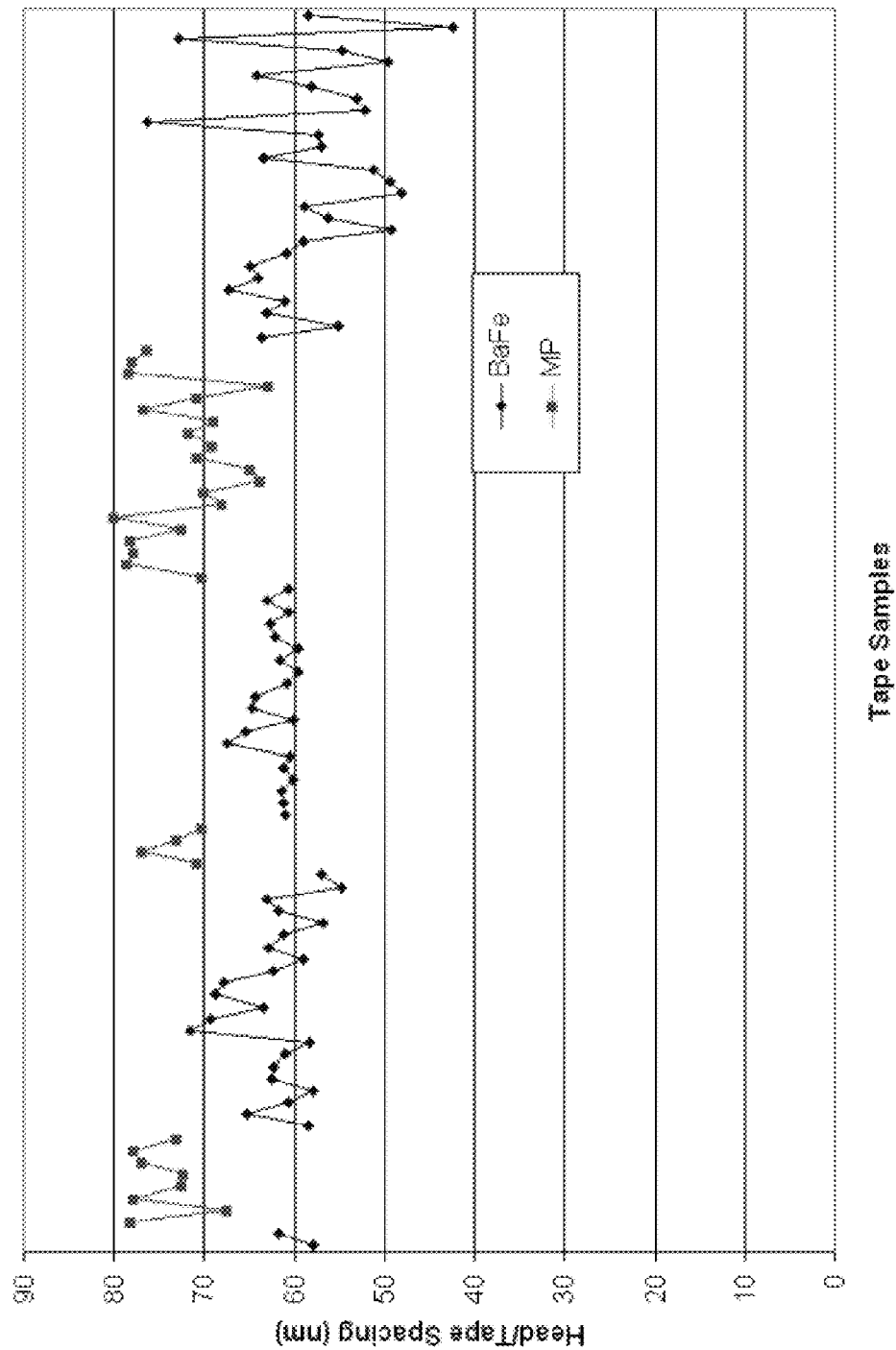
FIG. 28 is a plot of example head-to-tape spacing distances for different magnetic recording media.

As shown in FIG. 28, magnetic recording media that utilize platelet-shaped barium ferrite particles may exhibit reduced spacing between a recording head and magnetic recording surface than comparably prepared magnetic recording media that utilize acicular iron oxide particles. Closer head/tape spacing may lead to increased data storage density and/or reduce write error rates.

Example 7

In this example, two different magnetic recording media samples were constructed to test how different manufacturing techniques effect magnetic particle concentrations and distributions in formed magnetic recording media. A first magnetic recording medium was constructed with barium ferrite magnetic particles using a wet-on-wet coating process. The first medium was generated by simultaneously applying a magnetic layer coating over an underlayer coating, which in turn was simultaneously applied on a substrate. A second magnetic recording medium sample was constructed with barium ferrite magnetic particles using a wet-on-dry coating process. The second medium was constructed by coating an underlayer on a substrate. After drying and heat-curing the underlayer, a magnetic layer was formed over the underlayer.

Figure 29:
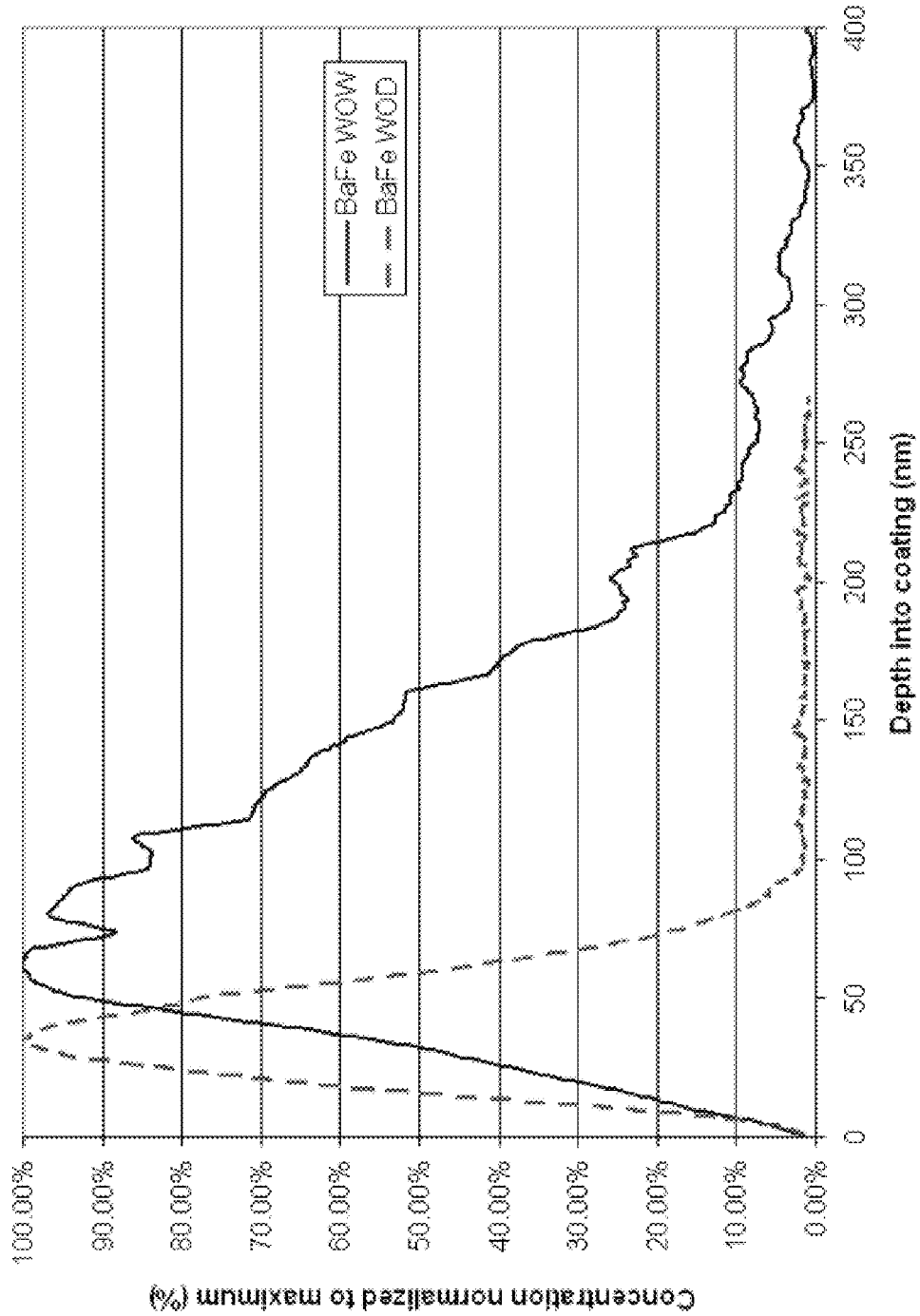
FIG. 29 is a plot of normalized magnetic particle concentration as a function of coating depth for an example magnetic recording medium.

The two magnetic recording media samples were then evaluated for magnetic particle concentrations and distributions. Each magnetic recording medium sample was exposed on a cross-sectional plane by cutting the medium transversely (i.e., in the Z-X plane illustrated in FIG. 1). A transmission electron microscopy (TEM) was then traversed across the different layers on the exposed cross section beginning at the recording surface (i.e., coating depth equal to 0) and working in an orthogonal direction away from the recording surface (i.e., to coating depth equal to 400 nanometers). Energy dispersive spectroscopy (EDS) imaging of magnetic particles from transmission electron microscopy (TEM) cross sections indicated different concentrations of magnetic particles within different areas of the recording media. Magnetic particle concentrations were normalized for each sample based on a maximum concentration of magnetic particles observed in each sample through TEM analysis. FIG. 29 is a plot of normalized magnetic particle concentration as a function of coating depth for an example magnetic recording medium. Additional concentration data for the two example barium ferrite media samples as well as a third example medium are presented in Table 8 below.

TABLE 8

| | Wet-on-Wet example medium with barium ferrite | Wet-on-Dry example medium with barium ferrite | Wet-on-Dry example medium with other metal particles |
|---|---|---|---|
| Distance between an 80% maximum concentration of magnetic particles and a 20% maximum concentration of magnetic particles (nanometers) | 104 | 24 | 20 |
| Distance between a 60% maximum concentration of magnetic particles and a 40% maximum concentration of magnetic particles (nanometers) | 29 | 7 | 5 |

As indicated by FIG. 29 and Table 8, magnetic recording media formed using a wet-on-dry process may exhibit less magnetic particle dispersion across a coating depth than similar magnetic recording media formed using a wet-on-wet process. In other words, a magnetic recording medium formed using a wet-on-dry process may exhibit a higher concentration of magnetic particles in a magnetic layer than a similar medium formed using a wet-on-dry coating process.

Various embodiments have been described. These and other embodiments are within the scope of the following claims.

The invention claimed is:

1. A magnetic medium comprising:
   a substrate;
   a nonmagnetic underlayer formed over the substrate and comprising a plurality of nonmagnetic underlayer particles; and
   a magnetic layer that includes a plurality of magnetic particles formed over the nonmagnetic underlayer, wherein the magnetic layer defines a saturated magnetization and thickness product less than or equal to approximately 1.00 memu per square centimeter, and the magnetic particles are selected from the group consisting of magnetic platelet-shaped particles and magnetic particles with an aspect ratio less than or equal to approximately 1.5;

wherein a mixing zone is defined at the interface of the magnetic layer and the nonmagnetic underlayer, the mixing zone including a mixture of the nonmagnetic underlayer particles and the magnetic particles, wherein a first depth, from a top surface of the magnetic layer, of the mixing zone defines a concentration of magnetic particles equal to approximately 80 percent of a maximum concentration of magnetic particles in the magnetic layer, and a second depth, from the top surface of the magnetic layer, of the mixing zone defines a concentration of magnetic particles equal to approximately 20 percent of the maximum concentration of magnetic particles in the magnetic layer, and wherein a distance between the first depth of the mixing zone and the second depth of the mixing zone is less than or equal to approximately 30 nanometers.

2. The magnetic medium of claim 1, wherein the magnetic particles include ferrite particles comprising a hexagonal lattice structure.

3. The magnetic medium of claim 2, wherein the distance between the first depth of the mixing zone and the second depth of the mixing zone is less than or equal to approximately 25 nanometers.

4. The magnetic medium of claim 2, wherein the saturated magnetization and thickness product is less than or equal to approximately 0.67 memu per square centimeter.

5. The magnetic medium of claim 4, wherein the distance between the first depth of the mixing zone and the second depth of the mixing zone is less than or equal to approximately 25 nanometers.

6. The magnetic medium of claim 5, wherein the distance between the first depth of the mixing zone and the second depth of the mixing zone is less than or equal to approximately 20 nanometers.

7. The magnetic medium of claim 2, wherein the saturated magnetization and thickness product is greater than or equal to approximately 0.34 memu per square centimeter, and the distance between the first depth of the mixing zone and the second depth of the mixing zone is greater than or equal to approximately 5 nanometers.

8. The magnetic medium of claim 2, wherein the magnetic layer defines a recording surface, and the recording surface is substantially free of surface defects greater than or equal to approximately 5 microns.

9. The magnetic medium of claim 8, wherein the saturated magnetization and thickness product is less than or equal to approximately 0.56 memu per square centimeter.

10. The magnetic medium of claim 2, wherein a third depth, from the top surface of the magnetic layer, of the mixing zone defines a concentration of magnetic particles equal to approximately 60 percent of the maximum concentration of magnetic particles in the magnetic layer and a fourth depth, from the top surface of the magnetic layer, of the mixing zone defines a concentration of magnetic particles equal to approximately 40 percent of the maximum concentration of magnetic particles in the magnetic layer, and wherein a distance between the third depth of the mixing zone and the fourth depth of the mixing zone is less than or equal to approximately 15 nanometers.

11. The magnetic medium of claim 10, wherein a distance between the third depth of the mixing zone and the fourth depth of the mixing zone is less than or equal to approximately 10 nanometers.

12. The magnetic medium of claim 2, wherein the substrate comprises a first surface and a second surface opposite the first surface, the nonmagnetic underlayer comprises a first nonmagnetic underlayer formed over a first surface of the substrate, the magnetic layer comprises a first magnetic layer formed over the first nonmagnetic underlayer, and further comprising:
 a second underlayer that includes a plurality of second underlayer particles formed over the second surface of the substrate; and
 a second magnetic layer that includes a plurality of second magnetic particles formed over the second underlayer.

13. A magnetic medium comprising:
 a substrate that defines an average thickness between approximately 2.5 micrometers and 10 micrometers;
 a nonmagnetic underlayer formed over the substrate and comprising a plurality of nonmagnetic underlayer particles, wherein the nonmagnetic underlayer defines an average thickness between approximately 500 nanometers and approximately 1500 nanometers; and
 a magnetic layer that includes a plurality of magnetic particles formed over the nonmagnetic underlayer, wherein the magnetic layer defines a saturated magnetization and thickness product between approximately 0.34 memu per square centimeter and approximately 0.90 memu per square centimeter, and the magnetic particles are selected from the group consisting of magnetic platelet-shaped particles and magnetic particles with an aspect ratio less than or equal to approximately 1.5,
 wherein a mixing zone is defined at the interface of the magnetic layer and the nonmagnetic underlayer, the mixing zone including a mixture of the nonmagnetic underlayer particles and the magnetic particles, wherein a first depth, from a top surface of the magnetic layer, of the mixing zone defines a concentration of magnetic particles equal to approximately 80 percent of a maximum concentration of magnetic particles in the magnetic layer, and a second depth, from the top surface of the magnetic layer, of the mixing zone defines a concentration of magnetic particles equal to approximately 20 percent of the maximum concentration of magnetic particles in the magnetic layer, and wherein a distance between the first depth of the mixing zone and the second depth of the mixing zone is less than or equal to approximately 30 nanometers.

14. The magnetic medium of claim 13, wherein the magnetic particles include ferrite particles comprising a hexagonal lattice structure.

15. The magnetic medium of claim 13, wherein the saturated magnetization and thickness product is less than or equal to approximately 0.67 memu per square centimeter.

16. The magnetic medium of claim 14, wherein the distance between the first depth of the mixing zone and the second depth of the mixing zone is less than or equal to approximately 20 nanometers.

17. A magnetic storage system comprising:
 a magnetic medium;
 a head that detects magnetic transitions on the medium and generates signals;
 a controller that controls a position of the head relative to the medium; and
 a signal processor that interprets signals generated by the head;
 wherein the magnetic medium includes a substrate, a nonmagnetic underlayer formed over the substrate and comprising a plurality of nonmagnetic underlayer particles, and a magnetic layer including a plurality of magnetic particles formed over the nonmagnetic underlayer, the magnetic layer defining a saturated magnetization and thickness product less than or equal to approximately 1.35 memu per square centimeter, and the plurality of magnetic particles are selected from the group consisting of magnetic platelet-shaped particles and magnetic particles with an aspect ratio less than or equal to approximately 1.5;

wherein a mixing zone is defined at the interface of the magnetic layer and the nonmagnetic underlayer, the mixing zone including a mixture of the nonmagnetic underlayer particles and the magnetic particles, wherein a first depth, from a top surface of the magnetic layer, of the mixing zone defines a concentration of magnetic particles equal to approximately 80 percent of a maximum concentration of magnetic particles in the magnetic layer, and a second depth, from the top surface of the magnetic layer, of the mixing zone defines a concentration of magnetic particles equal to approximately 20 percent of the maximum concentration of magnetic particles in the magnetic layer, and wherein a distance between the first depth of the mixing zone and the second depth of the mixing zone is less than or equal to approximately 30 nanometers.

18. The magnetic storage system of claim 17, wherein the magnetic particles include ferrite particles comprising a hexagonal lattice structure.

19. The magnetic storage system of claim 18, wherein the saturated magnetization and thickness product is less than or equal to approximately 0.67 memu per square centimeter.

20. The magnetic storage system of claim 19, wherein the distance between the first depth of the mixing zone and the second depth of the mixing zone is less than or equal to approximately 20 nanometers.

\* \* \* \* \*